(12) United States Patent
Ramanathan et al.

(10) Patent No.: US 11,750,505 B1
(45) Date of Patent: *Sep. 5, 2023

(54) SYSTEM AND METHOD FOR EFFICIENT NETWORK-WIDE BROADCAST IN A MULTI-HOP WIRELESS NETWORK USING PACKET ECHOS

(71) Applicant: goTenna Inc., Brooklyn, NY (US)

(72) Inventors: Subramanian Ramanathan, Westford, MA (US); Christophe Servaes, Guttenberg, NJ (US); Ravindra Lambi, Morganville, NJ (US)

(73) Assignee: goTenna Inc., Brooklyn, NY (US)

( * ) Notice: Subject to any disclaimer, the term of this patent is extended or adjusted under 35 U.S.C. 154(b) by 63 days.

This patent is subject to a terminal disclaimer.

(21) Appl. No.: 17/194,541

(22) Filed: Mar. 8, 2021

Related U.S. Application Data

(63) Continuation of application No. 16/198,204, filed on Nov. 21, 2018, now Pat. No. 10,944,669.

(60) Provisional application No. 62/628,717, filed on Feb. 9, 2018.

(51) Int. Cl.
| | |
|---|---|
| *G01R 31/08* | (2020.01) |
| *H04J 3/14* | (2006.01) |
| *H04L 12/16* | (2006.01) |
| *H04L 45/00* | (2022.01) |
| *H04L 45/02* | (2022.01) |
| *H04W 4/80* | (2018.01) |
| *H04L 45/28* | (2022.01) |
| *H04W 84/18* | (2009.01) |

(52) U.S. Cl.
CPC .............. *H04L 45/32* (2013.01); *H04L 45/02* (2013.01); *H04L 45/20* (2013.01); *H04L 45/28* (2013.01); *H04W 4/80* (2018.02); *H04W 84/18* (2013.01)

(58) Field of Classification Search
CPC ......... H04L 45/32; H04L 45/02; H04L 45/20; H04L 45/28; H04W 4/80; H04W 84/18
USPC ...................................................... 370/216
See application file for complete search history.

(56) References Cited

U.S. PATENT DOCUMENTS

| | | |
|---|---|---|
| 6,415,158 B1 | 7/2002 | King et al. |
| 6,421,349 B1 | 7/2002 | Grover |
| 6,584,080 B1 | 6/2003 | Ganz et al. |
| 6,625,135 B1 | 9/2003 | Johnson et al. |
| 6,628,620 B1 | 9/2003 | Cain |

(Continued)

FOREIGN PATENT DOCUMENTS

| | | |
|---|---|---|
| WO | WO2012078565 | 6/2012 |
| WO | WO2012116489 | 9/2012 |

*Primary Examiner* — Maharishi V Khirodhar
(74) *Attorney, Agent, or Firm* — Thrive IP

(57) ABSTRACT

A mesh network protocol, comprising: receiving a packet from a sender, identifying the sender, a prior sender, a flood mode, a time-to-live, and a sequence identifier; marking the recipient as critical if during a full flood period, the recipient is the same as the prior sender, and marking the recipient as non-critical if no packet is received with the recipient the same as the prior sender; rebroadcasting the packet, modified by updating sender with the recipient, and sender as prior sender, decrementing the time to live until expiration, and, the identity of the recipient is different from the identity of the prior sender in full flood mode; or the identity of the recipient is different from the prior sender, and the recipient is critical, in partial flood mode.

18 Claims, 9 Drawing Sheets

(56) References Cited

U.S. PATENT DOCUMENTS

| | | | |
|---|---|---|---|
| 6,628,661 B1* | 9/2003 | Goldman | H04L 45/02 370/408 |
| 6,647,426 B2 | 11/2003 | Mohammed | |
| 6,718,394 B2 | 4/2004 | Cain | |
| 6,754,192 B2 | 6/2004 | Kennedy | |
| 6,763,013 B2 | 7/2004 | Kennedy | |
| 6,763,014 B2 | 7/2004 | Kennedy | |
| 6,870,846 B2 | 3/2005 | Cain | |
| 6,894,985 B2 | 5/2005 | Billhartz | |
| 6,898,529 B2 | 5/2005 | Gao et al. | |
| 6,906,741 B2 | 6/2005 | Canova, Jr. et al. | |
| 6,954,435 B2 | 10/2005 | Billhartz et al. | |
| 6,961,310 B2 | 11/2005 | Cain | |
| 6,975,614 B2 | 12/2005 | Kennedy | |
| 6,977,608 B1 | 12/2005 | Anderson et al. | |
| 6,986,161 B2 | 1/2006 | Billhartz | |
| 7,007,102 B2 | 2/2006 | Billhartz et al. | |
| 7,027,426 B2 | 4/2006 | Billhartz | |
| 7,028,687 B1 | 4/2006 | Silver et al. | |
| 7,061,925 B2 | 6/2006 | Joshi | |
| 7,068,600 B2 | 6/2006 | Cain | |
| 7,068,605 B2 | 6/2006 | Cain et al. | |
| 7,069,483 B2 | 6/2006 | Gillies et al. | |
| 7,075,919 B1 | 7/2006 | Wendt et al. | |
| 7,079,552 B2 | 7/2006 | Cain et al. | |
| 7,082,117 B2 | 7/2006 | Billhartz | |
| 7,085,290 B2 | 8/2006 | Cain et al. | |
| 7,096,037 B2 | 8/2006 | Canova, Jr. et al. | |
| 7,127,250 B2 | 10/2006 | Gallagher et al. | |
| 7,142,866 B2 | 11/2006 | Windham et al. | |
| 7,170,425 B2 | 1/2007 | Christopher et al. | |
| 7,176,807 B2 | 2/2007 | Scoggins et al. | |
| 7,216,282 B2 | 5/2007 | Cain | |
| 7,224,642 B1 | 5/2007 | Tran | |
| 7,230,916 B2 | 6/2007 | Stamatelakis et al. | |
| 7,251,238 B2 | 7/2007 | Joshi et al. | |
| 7,266,085 B2 | 9/2007 | Stine | |
| 7,271,736 B2 | 9/2007 | Siegel et al. | |
| 7,281,057 B2 | 10/2007 | Cain | |
| 7,299,038 B2 | 11/2007 | Kennedy et al. | |
| 7,299,042 B2 | 11/2007 | Moore et al. | |
| 7,308,369 B2 | 12/2007 | Rudran et al. | |
| 7,308,370 B2 | 12/2007 | Mason, Jr. et al. | |
| 7,315,548 B2 | 1/2008 | Joshi | |
| 7,317,898 B2 | 1/2008 | Tegreene | |
| 7,324,824 B2 | 1/2008 | Smith et al. | |
| 7,327,998 B2 | 2/2008 | Kumar et al. | |
| 7,346,167 B2 | 3/2008 | Billhartz et al. | |
| 7,348,895 B2 | 3/2008 | Lagassey | |
| 7,356,001 B1 | 4/2008 | Jones et al. | |
| 7,362,711 B2 | 4/2008 | Golle et al. | |
| 7,366,111 B2 | 4/2008 | Thubert et al. | |
| 7,366,544 B2 | 4/2008 | Tegreene | |
| 7,367,497 B1 | 5/2008 | Hill | |
| 7,382,765 B2 | 6/2008 | Kennedy et al. | |
| 7,389,295 B2 | 6/2008 | Jung et al. | |
| 7,394,774 B2 | 7/2008 | Calcev | |
| 7,394,798 B2 | 7/2008 | Naghian | |
| 7,394,826 B2 | 7/2008 | Cain et al. | |
| 7,400,903 B2 | 7/2008 | Shoemake et al. | |
| 7,418,238 B2 | 8/2008 | Tegreene | |
| 7,420,944 B2 | 9/2008 | Norris et al. | |
| 7,423,985 B1 | 9/2008 | Hill | |
| 7,427,927 B2 | 9/2008 | Borleske et al. | |
| 7,428,221 B2 | 9/2008 | Thubert et al. | |
| 7,450,517 B2 | 11/2008 | Cho | |
| 7,451,365 B2 | 11/2008 | Wang et al. | |
| 7,453,864 B2 | 11/2008 | Kennedy et al. | |
| 7,457,834 B2 | 11/2008 | Jung et al. | |
| 7,463,612 B2 | 12/2008 | Fonseca, Jr. et al. | |
| 7,463,907 B2 | 12/2008 | Smith et al. | |
| 7,466,665 B2 | 12/2008 | Calcev et al. | |
| 7,468,954 B2 | 12/2008 | Sherman | |
| 7,480,248 B2 | 1/2009 | Duggi et al. | |
| 7,495,578 B2 | 2/2009 | Borleske | |
| 7,512,094 B1 | 3/2009 | Linebarger et al. | |
| 7,529,561 B2 | 5/2009 | Heinonen et al. | |
| 7,535,883 B2 | 5/2009 | Kim et al. | |
| 7,536,388 B2 | 5/2009 | Jung et al. | |
| 7,539,759 B2 | 5/2009 | Narayanan et al. | |
| 7,545,285 B2 | 6/2009 | Shuey et al. | |
| 7,567,577 B2 | 7/2009 | Thubert et al. | |
| 7,580,380 B2 | 8/2009 | Baker et al. | |
| 7,580,730 B2 | 8/2009 | Tegreene | |
| 7,580,782 B2 | 8/2009 | Breed et al. | |
| 7,581,095 B2 | 8/2009 | Billhartz | |
| 7,587,001 B2 | 9/2009 | Hazani et al. | |
| 7,590,589 B2 | 9/2009 | Hoffberg | |
| 7,596,152 B2 | 9/2009 | Yarvis et al. | |
| 7,599,696 B2 | 10/2009 | Jung et al. | |
| 7,602,738 B2 | 10/2009 | Preguica | |
| 7,606,178 B2 | 10/2009 | Rahman et al. | |
| 7,616,961 B2 | 11/2009 | Billhartz | |
| 7,626,966 B1 | 12/2009 | Ruiter et al. | |
| 7,626,967 B2 | 12/2009 | Yarvis et al. | |
| 7,643,467 B2 | 1/2010 | Smith et al. | |
| 7,653,011 B2 | 1/2010 | Rahman et al. | |
| 7,656,851 B1 | 2/2010 | Ghanadan et al. | |
| 7,657,354 B2 | 2/2010 | Breed et al. | |
| 7,660,318 B2 | 2/2010 | Rahman et al. | |
| 7,660,950 B2 | 2/2010 | Miller et al. | |
| 7,664,111 B2 | 2/2010 | Tsubota | |
| 7,664,538 B2 | 2/2010 | Watanabe et al. | |
| 7,668,173 B2 | 2/2010 | Zhao | |
| 7,675,863 B2 | 3/2010 | Werb et al. | |
| 7,675,882 B2 | 3/2010 | Mighani et al. | |
| 7,678,068 B2 | 3/2010 | Levine et al. | |
| 7,688,847 B2 | 3/2010 | Kim et al. | |
| 7,693,484 B2 | 4/2010 | Ting et al. | |
| 7,695,446 B2 | 4/2010 | Levine et al. | |
| 7,701,858 B2 | 4/2010 | Werb et al. | |
| 7,702,594 B2 | 4/2010 | Scoggins et al. | |
| 7,706,282 B2 | 4/2010 | Huang | |
| 7,706,842 B2 | 4/2010 | Tegreene | |
| 7,710,932 B2 | 5/2010 | Muthuswamy et al. | |
| 7,715,396 B2 | 5/2010 | Castro et al. | |
| 7,719,988 B1 | 5/2010 | Ruiz et al. | |
| 7,720,037 B2 | 5/2010 | Bill | |
| 7,725,080 B2 | 5/2010 | Tegreene | |
| 7,729,336 B2 | 6/2010 | Pun et al. | |
| 7,742,399 B2 | 6/2010 | Pun | |
| 7,742,430 B2 | 6/2010 | Scoggins et al. | |
| 7,746,794 B2 | 6/2010 | Sink | |
| 7,751,420 B2 | 7/2010 | Tsubota | |
| 7,753,795 B2 | 7/2010 | Harris et al. | |
| 7,760,735 B1 | 7/2010 | Chen et al. | |
| 7,764,617 B2 | 7/2010 | Cain et al. | |
| 7,778,235 B2 | 8/2010 | Thubert et al. | |
| 7,787,361 B2 | 8/2010 | Rahman et al. | |
| 7,787,480 B1 | 8/2010 | Mehta et al. | |
| 7,788,387 B2 | 8/2010 | Kumar et al. | |
| 7,796,511 B2 | 9/2010 | Wood | |
| 7,800,812 B2 | 9/2010 | Moskowitz | |
| 7,808,985 B2 | 10/2010 | Romero et al. | |
| 7,813,451 B2 | 10/2010 | Binder et al. | |
| 7,817,623 B2 | 10/2010 | Dawson et al. | |
| 7,830,820 B2 | 11/2010 | Duke et al. | |
| 7,843,861 B2 | 11/2010 | Dawson et al. | |
| 7,847,734 B2 | 12/2010 | Wu | |
| 7,848,702 B2 | 12/2010 | Ho et al. | |
| 7,849,139 B2 | 12/2010 | Wolfson et al. | |
| 7,852,826 B2 | 12/2010 | Kitchin | |
| 7,859,465 B2 | 12/2010 | Wu | |
| 7,860,025 B2 | 12/2010 | Thubert et al. | |
| 7,860,081 B2 | 12/2010 | Dawson et al. | |
| 7,860,968 B2 | 12/2010 | Bornhoevd et al. | |
| 7,873,019 B2 | 1/2011 | Dawson et al. | |
| 7,881,206 B2 | 2/2011 | St. Pierre et al. | |
| 7,881,474 B2 | 2/2011 | Sun | |
| 7,886,075 B2 | 2/2011 | Molteni et al. | |
| 7,894,828 B2 | 2/2011 | Dawson et al. | |
| 7,898,993 B2 | 3/2011 | Dawson et al. | |
| 7,902,973 B2 | 3/2011 | Thubert et al. | |
| 7,905,640 B2 | 3/2011 | Gergets et al. | |

(56) References Cited

U.S. PATENT DOCUMENTS

| | | |
|---|---|---|
| 7,912,645 B2 | 3/2011 | Breed et al. |
| 7,924,722 B2 | 4/2011 | Thubert et al. |
| 7,924,796 B2 | 4/2011 | Vu Duong et al. |
| 7,929,914 B2 | 4/2011 | Tegreene |
| 7,936,732 B2 | 5/2011 | Ho et al. |
| 7,941,188 B2 | 5/2011 | Jung et al. |
| 7,944,878 B2 | 5/2011 | Dawson et al. |
| 7,957,355 B1 | 6/2011 | Heiferling et al. |
| 7,957,410 B2 | 6/2011 | Mosko et al. |
| 7,961,650 B2 | 6/2011 | Davies |
| 7,962,101 B2 | 6/2011 | Vaswani et al. |
| 7,962,154 B2 | 6/2011 | Nakakita et al. |
| 7,969,914 B1 | 6/2011 | Gerber et al. |
| 7,970,418 B2 | 6/2011 | Schmidt et al. |
| 7,974,402 B2 | 7/2011 | Pun |
| 7,978,062 B2 | 7/2011 | LaLonde et al. |
| 7,979,311 B2 | 7/2011 | Dawson et al. |
| 7,983,835 B2 | 7/2011 | Lagassey |
| 7,990,897 B2 | 8/2011 | Jing et al. |
| 7,990,947 B2 | 8/2011 | Twitchell, Jr. et al. |
| 7,995,501 B2 | 8/2011 | Jetcheva et al. |
| 7,996,558 B2 | 8/2011 | Hsu et al. |
| 8,031,605 B2 | 10/2011 | Oyman et al. |
| 8,035,479 B2 | 10/2011 | Tran |
| 8,040,863 B2 | 10/2011 | Dawson et al. |
| 8,041,369 B2 | 10/2011 | Smith et al. |
| 8,042,048 B2 | 10/2011 | Wilson et al. |
| 8,059,620 B2 | 11/2011 | Moon |
| 8,060,017 B2 | 11/2011 | Schlicht et al. |
| 8,060,308 B2 | 11/2011 | Breed |
| 8,064,416 B2 | 11/2011 | Liu |
| 8,065,166 B2 | 11/2011 | Maresh et al. |
| 8,065,411 B2 | 11/2011 | Spiess et al. |
| 8,072,906 B2 | 12/2011 | Naghian |
| 8,073,384 B2 | 12/2011 | Shuey et al. |
| 8,077,663 B2 | 12/2011 | Mighani et al. |
| 8,081,658 B2 | 12/2011 | Zuniga et al. |
| 8,085,686 B2 | 12/2011 | Thubert et al. |
| 8,090,596 B2 | 1/2012 | Maresh et al. |
| 8,098,421 B2 | 1/2012 | Moskowitz |
| 8,099,108 B2 | 1/2012 | Camp, Jr. et al. |
| 8,099,307 B2 | 1/2012 | Maresh et al. |
| 8,107,397 B1 | 1/2012 | Bagchi et al. |
| 8,108,228 B2 | 1/2012 | Maresh et al. |
| 8,108,429 B2 | 1/2012 | Sim-Tang et al. |
| 8,112,082 B2 | 2/2012 | Nylander et al. |
| 8,115,617 B2 | 2/2012 | Thubert et al. |
| 8,120,839 B2 | 2/2012 | Moskowitz |
| 8,121,628 B2 | 2/2012 | Mauti, Jr. |
| 8,121,870 B2 | 2/2012 | Maresh et al. |
| 8,125,928 B2 | 2/2012 | Mehta et al. |
| 8,126,473 B1 | 2/2012 | Kim et al. |
| 8,130,663 B2 | 3/2012 | Jackson et al. |
| 8,130,708 B2 | 3/2012 | Singh |
| 8,131,569 B2 | 3/2012 | Maresh et al. |
| 8,131,838 B2 | 3/2012 | Bornhoevd et al. |
| 8,134,950 B2 | 3/2012 | Pun |
| 8,135,021 B2 | 3/2012 | Westphal |
| 8,135,362 B2 | 3/2012 | LaDue |
| 8,138,690 B2 | 3/2012 | Chemel et al. |
| 8,138,934 B2 | 3/2012 | Veillette et al. |
| 8,139,504 B2 | 3/2012 | Mankins et al. |
| 8,144,596 B2 | 3/2012 | Veillette |
| 8,144,619 B2 | 3/2012 | Hoffberg |
| 8,151,140 B2 | 4/2012 | Sim-Tang |
| 8,155,008 B2 | 4/2012 | Jetcheva et al. |
| 8,161,097 B2 | 4/2012 | Jung et al. |
| 8,165,585 B2 | 4/2012 | Gallagher et al. |
| 8,169,974 B2 | 5/2012 | Pratt, Jr. et al. |
| 8,170,577 B2 | 5/2012 | Singh |
| 8,170,957 B2 | 5/2012 | Richard |
| 8,171,364 B2 | 5/2012 | Veillette |
| 8,174,381 B2 | 5/2012 | Imes et al. |
| 8,180,294 B2 | 5/2012 | Ting et al. |
| 8,184,681 B2 | 5/2012 | Binder et al. |
| 8,194,541 B2 | 6/2012 | Leppanen et al. |
| 8,195,483 B2 | 6/2012 | Maresh et al. |
| 8,195,628 B2 | 6/2012 | Sim-Tang |
| 8,199,753 B2 | 6/2012 | Mehta et al. |
| 8,200,246 B2 | 6/2012 | Khosravy et al. |
| 8,203,463 B2 | 6/2012 | Bragg et al. |
| 8,203,464 B2 | 6/2012 | Billhartz et al. |
| 8,213,409 B2 | 7/2012 | Rudnick et al. |
| 8,213,895 B2 | 7/2012 | Hurwitz et al. |
| 8,217,805 B2 | 7/2012 | Billhartz et al. |
| 8,228,954 B2 | 7/2012 | Thubert et al. |
| 8,230,108 B2 | 7/2012 | Pratt, Jr. et al. |
| 8,232,745 B2 | 7/2012 | Chemel et al. |
| 8,239,169 B2 | 8/2012 | Gregory et al. |
| 8,248,947 B2 | 8/2012 | Li et al. |
| 8,249,984 B2 | 8/2012 | Dawson et al. |
| 8,255,469 B2 | 8/2012 | Leppanen et al. |
| 8,256,681 B2 | 9/2012 | Wang |
| 8,266,657 B2 | 9/2012 | Margulis |
| 8,270,302 B2 | 9/2012 | Chu et al. |
| 8,271,449 B2 | 9/2012 | Jung et al. |
| 8,275,824 B2 | 9/2012 | Jung et al. |
| 8,289,182 B2 | 10/2012 | Vogel et al. |
| 8,289,186 B2 | 10/2012 | Osafune |
| 8,300,538 B2 | 10/2012 | Kim et al. |
| 8,300,615 B2 | 10/2012 | Copeland et al. |
| 8,311,533 B1 | 11/2012 | Alcorn |
| 8,314,717 B2 | 11/2012 | Billhartz et al. |
| 8,315,231 B2 | 11/2012 | Pirzada et al. |
| 8,319,658 B2 | 11/2012 | Conant et al. |
| 8,319,833 B2 | 11/2012 | Weinstein et al. |
| 8,320,302 B2 | 11/2012 | Richeson et al. |
| 8,320,414 B2 | 11/2012 | Dawson et al. |
| 8,323,189 B2 | 12/2012 | Tran et al. |
| 8,325,612 B1 | 12/2012 | Ruiz et al. |
| 8,325,627 B2 | 12/2012 | Pratt, Jr. et al. |
| 8,330,649 B2 | 12/2012 | Menouar et al. |
| 8,332,055 B2 | 12/2012 | Veillette |
| 8,334,787 B2 | 12/2012 | Bushman et al. |
| 8,335,164 B2 | 12/2012 | Liu |
| 8,335,207 B2 | 12/2012 | Singh et al. |
| 8,335,814 B2 | 12/2012 | Jung et al. |
| 8,339,069 B2 | 12/2012 | Chemel et al. |
| 8,341,279 B2 | 12/2012 | Thubert et al. |
| 8,341,289 B2 | 12/2012 | Hellhake et al. |
| 8,345,098 B2 | 1/2013 | Grigsby et al. |
| 8,346,846 B2 | 1/2013 | Jung et al. |
| 8,352,420 B2 | 1/2013 | Jung et al. |
| 8,359,643 B2 | 1/2013 | Low et al. |
| 8,363,662 B2 | 1/2013 | Thubert et al. |
| 8,364,648 B1 | 1/2013 | Sim-Tang |
| 8,368,321 B2 | 2/2013 | Chemel et al. |
| 8,369,216 B2 | 2/2013 | Kan |
| 8,369,880 B2 | 2/2013 | Citrano, III et al. |
| 8,370,697 B2 | 2/2013 | Veillette |
| 8,373,362 B2 | 2/2013 | Chemel et al. |
| 8,373,556 B2 | 2/2013 | LaLonde et al. |
| 8,373,588 B2 | 2/2013 | Kuhn |
| 8,374,352 B2 | 2/2013 | Song et al. |
| 8,385,322 B2 | 2/2013 | Colling et al. |
| 8,385,550 B2 | 2/2013 | Sun |
| 8,386,278 B2 | 2/2013 | Maresh et al. |
| 8,392,541 B2 | 3/2013 | Agarwal et al. |
| 8,395,498 B2 | 3/2013 | Gaskill et al. |
| 8,396,602 B2 | 3/2013 | Imes et al. |
| 8,400,507 B2 | 3/2013 | Grigsby et al. |
| 8,401,564 B2 | 3/2013 | Singh |
| 8,406,153 B2 | 3/2013 | Vasseur et al. |
| 8,406,239 B2 | 3/2013 | Hurwitz et al. |
| 8,406,248 B2 | 3/2013 | Pratt, Jr. et al. |
| 8,406,252 B1 | 3/2013 | Wuthnow et al. |
| 8,428,517 B2 | 4/2013 | Ting et al. |
| 8,432,820 B2 | 4/2013 | Liu et al. |
| 8,441,958 B2 | 5/2013 | Thubert et al. |
| 8,442,520 B2 | 5/2013 | Alcorn |
| 8,447,419 B1 | 5/2013 | de Anda Fast |
| 8,447,849 B2 | 5/2013 | Shaffer et al. |
| 8,451,744 B2 | 5/2013 | Vasseur |
| 8,463,238 B2 | 6/2013 | Forstall et al. |

(56) References Cited

U.S. PATENT DOCUMENTS

| | | |
|---|---|---|
| 8,467,297 B2 | 6/2013 | Liu et al. |
| 8,467,991 B2 | 6/2013 | Khosravy et al. |
| 8,472,348 B2 | 6/2013 | Hui et al. |
| 8,473,989 B2 | 6/2013 | Bahl et al. |
| 8,475,368 B2 | 7/2013 | Tran et al. |
| 8,477,687 B2 | 7/2013 | Iwasa |
| 8,488,589 B2 | 7/2013 | Rudnick et al. |
| 8,489,701 B2 | 7/2013 | Manion et al. |
| 8,489,765 B2 | 7/2013 | Vasseur et al. |
| 8,494,458 B2 | 7/2013 | Tucker et al. |
| 8,495,244 B2 | 7/2013 | Bonar et al. |
| 8,496,181 B2 | 7/2013 | Wang |
| 8,498,224 B2 | 7/2013 | Thubert et al. |
| 8,502,148 B2 | 8/2013 | Wagner et al. |
| 8,502,640 B2 | 8/2013 | Veillette |
| 8,503,309 B2 | 8/2013 | Vasseur et al. |
| 8,503,677 B2 | 8/2013 | Yao et al. |
| 8,503,934 B2 | 8/2013 | Beghini et al. |
| 8,504,921 B2 | 8/2013 | Wilson et al. |
| 8,509,109 B2 | 8/2013 | Guo et al. |
| 8,509,248 B2 | 8/2013 | Mehta et al. |
| 8,509,762 B2 | 8/2013 | Li et al. |
| 8,509,765 B2 | 8/2013 | Alcorn |
| 8,514,915 B2 | 8/2013 | Binder et al. |
| 8,515,409 B2 | 8/2013 | Ramo et al. |
| 8,515,547 B2 | 8/2013 | Mass et al. |
| 8,520,535 B2 | 8/2013 | Dawson et al. |
| 8,520,676 B2 | 8/2013 | Shaffer et al. |
| 8,521,156 B2 | 8/2013 | Alcorn |
| 8,525,692 B2 | 9/2013 | Mason, Jr. et al. |
| 8,527,622 B2 | 9/2013 | Moreira Sa de Souza |
| 8,531,134 B2 | 9/2013 | Chemel et al. |
| 8,532,071 B2 | 9/2013 | Seok |
| 8,533,758 B2 | 9/2013 | Ruiz-Velasco |
| 8,536,802 B2 | 9/2013 | Chemel et al. |
| 8,537,714 B2 | 9/2013 | Liu |
| 8,543,249 B2 | 9/2013 | Chemel et al. |
| 8,544,023 B2 | 9/2013 | Sim-Tang et al. |
| 8,547,875 B2 | 10/2013 | Adams et al. |
| 8,547,943 B2 | 10/2013 | Bill |
| 8,547,981 B2 | 10/2013 | Wood |
| 8,548,607 B1 | 10/2013 | Belz et al. |
| 8,552,664 B2 | 10/2013 | Chemel et al. |
| 8,553,688 B2 | 10/2013 | Vasseur et al. |
| 8,559,442 B2 | 10/2013 | Vasseur et al. |
| 8,559,447 B2 | 10/2013 | Jetcheva et al. |
| 8,560,274 B2 | 10/2013 | Gregory et al. |
| 8,571,046 B2 | 10/2013 | Romero et al. |
| 8,571,518 B2 | 10/2013 | Imes et al. |
| 8,571,519 B2 | 10/2013 | Ginzboorg |
| 8,577,391 B2 | 11/2013 | Parker et al. |
| 8,578,015 B2 | 11/2013 | Billhartz |
| 8,578,054 B2 | 11/2013 | Thubert et al. |
| 8,582,470 B2 | 11/2013 | Collins et al. |
| 8,583,671 B2 | 11/2013 | Martin et al. |
| 8,583,978 B2 | 11/2013 | Shaffer et al. |
| 8,587,427 B2 | 11/2013 | LaLonde et al. |
| 8,588,108 B2 | 11/2013 | Vasseur et al. |
| 8,593,135 B2 | 11/2013 | Chemel et al. |
| 8,593,419 B2 | 11/2013 | Thorn |
| 8,593,986 B2 | 11/2013 | Vasseur et al. |
| 8,595,359 B2 | 11/2013 | Shaffer et al. |
| 8,600,830 B2 | 12/2013 | Hoffberg |
| 8,610,376 B2 | 12/2013 | Chemel et al. |
| 8,610,377 B2 | 12/2013 | Chemel et al. |
| 8,612,386 B2 | 12/2013 | Tien et al. |
| 8,612,583 B2 | 12/2013 | Hui et al. |
| 8,615,257 B2 | 12/2013 | Khosravy et al. |
| 8,619,576 B2 | 12/2013 | Vasseur et al. |
| 8,619,789 B2 | 12/2013 | Hui et al. |
| 8,620,772 B2 | 12/2013 | Owen |
| 8,620,784 B2 | 12/2013 | Dawson et al. |
| 8,621,577 B2 | 12/2013 | Choi et al. |
| 8,622,837 B2 | 1/2014 | Harris et al. |
| 8,624,771 B2 | 1/2014 | Kuhn |
| 8,625,515 B2 | 1/2014 | Liu et al. |
| 8,626,344 B2 | 1/2014 | Imes et al. |
| 8,630,177 B2 | 1/2014 | Vasseur et al. |
| 8,630,291 B2 | 1/2014 | Shaffer et al. |
| 8,630,314 B2 | 1/2014 | York |
| 8,631,101 B2 | 1/2014 | Shaffer et al. |
| 8,636,395 B2 | 1/2014 | Gergets et al. |
| 8,638,667 B2 | 1/2014 | Shaffer et al. |
| 8,638,763 B2 | 1/2014 | Comstock et al. |
| 8,652,038 B2 | 2/2014 | Tran et al. |
| 8,654,627 B2 | 2/2014 | Datz et al. |
| 8,654,649 B2 | 2/2014 | Vasseur et al. |
| 8,660,108 B2 | 2/2014 | Pratt, Jr. et al. |
| 8,665,890 B2 | 3/2014 | Yousefi'zadeh et al. |
| 8,667,084 B2 | 3/2014 | Vasseur et al. |
| 8,670,302 B2 | 3/2014 | Pan et al. |
| 8,670,416 B2 | 3/2014 | Ree et al. |
| 8,670,746 B2 | 3/2014 | Pratt, Jr. et al. |
| 8,670,749 B2 | 3/2014 | Pratt, Jr. et al. |
| 8,675,678 B2 | 3/2014 | Farrag et al. |
| 8,682,982 B2 | 3/2014 | Jung et al. |
| 8,687,558 B2 | 4/2014 | Jackson et al. |
| 8,693,322 B2 | 4/2014 | Zhang |
| 8,693,399 B2 | 4/2014 | Hirata et al. |
| 8,699,333 B2 | 4/2014 | Vasseur et al. |
| 8,699,368 B2 | 4/2014 | Hui et al. |
| 8,699,377 B2 | 4/2014 | Veillette |
| 8,700,301 B2 | 4/2014 | Khosravy et al. |
| 8,700,302 B2 | 4/2014 | Khosravy et al. |
| 8,700,536 B2 | 4/2014 | Richard |
| 8,706,072 B2 | 4/2014 | Kim et al. |
| 8,707,785 B2 | 4/2014 | Goodman et al. |
| 8,711,704 B2 | 4/2014 | Werb et al. |
| 8,712,711 B2 | 4/2014 | Nayar et al. |
| 8,715,072 B2 | 5/2014 | Harris et al. |
| 8,718,055 B2 | 5/2014 | Vasseur et al. |
| 8,718,093 B2 | 5/2014 | Zuniga et al. |
| 8,719,563 B2 | 5/2014 | Kojima et al. |
| 8,725,274 B2 | 5/2014 | Veillette |
| 8,727,978 B2 | 5/2014 | Tran et al. |
| 8,730,047 B2 | 5/2014 | Ridder et al. |
| 8,730,875 B2 | 5/2014 | Noda |
| 8,732,454 B2 | 5/2014 | Furukawa et al. |
| 8,737,268 B2 | 5/2014 | Jetcheva et al. |
| 8,738,944 B2 | 5/2014 | Addepalli et al. |
| 8,743,750 B2 | 6/2014 | Tourolle et al. |
| 8,743,768 B2 | 6/2014 | Vasseur et al. |
| 8,743,866 B2 | 6/2014 | Vasseur |
| 8,747,313 B2 | 6/2014 | Tran et al. |
| 8,750,100 B2 | 6/2014 | Guo et al. |
| 8,751,063 B2 | 6/2014 | Bernstein et al. |
| 8,751,644 B2 | 6/2014 | Bornhoevd et al. |
| 8,754,589 B2 | 6/2014 | Chemel et al. |
| 8,755,336 B2 | 6/2014 | Kondo et al. |
| 8,755,763 B2 | 6/2014 | Qureshey et al. |
| 8,756,449 B2 | 6/2014 | Shaffer et al. |
| 8,760,339 B2 | 6/2014 | Kuhn |
| 8,761,125 B2 | 6/2014 | Lea |
| 8,761,175 B2 | 6/2014 | Guha et al. |
| 8,761,285 B2 | 6/2014 | Addepalli et al. |
| 8,762,747 B2 | 6/2014 | Liu et al. |
| 8,762,852 B2 | 6/2014 | Davis et al. |
| 8,769,442 B2 | 7/2014 | Khosravy et al. |
| 8,774,050 B2 | 7/2014 | Vasseur et al. |
| 8,774,946 B2 | 7/2014 | Nrusimhan N.V. et al. |
| 8,780,201 B1 | 7/2014 | Scalisi et al. |
| 8,780,762 B2 | 7/2014 | Patil et al. |
| 8,780,920 B2 | 7/2014 | Bahr et al. |
| 8,780,953 B2 | 7/2014 | Shaffer et al. |
| 8,781,462 B2 | 7/2014 | Osterloh et al. |
| 8,787,246 B2 | 7/2014 | Brownrigg |
| 8,787,392 B2 | 7/2014 | Vasseur et al. |
| 8,787,944 B2 | 7/2014 | Smith |
| 8,788,516 B1 | 7/2014 | Jakubik |
| 8,792,154 B2 | 7/2014 | Moskowitz |
| 8,792,850 B2 | 7/2014 | Qureshey et al. |
| 8,792,880 B2 | 7/2014 | Alcorn |
| 8,797,878 B1 | 8/2014 | Ruiz et al. |
| 8,798,084 B2 | 8/2014 | Pratt, Jr. et al. |

(56) References Cited

U.S. PATENT DOCUMENTS

| | | |
|---|---|---|
| 8,798,094 B2 | 8/2014 | Wuthnow et al. |
| 8,799,220 B2 | 8/2014 | O'Malley |
| 8,799,510 B2 | 8/2014 | Vasseur et al. |
| 8,800,010 B2 | 8/2014 | Hui et al. |
| 8,804,603 B2 | 8/2014 | Powell, III et al. |
| 8,804,613 B2 | 8/2014 | Iwasa |
| 8,805,550 B2 | 8/2014 | Chemel et al. |
| 8,806,573 B2 | 8/2014 | Mahamuni et al. |
| 8,806,633 B2 | 8/2014 | Shaffer et al. |
| 8,811,188 B1 | 8/2014 | Bagchi et al. |
| 8,812,419 B1 | 8/2014 | Teller et al. |
| 8,817,665 B2 | 8/2014 | Thubert et al. |
| 8,818,522 B2 | 8/2014 | Mass et al. |
| 8,819,172 B2 | 8/2014 | Davis et al. |
| 8,819,191 B2 | 8/2014 | Hui et al. |
| 8,823,277 B2 | 9/2014 | Chemel et al. |
| 8,823,795 B1 | 9/2014 | Scalisi et al. |
| 8,824,336 B2 | 9/2014 | Jing et al. |
| 8,824,380 B2 | 9/2014 | Jetcheva et al. |
| 8,824,471 B2 | 9/2014 | Hui et al. |
| 8,830,837 B2 | 9/2014 | Vasseur et al. |
| 8,831,279 B2 | 9/2014 | Rodriguez et al. |
| 8,831,869 B2 | 9/2014 | Bai et al. |
| 8,832,428 B2 | 9/2014 | Ota et al. |
| 8,837,277 B2 | 9/2014 | Vasseur et al. |
| 8,841,859 B2 | 9/2014 | Chemel et al. |
| 8,842,180 B1 | 9/2014 | Kasmir et al. |
| 8,842,630 B2 | 9/2014 | Shaffer et al. |
| 8,843,156 B2 | 9/2014 | Prince et al. |
| 8,843,241 B2 | 9/2014 | Saberi et al. |
| 8,848,721 B2 | 9/2014 | Turunen et al. |
| 8,848,970 B2 | 9/2014 | Aller et al. |
| 8,855,794 B2 | 10/2014 | Imes et al. |
| 8,855,830 B2 | 10/2014 | Imes et al. |
| 8,856,252 B2 | 10/2014 | Leppanen et al. |
| 8,856,323 B2 | 10/2014 | Enns et al. |
| 8,861,390 B2 | 10/2014 | Hui et al. |
| 8,862,774 B2 | 10/2014 | Vasseur et al. |
| 8,866,408 B2 | 10/2014 | Chemel et al. |
| 8,867,329 B2 | 10/2014 | Hui et al. |
| 8,868,374 B2 | 10/2014 | Khosravy et al. |
| 8,872,379 B2 | 10/2014 | Ruiz et al. |
| 8,872,767 B2 | 10/2014 | Khosravy et al. |
| 8,872,915 B1 | 10/2014 | Scalisi et al. |
| 8,873,391 B2 | 10/2014 | Brown et al. |
| 8,873,526 B2 | 10/2014 | Shaffer et al. |
| 8,874,477 B2 | 10/2014 | Hoffberg |
| 8,874,788 B2 | 10/2014 | Vasseur et al. |
| 8,879,604 B2 | 11/2014 | Woo et al. |
| 8,879,613 B1 | 11/2014 | Hui et al. |
| 8,880,060 B2 | 11/2014 | Alcorn |
| 8,885,501 B2 | 11/2014 | Vasseur et al. |
| 8,885,630 B2 | 11/2014 | Pun et al. |
| 8,886,227 B2 | 11/2014 | Schmidt et al. |
| 8,891,534 B2 | 11/2014 | Vasseur et al. |
| 8,891,588 B1 | 11/2014 | Hui et al. |
| 8,892,135 B2 | 11/2014 | Werb et al. |
| 8,892,271 B2 | 11/2014 | Breed |
| 8,892,769 B2 | 11/2014 | Pratt, Jr. et al. |
| 8,902,794 B2 | 12/2014 | Shah et al. |
| 8,908,516 B2 | 12/2014 | Tzamaloukas et al. |
| 8,908,536 B2 | 12/2014 | Hui et al. |
| 8,908,621 B2 | 12/2014 | Vasseur et al. |
| 8,908,626 B2 | 12/2014 | Hui et al. |
| 8,918,480 B2 | 12/2014 | Qureshey et al. |
| 8,923,186 B1 | 12/2014 | daCosta |
| 8,923,422 B2 | 12/2014 | Hui et al. |
| 8,930,361 B2 | 1/2015 | Heinonen et al. |
| 8,934,366 B2 | 1/2015 | Hui et al. |
| 8,934,496 B2 | 1/2015 | Vasseur |
| 8,937,886 B2 | 1/2015 | Shaffer et al. |
| 8,938,270 B2 | 1/2015 | Singh |
| 8,942,197 B2 | 1/2015 | Rudnick et al. |
| 8,942,219 B2 | 1/2015 | Pratt, Jr. et al. |
| 8,942,301 B2 | 1/2015 | Hui et al. |
| 8,948,015 B2 | 2/2015 | Jetcheva et al. |
| 8,948,046 B2 | 2/2015 | Kang et al. |
| 8,948,229 B2 | 2/2015 | Hui et al. |
| 8,949,959 B2 | 2/2015 | Mahamuni et al. |
| 8,954,170 B2 | 2/2015 | Chemel et al. |
| 8,954,582 B2 | 2/2015 | Vasseur et al. |
| 8,958,339 B2 | 2/2015 | Le et al. |
| 8,959,539 B2 | 2/2015 | Adimatyam et al. |
| 8,964,762 B2 | 2/2015 | Hui et al. |
| 8,964,787 B2 | 2/2015 | McMullin et al. |
| 8,965,288 B2 | 2/2015 | Barnes et al. |
| 8,970,392 B2 | 3/2015 | LaLonde et al. |
| 8,970,394 B2 | 3/2015 | Veillette |
| 8,971,188 B2 | 3/2015 | Vasseur et al. |
| 8,972,159 B2 | 3/2015 | Ferreira et al. |
| 8,976,007 B2 | 3/2015 | Dugan et al. |
| 8,982,856 B2 | 3/2015 | Brownrigg |
| 8,988,990 B2 | 3/2015 | Stamatelakis et al. |
| 8,989,052 B2 | 3/2015 | Jing et al. |
| 9,001,676 B2 | 4/2015 | Hui et al. |
| 9,001,787 B1 | 4/2015 | Conant et al. |
| 9,013,173 B2 | 4/2015 | Veillette |
| 9,020,008 B2 | 4/2015 | Hui et al. |
| 9,026,273 B2 | 5/2015 | Ziarno |
| 9,026,279 B2 | 5/2015 | Ziarno |
| 9,026,336 B2 | 5/2015 | Ziarno |
| 9,041,349 B2 | 5/2015 | Bemmel et al. |
| 9,042,267 B2 | 5/2015 | Bill |
| 9,055,105 B2 | 6/2015 | Leppanen et al. |
| 9,055,521 B2 | 6/2015 | Iwasa |
| 9,060,322 B2 | 6/2015 | Zou et al. |
| 9,072,133 B2 | 6/2015 | Chemel et al. |
| 9,084,120 B2 | 7/2015 | Frei |
| 9,100,285 B1 | 8/2015 | Choudhury et al. |
| 9,100,989 B2 | 8/2015 | Ray et al. |
| 9,119,142 B2 | 8/2015 | Espina Perez et al. |
| 9,125,254 B2 | 9/2015 | Chemel et al. |
| 9,143,912 B2 | 9/2015 | Leppanen |
| 9,148,391 B2 | 9/2015 | Santoso et al. |
| 9,152,146 B2 | 10/2015 | Ziarno |
| 9,160,760 B2 | 10/2015 | Vasseur et al. |
| 9,167,496 B2 | 10/2015 | Jetcheva et al. |
| 9,172,662 B2 | 10/2015 | Chang et al. |
| 9,172,738 B1 | 10/2015 | daCosta |
| 9,173,245 B2 | 10/2015 | Bill |
| 9,185,521 B2 | 11/2015 | Leppanen et al. |
| 9,198,033 B2 | 11/2015 | Buddhikot et al. |
| 9,210,608 B2 | 12/2015 | Nakaya et al. |
| 9,231,965 B1 | 1/2016 | Vasseur et al. |
| 9,257,036 B2 | 2/2016 | Lund et al. |
| 9,258,765 B1 | 2/2016 | daCosta |
| 9,261,752 B2 | 2/2016 | Moskowitz |
| 9,276,845 B2 | 3/2016 | Shaffer et al. |
| 9,277,477 B2 | 3/2016 | Leppanen et al. |
| 9,281,865 B2 | 3/2016 | Hui et al. |
| 9,282,383 B2 | 3/2016 | Carr |
| 9,286,473 B2 | 3/2016 | Cruz Mota et al. |
| 9,294,488 B2 | 3/2016 | Vasseur et al. |
| 9,311,670 B2 | 4/2016 | Hoffberg |
| 9,350,683 B2 | 5/2016 | Hui et al. |
| 9,350,809 B2 | 5/2016 | Leppanen et al. |
| 9,356,858 B2 | 5/2016 | Vasseur et al. |
| 9,363,651 B1 | 6/2016 | daCosta |
| 9,386,502 B2 | 7/2016 | Reynaud et al. |
| 9,391,806 B2 | 7/2016 | Bruestle et al. |
| 9,398,035 B2 | 7/2016 | Vasseur et al. |
| 9,398,568 B2 | 7/2016 | Gorgen et al. |
| 9,407,646 B2 | 8/2016 | Cruz Mota et al. |
| 9,413,779 B2 | 8/2016 | Vasseur et al. |
| 9,417,691 B2 | 8/2016 | Belimpasakis et al. |
| 9,426,716 B2 | 8/2016 | Thubert et al. |
| 9,450,972 B2 | 9/2016 | Cruz Mota et al. |
| 9,450,978 B2 | 9/2016 | Vasseur et al. |
| 9,485,673 B2 | 11/2016 | Turunen et al. |
| 9,489,506 B2 | 11/2016 | Tyson et al. |
| 9,497,215 B2 | 11/2016 | Vasseur et al. |
| 9,503,466 B2 | 11/2016 | Vasseur et al. |
| 9,509,636 B2 | 11/2016 | Kalkunte |
| 9,521,158 B2 | 12/2016 | Di Pietro et al. |

(56) References Cited

U.S. PATENT DOCUMENTS

| | | | |
|---|---|---|---|
| 9,526,030 B2 | 12/2016 | Goergen et al. | |
| 9,526,061 B2 | 12/2016 | Jing et al. | |
| 9,542,642 B2 | 1/2017 | Wood | |
| 9,563,854 B2 | 2/2017 | Cruz Mota et al. | |
| 9,576,404 B2 | 2/2017 | Ziarno et al. | |
| 9,596,169 B2 | 3/2017 | Choudhury et al. | |
| 9,602,399 B2 | 3/2017 | Jetcheva et al. | |
| 9,608,912 B2 | 3/2017 | Thubert et al. | |
| 9,621,457 B2 | 4/2017 | Veillette | |
| 9,634,928 B2 | 4/2017 | Choudhury et al. | |
| 9,635,050 B2 | 4/2017 | Di Pietro et al. | |
| 9,648,544 B1 | 5/2017 | Arshad et al. | |
| 9,648,547 B1 | 5/2017 | Hart et al. | |
| 9,658,509 B2 | 5/2017 | Moskowitz | |
| 9,672,346 B2 | 6/2017 | Jarvis et al. | |
| 9,674,207 B2 | 6/2017 | Di Pietro et al. | |
| 9,686,369 B2 | 6/2017 | Patil et al. | |
| 9,686,792 B2 | 6/2017 | Jetcheva et al. | |
| 9,692,538 B2 | 6/2017 | Tyson et al. | |
| 9,693,179 B2 | 6/2017 | Lee et al. | |
| 9,693,297 B2 | 6/2017 | Condeixa et al. | |
| 9,699,768 B2 | 7/2017 | Werb | |
| 9,705,914 B2 | 7/2017 | Di Pietro et al. | |
| 9,706,420 B2 | 7/2017 | Patil et al. | |
| 9,706,598 B2 | 7/2017 | Bill | |
| 9,712,282 B2 | 7/2017 | Patil et al. | |
| 9,712,332 B2 | 7/2017 | Kalkunte | |
| 9,730,017 B2 | 8/2017 | Belimpasakis et al. | |
| 9,730,078 B2 | 8/2017 | Nixon et al. | |
| 9,730,100 B2 | 8/2017 | Dacosta | |
| 9,743,339 B2 | 8/2017 | Jetcheva et al. | |
| 9,766,619 B2 | 9/2017 | Ziarno | |
| 9,794,797 B2 | 10/2017 | Hoffberg | |
| 9,794,808 B2 | 10/2017 | Baroudi et al. | |
| 9,794,934 B2 | 10/2017 | Zhang et al. | |
| 9,816,897 B2 | 11/2017 | Ziarno | |
| 9,818,136 B1 | 11/2017 | Hoffberg | |
| 9,819,505 B2 | 11/2017 | Bhat et al. | |
| 9,820,658 B2 | 11/2017 | Tran | |
| 9,842,202 B2 | 12/2017 | Jarvis et al. | |
| 9,848,345 B1 | 12/2017 | Baroudi et al. | |
| 9,860,961 B2 | 1/2018 | Chemel et al. | |
| 9,866,395 B2 | 1/2018 | Bruestle et al. | |
| 9,870,537 B2 | 1/2018 | Vasseur et al. | |
| 10,160,012 B2 | 12/2018 | Sugiyama et al. | |
| 10,160,020 B2 | 12/2018 | Ohlscher et al. | |
| 10,944,669 B1 * | 3/2021 | Ramanathan | H04W 40/24 |
| 2002/0039357 A1 | 4/2002 | Lipasti et al. | |
| 2002/0071160 A1 | 6/2002 | Pavelchek | |
| 2002/0083316 A1 | 6/2002 | Platenberg et al. | |
| 2003/0048749 A1 | 3/2003 | Stamatelakis et al. | |
| 2003/0202468 A1 | 10/2003 | Cain et al. | |
| 2003/0202469 A1 | 10/2003 | Cain | |
| 2003/0202476 A1 | 10/2003 | Billhartz et al. | |
| 2003/0202512 A1 | 10/2003 | Kennedy | |
| 2003/0204587 A1 | 10/2003 | Billhartz | |
| 2003/0204616 A1 | 10/2003 | Billhartz et al. | |
| 2003/0212821 A1 | 11/2003 | Gillies et al. | |
| 2003/0212941 A1 | 11/2003 | Gillies et al. | |
| 2004/0022223 A1 | 2/2004 | Billhartz | |
| 2004/0022224 A1 | 2/2004 | Billhartz | |
| 2004/0028000 A1 | 2/2004 | Billhartz | |
| 2004/0028016 A1 | 2/2004 | Billhartz | |
| 2004/0029553 A1 | 2/2004 | Cain | |
| 2004/0042417 A1 | 3/2004 | Kennedy | |
| 2004/0042434 A1 | 3/2004 | Kennedy | |
| 2004/0057409 A1 | 3/2004 | Kennedy | |
| 2004/0090943 A1 | 5/2004 | da Costa et al. | |
| 2004/0160943 A1 | 8/2004 | Cain | |
| 2004/0174900 A1 | 9/2004 | Volpi et al. | |
| 2004/0203385 A1 | 10/2004 | Narayanan et al. | |
| 2004/0203820 A1 | 10/2004 | Billhartz | |
| 2004/0210657 A1 | 10/2004 | Narayanan et al. | |
| 2004/0218548 A1 | 11/2004 | Kennedy et al. | |
| 2004/0218582 A1 | 11/2004 | Kennedy et al. | |
| 2004/0219909 A1 | 11/2004 | Kennedy et al. | |
| 2004/0223497 A1 | 11/2004 | Sanderson et al. | |
| 2004/0223498 A1 | 11/2004 | Sanderson et al. | |
| 2004/0223499 A1 | 11/2004 | Sanderson et al. | |
| 2004/0223500 A1 | 11/2004 | Sanderson et al. | |
| 2004/0228343 A1 | 11/2004 | Molteni et al. | |
| 2004/0246144 A1 | 12/2004 | Siegel et al. | |
| 2004/0246975 A1 | 12/2004 | Joshi | |
| 2004/0264422 A1 | 12/2004 | Calcev et al. | |
| 2004/0264466 A1 | 12/2004 | Huang | |
| 2005/0041591 A1 | 2/2005 | Duggi et al. | |
| 2005/0053003 A1 | 3/2005 | Cain et al. | |
| 2005/0053004 A1 | 3/2005 | Cain et al. | |
| 2005/0053005 A1 | 3/2005 | Cain et al. | |
| 2005/0053007 A1 | 3/2005 | Bernhardt et al. | |
| 2005/0053094 A1 | 3/2005 | Cain et al. | |
| 2005/0054346 A1 | 3/2005 | Windham et al. | |
| 2005/0094620 A1 | 5/2005 | Calcev | |
| 2005/0105524 A1 | 5/2005 | Stevens et al. | |
| 2005/0136972 A1 | 6/2005 | Smith et al. | |
| 2005/0141706 A1 | 6/2005 | Regli et al. | |
| 2005/0157661 A1 | 7/2005 | Cho | |
| 2005/0249215 A1 | 11/2005 | Kelsey et al. | |
| 2005/0254473 A1 | 11/2005 | Preguica et al. | |
| 2005/0259588 A1 | 11/2005 | Preguica | |
| 2005/0259595 A1 | 11/2005 | Preguica | |
| 2005/0265259 A1 | 12/2005 | Thubert et al. | |
| 2005/0276608 A1 | 12/2005 | Pavelchek | |
| 2006/0002328 A1 | 1/2006 | Naghian | |
| 2006/0007863 A1 | 1/2006 | Naghian | |
| 2006/0023632 A1 | 2/2006 | Ozer et al. | |
| 2006/0030318 A1 | 2/2006 | Moore et al. | |
| 2006/0039371 A1 | 2/2006 | Castro et al. | |
| 2006/0092043 A1 | 5/2006 | Lagassey | |
| 2006/0095199 A1 | 5/2006 | Lagassey | |
| 2006/0120303 A1 | 6/2006 | Yarvis et al. | |
| 2006/0126535 A1 | 6/2006 | Sherman | |
| 2006/0126587 A1 | 6/2006 | Tsubota | |
| 2006/0136721 A1 | 6/2006 | Bruestle et al. | |
| 2006/0146846 A1 | 7/2006 | Yarvis et al. | |
| 2006/0159024 A1 | 7/2006 | Hester | |
| 2006/0167784 A1 | 7/2006 | Hoffberg | |
| 2006/0176829 A1 | 8/2006 | McLaughlin et al. | |
| 2006/0187893 A1 | 8/2006 | Joshi | |
| 2006/0195590 A1 | 8/2006 | Tsubota | |
| 2006/0227724 A1 | 10/2006 | Thubert et al. | |
| 2006/0229090 A1 | 10/2006 | LaDue | |
| 2006/0251115 A1 | 11/2006 | Haque et al. | |
| 2006/0253747 A1 | 11/2006 | Gillies et al. | |
| 2006/0268749 A1 | 11/2006 | Rahman et al. | |
| 2006/0268796 A1 | 11/2006 | Watanabe et al. | |
| 2006/0280131 A1 | 12/2006 | Rahman et al. | |
| 2006/0291404 A1 | 12/2006 | Thubert et al. | |
| 2006/0291485 A1 | 12/2006 | Thubert et al. | |
| 2006/0291864 A1 | 12/2006 | Pavelchek | |
| 2007/0025274 A1 | 2/2007 | Rahman et al. | |
| 2007/0038743 A1 | 2/2007 | Hellhake et al. | |
| 2007/0053053 A1 | 3/2007 | Moskowitz | |
| 2007/0087756 A1 | 4/2007 | Hoffberg | |
| 2007/0087758 A1 | 4/2007 | Norris et al. | |
| 2007/0110024 A1 | 5/2007 | Meier | |
| 2007/0115810 A1 | 5/2007 | Stamatelakis et al. | |
| 2007/0127503 A1 | 6/2007 | Zhao | |
| 2007/0153737 A1 | 7/2007 | Singh et al. | |
| 2007/0153764 A1 | 7/2007 | Thubert et al. | |
| 2007/0195400 A2 | 8/2007 | Moskowitz | |
| 2007/0195702 A1 | 8/2007 | Yuen et al. | |
| 2007/0197262 A1 | 8/2007 | Smith et al. | |
| 2007/0214046 A1 | 9/2007 | Falchuk et al. | |
| 2007/0223310 A1 | 9/2007 | Tran | |
| 2007/0223436 A1 | 9/2007 | Lenardi et al. | |
| 2007/0229231 A1 | 10/2007 | Hurwitz et al. | |
| 2007/0237150 A1 | 10/2007 | Wood | |
| 2007/0247368 A1 | 10/2007 | Wu | |
| 2007/0248117 A1 | 10/2007 | Zuniga et al. | |
| 2007/0258508 A1 | 11/2007 | Werb et al. | |
| 2007/0280174 A1 | 12/2007 | Pun | |
| 2007/0286097 A1 | 12/2007 | Davies | |
| 2007/0297371 A1 | 12/2007 | Lea | |

(56) References Cited

U.S. PATENT DOCUMENTS

| | | |
|---|---|---|
| 2007/0297808 A1 | 12/2007 | Pavelchek |
| 2008/0004904 A1 | 1/2008 | Tran |
| 2008/0025270 A1 | 1/2008 | Moon |
| 2008/0026781 A1 | 1/2008 | Ho et al. |
| 2008/0031203 A1 | 2/2008 | Bill |
| 2008/0036589 A1 | 2/2008 | Werb et al. |
| 2008/0037431 A1 | 2/2008 | Werb et al. |
| 2008/0037454 A1 | 2/2008 | Werb et al. |
| 2008/0037569 A1 | 2/2008 | Werb et al. |
| 2008/0040507 A1 | 2/2008 | Hsu et al. |
| 2008/0040509 A1 | 2/2008 | Werb et al. |
| 2008/0043316 A2 | 2/2008 | Moskowitz |
| 2008/0051036 A1 | 2/2008 | Vaswani et al. |
| 2008/0051099 A1 | 2/2008 | Moore et al. |
| 2008/0080520 A1 | 4/2008 | Westphal |
| 2008/0095059 A1 | 4/2008 | Chu |
| 2008/0101332 A1 | 5/2008 | Kim et al. |
| 2008/0107034 A1 | 5/2008 | Jetcheva et al. |
| 2008/0112422 A1 | 5/2008 | Jetcheva et al. |
| 2008/0117885 A1 | 5/2008 | Kim et al. |
| 2008/0117896 A1 | 5/2008 | Romero et al. |
| 2008/0123584 A1 | 5/2008 | Behrendt et al. |
| 2008/0130640 A1 | 6/2008 | Hurwitz et al. |
| 2008/0151916 A1 | 6/2008 | Jetcheva et al. |
| 2008/0159151 A1 | 7/2008 | Datz et al. |
| 2008/0159358 A1 | 7/2008 | Ruiz et al. |
| 2008/0170550 A1 | 7/2008 | Liu et al. |
| 2008/0183853 A1 | 7/2008 | Manion et al. |
| 2008/0186562 A2 | 8/2008 | Moskowitz |
| 2008/0192713 A1 | 8/2008 | Mighani et al. |
| 2008/0192724 A1 | 8/2008 | Kondo et al. |
| 2008/0198865 A1 | 8/2008 | Rudnick et al. |
| 2008/0200165 A1 | 8/2008 | Sharma et al. |
| 2008/0205385 A1 | 8/2008 | Zeng et al. |
| 2008/0240050 A1 | 10/2008 | Pun |
| 2008/0247353 A1 | 10/2008 | Pun |
| 2008/0252485 A1 | 10/2008 | Lagassey |
| 2008/0262893 A1 | 10/2008 | Hoffberg |
| 2008/0267116 A1 | 10/2008 | Kang et al. |
| 2008/0273487 A1 | 11/2008 | Naghian |
| 2008/0273518 A1 | 11/2008 | Pratt et al. |
| 2008/0279155 A1 | 11/2008 | Pratt, Jr. et al. |
| 2008/0279204 A1 | 11/2008 | Pratt, Jr. et al. |
| 2008/0291843 A1 | 11/2008 | Sonnenberg et al. |
| 2008/0310390 A1 | 12/2008 | Pun et al. |
| 2008/0320305 A1 | 12/2008 | Bruestle et al. |
| 2009/0010204 A1 | 1/2009 | Pratt, Jr. et al. |
| 2009/0010205 A1 | 1/2009 | Pratt, Jr. et al. |
| 2009/0046688 A1 | 2/2009 | Volpi et al. |
| 2009/0046732 A1 | 2/2009 | Pratt, Jr. et al. |
| 2009/0052429 A1 | 2/2009 | Pratt, Jr. et al. |
| 2009/0054033 A1 | 2/2009 | Pratt, Jr. et al. |
| 2009/0059814 A1 | 3/2009 | Nixon et al. |
| 2009/0061835 A1 | 3/2009 | Schmidt et al. |
| 2009/0062887 A1 | 3/2009 | Mass et al. |
| 2009/0075625 A1 | 3/2009 | Jackson et al. |
| 2009/0085769 A1 | 4/2009 | Thubert et al. |
| 2009/0086663 A1 | 4/2009 | Ho et al. |
| 2009/0086973 A1 | 4/2009 | Buddhikot et al. |
| 2009/0097490 A1 | 4/2009 | Sanderson et al. |
| 2009/0109898 A1 | 4/2009 | Adams et al. |
| 2009/0122797 A1 | 5/2009 | Thubert et al. |
| 2009/0135824 A1 | 5/2009 | Liu |
| 2009/0147702 A1 | 6/2009 | Buddhikot et al. |
| 2009/0168653 A1 | 7/2009 | St. Pierre et al. |
| 2009/0174569 A1 | 7/2009 | Smith et al. |
| 2009/0175238 A1 | 7/2009 | Jetcheva et al. |
| 2009/0185508 A1 | 7/2009 | Duke et al. |
| 2009/0210495 A1 | 8/2009 | Wolfson et al. |
| 2009/0215411 A1 | 8/2009 | Tucker et al. |
| 2009/0219194 A1 | 9/2009 | Menouar et al. |
| 2009/0228575 A1 | 9/2009 | Thubert et al. |
| 2009/0232119 A1 | 9/2009 | Seok |
| 2009/0245159 A1 | 10/2009 | Oyman et al. |
| 2009/0252134 A1 | 10/2009 | Schlicht et al. |
| 2009/0267540 A1 | 10/2009 | Chemel et al. |
| 2009/0286531 A1 | 11/2009 | Bhatt et al. |
| 2009/0290494 A1 | 11/2009 | Govindan et al. |
| 2009/0310488 A1 | 12/2009 | Mighani et al. |
| 2009/0323519 A1 | 12/2009 | Pun |
| 2010/0014444 A1 | 1/2010 | Ghanadan et al. |
| 2010/0017045 A1 | 1/2010 | Nesler et al. |
| 2010/0029216 A1 | 2/2010 | Jovicic et al. |
| 2010/0074194 A1 | 3/2010 | Liu et al. |
| 2010/0091924 A1 | 4/2010 | Wu |
| 2010/0097957 A1 | 4/2010 | Pirzada et al. |
| 2010/0118750 A1 | 5/2010 | Iwasa |
| 2010/0118775 A1 | 5/2010 | Iwasa |
| 2010/0118776 A1 | 5/2010 | Iwasa |
| 2010/0123572 A1 | 5/2010 | Thubert et al. |
| 2010/0124196 A1 | 5/2010 | Bonar et al. |
| 2010/0125671 A1 | 5/2010 | Thubert et al. |
| 2010/0142421 A1 | 6/2010 | Schlicht et al. |
| 2010/0142445 A1 | 6/2010 | Schlicht et al. |
| 2010/0142446 A1 | 6/2010 | Schlicht et al. |
| 2010/0142447 A1 | 6/2010 | Schlicht et al. |
| 2010/0142448 A1 | 6/2010 | Schlicht et al. |
| 2010/0142551 A1 | 6/2010 | Mosko et al. |
| 2010/0150120 A1 | 6/2010 | Schlicht et al. |
| 2010/0152619 A1 | 6/2010 | Kalpaxis et al. |
| 2010/0157888 A1 | 6/2010 | Aggarwal et al. |
| 2010/0157889 A1 | 6/2010 | Aggarwal et al. |
| 2010/0165995 A1 | 7/2010 | Mehta et al. |
| 2010/0172249 A1 | 7/2010 | Liu |
| 2010/0185753 A1 | 7/2010 | Liu et al. |
| 2010/0187832 A1 | 7/2010 | Holland et al. |
| 2010/0203878 A1 | 8/2010 | Kim et al. |
| 2010/0214960 A1 | 8/2010 | Bahr et al. |
| 2010/0226284 A1 | 9/2010 | Bill |
| 2010/0226342 A1 | 9/2010 | Colling et al. |
| 2010/0226381 A1 | 9/2010 | Mehta et al. |
| 2010/0232317 A1 | 9/2010 | Jing et al. |
| 2010/0232354 A1 | 9/2010 | Patil et al. |
| 2010/0235285 A1 | 9/2010 | Hoffberg |
| 2010/0254309 A1 | 10/2010 | Mankins et al. |
| 2010/0254312 A1 | 10/2010 | Kennedy |
| 2010/0259931 A1 | 10/2010 | Chemel et al. |
| 2010/0264846 A1 | 10/2010 | Chemel et al. |
| 2010/0270933 A1 | 10/2010 | Chemel et al. |
| 2010/0285774 A1 | 11/2010 | Ginzboorg |
| 2010/0295473 A1 | 11/2010 | Chemel et al. |
| 2010/0295474 A1 | 11/2010 | Chemel et al. |
| 2010/0295475 A1 | 11/2010 | Chemel et al. |
| 2010/0295482 A1 | 11/2010 | Chemel et al. |
| 2010/0296285 A1 | 11/2010 | Chemel et al. |
| 2010/0301768 A1 | 12/2010 | Chemel et al. |
| 2010/0301769 A1 | 12/2010 | Chemel et al. |
| 2010/0301770 A1 | 12/2010 | Chemel et al. |
| 2010/0301771 A1 | 12/2010 | Chemel et al. |
| 2010/0301773 A1 | 12/2010 | Chemel et al. |
| 2010/0301774 A1 | 12/2010 | Chemel et al. |
| 2010/0301834 A1 | 12/2010 | Chemel et al. |
| 2010/0302624 A1 | 12/2010 | Moskowitz |
| 2010/0302779 A1 | 12/2010 | Chemel et al. |
| 2010/0302945 A1 | 12/2010 | Leppanen et al. |
| 2010/0302947 A1 | 12/2010 | Leppanen et al. |
| 2010/0303082 A1 | 12/2010 | Wood |
| 2010/0304759 A1 | 12/2010 | Leppanen et al. |
| 2010/0306320 A1 | 12/2010 | Leppanen et al. |
| 2010/0308207 A1 | 12/2010 | Moskowitz |
| 2010/0309912 A1 | 12/2010 | Mehta et al. |
| 2010/0317420 A1 | 12/2010 | Hoffberg |
| 2010/0329274 A1 | 12/2010 | Romero et al. |
| 2011/0001436 A1 | 1/2011 | Chemel et al. |
| 2011/0001438 A1 | 1/2011 | Chemel et al. |
| 2011/0004513 A1 | 1/2011 | Hoffberg |
| 2011/0019678 A1 | 1/2011 | Mehta et al. |
| 2011/0047230 A1 | 2/2011 | McGee |
| 2011/0050457 A1 | 3/2011 | Billhartz et al. |
| 2011/0051662 A1 | 3/2011 | Billhartz et al. |
| 2011/0051702 A1 | 3/2011 | Billhartz et al. |
| 2011/0066297 A1 | 3/2011 | Saberi et al. |
| 2011/0075578 A1 | 3/2011 | Kim et al. |
| 2011/0078461 A1 | 3/2011 | Hellhake et al. |

(56) References Cited

U.S. PATENT DOCUMENTS

| | | |
|---|---|---|
| 2011/0080853 A1 | 4/2011 | Thubert et al. |
| 2011/0085530 A1 | 4/2011 | Hellhake et al. |
| 2011/0128884 A1 | 6/2011 | Reynaud et al. |
| 2011/0133924 A1 | 6/2011 | Thubert et al. |
| 2011/0149849 A1 | 6/2011 | Brownrig |
| 2011/0164527 A1 | 7/2011 | Mishra et al. |
| 2011/0187527 A1 | 8/2011 | Goodwill et al. |
| 2011/0188378 A1 | 8/2011 | Collins et al. |
| 2011/0188653 A1 | 8/2011 | Yao et al. |
| 2011/0204720 A1 | 8/2011 | Ruiz et al. |
| 2011/0211534 A1 | 9/2011 | Schmidt et al. |
| 2011/0216656 A1 | 9/2011 | Pratt, Jr. et al. |
| 2011/0223937 A1 | 9/2011 | Leppanen et al. |
| 2011/0228696 A1 | 9/2011 | Agarwal et al. |
| 2011/0228788 A1 | 9/2011 | Thubert et al. |
| 2011/0231573 A1 | 9/2011 | Vasseur et al. |
| 2011/0235550 A1 | 9/2011 | Adams et al. |
| 2011/0238751 A1 | 9/2011 | Belimpasakis et al. |
| 2011/0255479 A1 | 10/2011 | Liu |
| 2011/0267981 A1 | 11/2011 | Davies |
| 2011/0273568 A1 | 11/2011 | Lagassey |
| 2011/0280156 A1 | 11/2011 | Jing et al. |
| 2011/0302635 A1 | 12/2011 | Pratt, Jr. et al. |
| 2011/0305136 A1 | 12/2011 | Pan et al. |
| 2011/0314504 A1 | 12/2011 | Ruiz-Velasco |
| 2012/0005041 A1 | 1/2012 | Mehta et al. |
| 2012/0008527 A1 | 1/2012 | Le et al. |
| 2012/0014309 A1 | 1/2012 | Iizuka et al. |
| 2012/0023171 A1 | 1/2012 | Redmond |
| 2012/0039186 A1 | 2/2012 | Vasseur |
| 2012/0039190 A1 | 2/2012 | Vasseur |
| 2012/0063436 A1 | 3/2012 | Thubert et al. |
| 2012/0091315 A1 | 4/2012 | Moskowitz |
| 2012/0092984 A1 | 4/2012 | Mighani et al. |
| 2012/0092993 A1 | 4/2012 | Kan |
| 2012/0093134 A1 | 4/2012 | Zuniga et al. |
| 2012/0106428 A1 | 5/2012 | Schlicht et al. |
| 2012/0113807 A1 | 5/2012 | Vasseur et al. |
| 2012/0113863 A1 | 5/2012 | Vasseur et al. |
| 2012/0113901 A1 | 5/2012 | Jackson et al. |
| 2012/0113986 A1 | 5/2012 | Shaffer et al. |
| 2012/0116559 A1 | 5/2012 | Davis et al. |
| 2012/0117208 A1 | 5/2012 | Shaffer et al. |
| 2012/0117213 A1 | 5/2012 | Shaffer et al. |
| 2012/0117268 A1 | 5/2012 | Shaffer et al. |
| 2012/0117438 A1 | 5/2012 | Shaffer et al. |
| 2012/0134287 A1 | 5/2012 | Turunen et al. |
| 2012/0134548 A1 | 5/2012 | Rhoads et al. |
| 2012/0135723 A1 | 5/2012 | Ramo et al. |
| 2012/0154633 A1 | 6/2012 | Rodriguez |
| 2012/0155260 A1 | 6/2012 | Vasseur et al. |
| 2012/0155276 A1 | 6/2012 | Vasseur et al. |
| 2012/0155284 A1 | 6/2012 | Shaffer et al. |
| 2012/0155329 A1 | 6/2012 | Shaffer et al. |
| 2012/0155397 A1 | 6/2012 | Shaffer et al. |
| 2012/0155463 A1 | 6/2012 | Vasseur et al. |
| 2012/0155475 A1 | 6/2012 | Vasseur et al. |
| 2012/0155511 A1 | 6/2012 | Shaffer et al. |
| 2012/0158933 A1 | 6/2012 | Shetty et al. |
| 2012/0176931 A1 | 7/2012 | Jetcheva et al. |
| 2012/0182867 A1 | 7/2012 | Farrag et al. |
| 2012/0188968 A1 | 7/2012 | Mie et al. |
| 2012/0196636 A1 | 8/2012 | Pratt, Jr. et al. |
| 2012/0197988 A1 | 8/2012 | Leppanen et al. |
| 2012/0208592 A1 | 8/2012 | Davis et al. |
| 2012/0209808 A1 | 8/2012 | Tien et al. |
| 2012/0210233 A1 | 8/2012 | Davis et al. |
| 2012/0213124 A1 | 8/2012 | Vasseur et al. |
| 2012/0224743 A1 | 9/2012 | Rodriguez et al. |
| 2012/0230204 A1 | 9/2012 | Vasseur et al. |
| 2012/0230222 A1 | 9/2012 | Shaffer et al. |
| 2012/0230370 A1 | 9/2012 | Shaffer et al. |
| 2012/0233326 A1 | 9/2012 | Shaffer et al. |
| 2012/0233485 A1 | 9/2012 | Shaffer et al. |
| 2012/0235579 A1 | 9/2012 | Chemel et al. |
| 2012/0236724 A1 | 9/2012 | Rudnick et al. |
| 2012/0242501 A1 | 9/2012 | Tran et al. |
| 2012/0243408 A1 | 9/2012 | Leppanen et al. |
| 2012/0243621 A1 | 9/2012 | Hurwitz et al. |
| 2012/0254338 A1 | 10/2012 | Agarwal et al. |
| 2012/0257624 A1 | 10/2012 | Thubert et al. |
| 2012/0275642 A1 | 11/2012 | Aller et al. |
| 2012/0277893 A1 | 11/2012 | Davis et al. |
| 2012/0280908 A1 | 11/2012 | Rhoads et al. |
| 2012/0282905 A1 | 11/2012 | Owen |
| 2012/0282911 A1 | 11/2012 | Davis et al. |
| 2012/0284012 A1 | 11/2012 | Rodriguez et al. |
| 2012/0284122 A1 | 11/2012 | Brandis |
| 2012/0284339 A1 | 11/2012 | Rodriguez |
| 2012/0284593 A1 | 11/2012 | Rodriguez |
| 2012/0300758 A1 | 11/2012 | Turunen et al. |
| 2012/0307624 A1 | 12/2012 | Vasseur et al. |
| 2012/0307629 A1 | 12/2012 | Vasseur et al. |
| 2012/0307652 A1 | 12/2012 | Vasseur et al. |
| 2012/0307653 A1 | 12/2012 | Vasseur et al. |
| 2012/0307752 A1 | 12/2012 | Hirata et al. |
| 2012/0307825 A1 | 12/2012 | Hui et al. |
| 2012/0309417 A1 | 12/2012 | Blom et al. |
| 2012/0311334 A1 | 12/2012 | Bruestle et al. |
| 2012/0314660 A1 | 12/2012 | Leppanen et al. |
| 2012/0320768 A1 | 12/2012 | Shaffer et al. |
| 2012/0320790 A1 | 12/2012 | Shaffer et al. |
| 2012/0320923 A1 | 12/2012 | Vasseur et al. |
| 2012/0324273 A1 | 12/2012 | Shaffer et al. |
| 2012/0327792 A1 | 12/2012 | Guo et al. |
| 2012/0331316 A1 | 12/2012 | Liu et al. |
| 2013/0010590 A1 | 1/2013 | Vasseur et al. |
| 2013/0010615 A1 | 1/2013 | Hui et al. |
| 2013/0010798 A1 | 1/2013 | Shaffer et al. |
| 2013/0013806 A1 | 1/2013 | Woo et al. |
| 2013/0013809 A1 | 1/2013 | Vasseur et al. |
| 2013/0016612 A1 | 1/2013 | Vasseur et al. |
| 2013/0016757 A1 | 1/2013 | Hui et al. |
| 2013/0016758 A1 | 1/2013 | Hui et al. |
| 2013/0016759 A1 | 1/2013 | Hui et al. |
| 2013/0018993 A1 | 1/2013 | Hui et al. |
| 2013/0019005 A1 | 1/2013 | Hui et al. |
| 2013/0022042 A1 | 1/2013 | Vasseur et al. |
| 2013/0022046 A1 | 1/2013 | Vasseur et al. |
| 2013/0022053 A1 | 1/2013 | Vasseur et al. |
| 2013/0022083 A1 | 1/2013 | Vasseur et al. |
| 2013/0022084 A1 | 1/2013 | Vasseur et al. |
| 2013/0024149 A1 | 1/2013 | Nayar et al. |
| 2013/0024560 A1 | 1/2013 | Vasseur et al. |
| 2013/0028095 A1 | 1/2013 | Vasseur et al. |
| 2013/0028103 A1 | 1/2013 | Hui et al. |
| 2013/0028104 A1 | 1/2013 | Hui et al. |
| 2013/0028140 A1 | 1/2013 | Hui et al. |
| 2013/0028143 A1 | 1/2013 | Vasseur et al. |
| 2013/0028295 A1 | 1/2013 | Hui et al. |
| 2013/0031253 A1 | 1/2013 | Hui et al. |
| 2013/0033987 A1 | 2/2013 | Jetcheva et al. |
| 2013/0042301 A1 | 2/2013 | Mahamuni et al. |
| 2013/0045759 A1 | 2/2013 | Smith |
| 2013/0051250 A1 | 2/2013 | Shaffer et al. |
| 2013/0055383 A1 | 2/2013 | Shaffer et al. |
| 2013/0064072 A1 | 3/2013 | Vasseur et al. |
| 2013/0064102 A1 | 3/2013 | Chang et al. |
| 2013/0064137 A1 | 3/2013 | Santoso et al. |
| 2013/0067063 A1 | 3/2013 | Vasseur et al. |
| 2013/0069780 A1 | 3/2013 | Tran et al. |
| 2013/0070597 A1 | 3/2013 | Liu |
| 2013/0080307 A1 | 3/2013 | Hoffberg |
| 2013/0083658 A1 | 4/2013 | Vasseur et al. |
| 2013/0083688 A1 | 4/2013 | Mageed Al-Talib et al. |
| 2013/0086601 A1 | 4/2013 | Adimatyam et al. |
| 2013/0088999 A1 | 4/2013 | Thubert et al. |
| 2013/0089011 A1 | 4/2013 | Alapuranen |
| 2013/0094536 A1 | 4/2013 | Hui et al. |
| 2013/0094537 A1 | 4/2013 | Hui et al. |
| 2013/0100872 A1 | 4/2013 | Zou et al. |
| 2013/0100942 A1 | 4/2013 | Rudnick et al. |
| 2013/0111038 A1 | 5/2013 | Girard |
| 2013/0121331 A1 | 5/2013 | Vasseur et al. |

(56) References Cited

U.S. PATENT DOCUMENTS

| | | |
|---|---|---|
| 2013/0122807 A1 | 5/2013 | Tenarvitz et al. |
| 2013/0124883 A1 | 5/2013 | Addepalli et al. |
| 2013/0128773 A1 | 5/2013 | Thubert et al. |
| 2013/0143529 A1 | 6/2013 | Leppanen |
| 2013/0143535 A1 | 6/2013 | Leppanen et al. |
| 2013/0151563 A1 | 6/2013 | Addepalli et al. |
| 2013/0169838 A1 | 7/2013 | Rodriguez et al. |
| 2013/0170393 A1 | 7/2013 | Bill |
| 2013/0170394 A1 | 7/2013 | Bill |
| 2013/0177025 A1 | 7/2013 | Hurwitz et al. |
| 2013/0178718 A1 | 7/2013 | Tran et al. |
| 2013/0182566 A1 | 7/2013 | Goergen et al. |
| 2013/0183952 A1 | 7/2013 | Davis et al. |
| 2013/0188471 A1 | 7/2013 | Bade et al. |
| 2013/0188492 A1 | 7/2013 | Gorgen et al. |
| 2013/0188513 A1 | 7/2013 | Vasseur et al. |
| 2013/0188562 A1 | 7/2013 | Espina Perez et al. |
| 2013/0191688 A1 | 7/2013 | Agarwal et al. |
| 2013/0194970 A1 | 8/2013 | Bill |
| 2013/0195095 A1 | 8/2013 | Bill |
| 2013/0201316 A1 | 8/2013 | Binder et al. |
| 2013/0201869 A1 | 8/2013 | Wilden et al. |
| 2013/0201891 A1 | 8/2013 | Rodriguez et al. |
| 2013/0208583 A1 | 8/2013 | Guo et al. |
| 2013/0208714 A1 | 8/2013 | Bill |
| 2013/0215739 A1 | 8/2013 | Zhang |
| 2013/0215942 A1 | 8/2013 | Addepalli et al. |
| 2013/0219045 A1 | 8/2013 | Agarwal et al. |
| 2013/0219046 A1 | 8/2013 | Wetterwald et al. |
| 2013/0219478 A1 | 8/2013 | Mahamuni et al. |
| 2013/0223218 A1 | 8/2013 | Vasseur et al. |
| 2013/0223225 A1 | 8/2013 | Hui et al. |
| 2013/0223229 A1 | 8/2013 | Hui et al. |
| 2013/0223237 A1 | 8/2013 | Hui et al. |
| 2013/0223275 A1 | 8/2013 | Vasseur et al. |
| 2013/0227055 A1 | 8/2013 | Vasseur et al. |
| 2013/0227114 A1 | 8/2013 | Vasseur et al. |
| 2013/0227336 A1 | 8/2013 | Agarwal et al. |
| 2013/0242929 A1 | 9/2013 | Gorgen et al. |
| 2013/0250754 A1 | 9/2013 | Vasseur et al. |
| 2013/0250808 A1 | 9/2013 | Hui et al. |
| 2013/0250809 A1 | 9/2013 | Hui et al. |
| 2013/0250811 A1 | 9/2013 | Vasseur et al. |
| 2013/0250866 A1 | 9/2013 | Hui et al. |
| 2013/0250945 A1 | 9/2013 | Hui et al. |
| 2013/0250953 A1 | 9/2013 | Hui et al. |
| 2013/0250969 A1 | 9/2013 | Hui et al. |
| 2013/0251053 A1 | 9/2013 | Hui et al. |
| 2013/0251054 A1 | 9/2013 | Hui et al. |
| 2013/0259096 A1 | 10/2013 | Romero et al. |
| 2013/0279365 A1 | 10/2013 | Hui et al. |
| 2013/0279540 A1 | 10/2013 | Hui et al. |
| 2013/0283347 A1 | 10/2013 | Hui et al. |
| 2013/0283360 A1 | 10/2013 | Hui et al. |
| 2013/0286942 A1 | 10/2013 | Bonar et al. |
| 2013/0290560 A1 | 10/2013 | Chaki |
| 2013/0308495 A1 | 11/2013 | Tucker et al. |
| 2013/0310896 A1 | 11/2013 | Mass |
| 2013/0315131 A1 | 11/2013 | Brown et al. |
| 2013/0322294 A1 | 12/2013 | Jing et al. |
| 2013/0332010 A1 | 12/2013 | Ziarno |
| 2013/0332011 A1 | 12/2013 | Ziarno |
| 2013/0332025 A1 | 12/2013 | Ziarno |
| 2013/0336316 A1 | 12/2013 | Sudhaakar et al. |
| 2013/0342355 A1 | 12/2013 | Lund et al. |
| 2014/0006893 A1 | 1/2014 | Shetty et al. |
| 2014/0016643 A1 | 1/2014 | Vasseur et al. |
| 2014/0022906 A1 | 1/2014 | Vasseur et al. |
| 2014/0029432 A1 | 1/2014 | Vasseur et al. |
| 2014/0029445 A1 | 1/2014 | Hui et al. |
| 2014/0029603 A1 | 1/2014 | Nomura et al. |
| 2014/0029610 A1 | 1/2014 | Vasseur et al. |
| 2014/0029624 A1 | 1/2014 | Vasseur |
| 2014/0036912 A1 | 2/2014 | Hui et al. |
| 2014/0036925 A1 | 2/2014 | Hui et al. |
| 2014/0046882 A1 | 2/2014 | Wood |
| 2014/0055284 A1 | 2/2014 | Tran et al. |
| 2014/0064172 A1 | 3/2014 | Hui et al. |
| 2014/0068105 A1 | 3/2014 | Thubert et al. |
| 2014/0071837 A1 | 3/2014 | Werb et al. |
| 2014/0081793 A1 | 3/2014 | Hoffberg |
| 2014/0086041 A1 | 3/2014 | Shah et al. |
| 2014/0092752 A1 | 4/2014 | Hui et al. |
| 2014/0092753 A1 | 4/2014 | Vasseur et al. |
| 2014/0092769 A1 | 4/2014 | Shaffer et al. |
| 2014/0092905 A1 | 4/2014 | Hui et al. |
| 2014/0095864 A1 | 4/2014 | Dasgupta et al. |
| 2014/0105015 A1 | 4/2014 | Hui et al. |
| 2014/0105027 A1 | 4/2014 | Shaffer et al. |
| 2014/0105033 A1 | 4/2014 | Vasseur et al. |
| 2014/0105211 A1 | 4/2014 | Hui et al. |
| 2014/0108643 A1 | 4/2014 | Hui et al. |
| 2014/0114549 A1 | 4/2014 | Ziarno |
| 2014/0114554 A1 | 4/2014 | Lagassey |
| 2014/0114555 A1 | 4/2014 | Lagassey |
| 2014/0121476 A1 | 5/2014 | Tran et al. |
| 2014/0122673 A1 | 5/2014 | Shaffer et al. |
| 2014/0126348 A1 | 5/2014 | Mahamuni et al. |
| 2014/0126354 A1 | 5/2014 | Hui et al. |
| 2014/0126423 A1 | 5/2014 | Vasseur et al. |
| 2014/0126426 A1 | 5/2014 | Vasseur et al. |
| 2014/0126431 A1 | 5/2014 | Hui et al. |
| 2014/0126610 A1 | 5/2014 | Hui et al. |
| 2014/0129734 A1 | 5/2014 | Vasseur et al. |
| 2014/0129876 A1 | 5/2014 | Addepalli et al. |
| 2014/0136881 A1 | 5/2014 | Vasseur et al. |
| 2014/0167912 A1 | 6/2014 | Snyder et al. |
| 2014/0185499 A1 | 7/2014 | Ray et al. |
| 2014/0195668 A1 | 7/2014 | Selvakumar et al. |
| 2014/0219078 A1 | 8/2014 | Dasgupta et al. |
| 2014/0219103 A1 | 8/2014 | Vasseur et al. |
| 2014/0219114 A1 | 8/2014 | Vasseur et al. |
| 2014/0219133 A1 | 8/2014 | Dasgupta et al. |
| 2014/0222725 A1 | 8/2014 | Vasseur et al. |
| 2014/0222726 A1 | 8/2014 | Mermoud et al. |
| 2014/0222727 A1 | 8/2014 | Vasseur et al. |
| 2014/0222728 A1 | 8/2014 | Vasseur et al. |
| 2014/0222729 A1 | 8/2014 | Dasgupta et al. |
| 2014/0222730 A1 | 8/2014 | Vasseur et al. |
| 2014/0222731 A1 | 8/2014 | Mermoud et al. |
| 2014/0222748 A1 | 8/2014 | Mermoud et al. |
| 2014/0222975 A1 | 8/2014 | Vasseur et al. |
| 2014/0222983 A1 | 8/2014 | Dasgupta et al. |
| 2014/0222996 A1 | 8/2014 | Vasseur et al. |
| 2014/0222997 A1 | 8/2014 | Mermoud et al. |
| 2014/0222998 A1 | 8/2014 | Vasseur et al. |
| 2014/0223155 A1 | 8/2014 | Vasseur et al. |
| 2014/0245055 A1 | 8/2014 | Shaffer et al. |
| 2014/0247726 A1 | 9/2014 | Vasseur |
| 2014/0247752 A1 | 9/2014 | Patil et al. |
| 2014/0247804 A1 | 9/2014 | Wermuth et al. |
| 2014/0269402 A1 | 9/2014 | Vasseur et al. |
| 2014/0269413 A1 | 9/2014 | Hui et al. |
| 2014/0269487 A1 | 9/2014 | Kalkunte |
| 2014/0269514 A1 | 9/2014 | Leppanen et al. |
| 2014/0269592 A1 | 9/2014 | Addepalli et al. |
| 2014/0269759 A1 | 9/2014 | Thubert et al. |
| 2014/0273920 A1 | 9/2014 | Smith |
| 2014/0278475 A1 | 9/2014 | Tran |
| 2014/0281670 A1 | 9/2014 | Vasseur et al. |
| 2014/0285090 A1 | 9/2014 | Chemel et al. |
| 2014/0285095 A1 | 9/2014 | Chemel et al. |
| 2014/0286301 A1 | 9/2014 | Werb et al. |
| 2014/0286377 A1 | 9/2014 | Shaffer et al. |
| 2014/0293605 A1 | 10/2014 | Chemel et al. |
| 2014/0297206 A1 | 10/2014 | Silverman |
| 2014/0302774 A1 | 10/2014 | Burke et al. |
| 2014/0304427 A1 | 10/2014 | Vasseur et al. |
| 2014/0307614 A1 | 10/2014 | Ruiz et al. |
| 2014/0310243 A1 | 10/2014 | McGee et al. |
| 2014/0310349 A1 | 10/2014 | Rainisto |
| 2014/0314096 A1 | 10/2014 | Hui et al. |
| 2014/0320021 A1 | 10/2014 | Conwell |
| 2014/0321325 A1 | 10/2014 | Jing et al. |

(56) References Cited

U.S. PATENT DOCUMENTS

| | | |
|---|---|---|
| 2014/0324596 A1 | 10/2014 | Rodriguez |
| 2014/0324833 A1 | 10/2014 | Davis et al. |
| 2014/0328346 A1 | 11/2014 | Hui et al. |
| 2014/0330947 A1 | 11/2014 | Hui et al. |
| 2014/0333990 A1 | 11/2014 | Moskowitz |
| 2014/0349684 A1 | 11/2014 | Leppanen et al. |
| 2014/0355425 A1 | 12/2014 | Vasseur et al. |
| 2014/0357295 A1 | 12/2014 | Skomra et al. |
| 2014/0357312 A1 | 12/2014 | Davis et al. |
| 2014/0362847 A1 | 12/2014 | Turunen et al. |
| 2014/0369550 A1 | 12/2014 | Davis et al. |
| 2014/0372577 A1 | 12/2014 | Hui et al. |
| 2014/0372585 A1 | 12/2014 | Hui et al. |
| 2014/0376361 A1 | 12/2014 | Hui et al. |
| 2014/0376427 A1 | 12/2014 | Hui et al. |
| 2014/0379896 A1 | 12/2014 | Vasseur et al. |
| 2014/0379900 A1 | 12/2014 | Dasgupta et al. |
| 2015/0002336 A1 | 1/2015 | Thubert et al. |
| 2015/0003251 A1 | 1/2015 | Shaffer et al. |
| 2015/0003428 A1 | 1/2015 | Woo et al. |
| 2015/0016688 A1 | 1/2015 | Aller |
| 2015/0023174 A1 | 1/2015 | Dasgupta et al. |
| 2015/0023363 A1 | 1/2015 | Hui et al. |
| 2015/0023369 A1 | 1/2015 | Hui et al. |
| 2015/0026268 A1 | 1/2015 | Hui et al. |
| 2015/0030033 A1 | 1/2015 | Vasseur et al. |
| 2015/0043384 A1 | 2/2015 | Hui et al. |
| 2015/0043519 A1 | 2/2015 | Hui et al. |
| 2015/0055650 A1 | 2/2015 | Bhat et al. |
| 2015/0061511 A1 | 3/2015 | Chemel et al. |
| 2015/0063365 A1 | 3/2015 | Hui et al. |
| 2015/0071295 A1 | 3/2015 | Hui et al. |
| 2015/0072728 A1 | 3/2015 | Rodriguez et al. |
| 2015/0081840 A1 | 3/2015 | Patil et al. |
| 2015/0103813 A1 | 4/2015 | Jetcheva et al. |
| 2015/0110104 A1 | 4/2015 | Jetcheva et al. |
| 2015/0111591 A1 | 4/2015 | Hoffberg |
| 2015/0138977 A1 | 5/2015 | Dacosta |
| 2015/0155637 A1 | 6/2015 | Kuiper |
| 2015/0186642 A1 | 7/2015 | Cruz Mota et al. |
| 2015/0188754 A1 | 7/2015 | Stamatelakis et al. |
| 2015/0188934 A1 | 7/2015 | Vasseur et al. |
| 2015/0188935 A1 | 7/2015 | Vasseur et al. |
| 2015/0193693 A1 | 7/2015 | Vasseur et al. |
| 2015/0193694 A1 | 7/2015 | Vasseur et al. |
| 2015/0193695 A1 | 7/2015 | Cruz Mota et al. |
| 2015/0193696 A1 | 7/2015 | Vasseur et al. |
| 2015/0193697 A1 | 7/2015 | Vasseur et al. |
| 2015/0195145 A1 | 7/2015 | Di Pietro et al. |
| 2015/0195146 A1 | 7/2015 | Di Pietro et al. |
| 2015/0195296 A1 | 7/2015 | Vasseur et al. |
| 2015/0201415 A1 | 7/2015 | Jetcheva et al. |
| 2015/0207677 A1 | 7/2015 | Choudhury et al. |
| 2015/0207724 A1 | 7/2015 | Choudhury et al. |
| 2015/0244481 A1 | 8/2015 | Tyson et al. |
| 2015/0244484 A1 | 8/2015 | Tyson et al. |
| 2015/0244623 A1 | 8/2015 | Heydon et al. |
| 2015/0244648 A1 | 8/2015 | Tyson et al. |
| 2015/0245179 A1 | 8/2015 | Jarvis et al. |
| 2015/0245203 A1 | 8/2015 | Tyson et al. |
| 2015/0245231 A1 | 8/2015 | Jarvis et al. |
| 2015/0245412 A1 | 8/2015 | Tyson et al. |
| 2015/0263863 A1 | 9/2015 | Kalkunte |
| 2015/0304209 A1 | 10/2015 | Choudhury et al. |
| 2015/0316926 A1 | 11/2015 | Ziarno |
| 2015/0330869 A1 | 11/2015 | Ziarno |
| 2015/0341874 A1 | 11/2015 | Nguyen-Dang |
| 2015/0351084 A1 | 12/2015 | Werb |
| 2015/0363981 A1 | 12/2015 | Ziarno et al. |
| 2015/0381489 A1 | 12/2015 | Jetcheva et al. |
| 2015/0382275 A1 | 12/2015 | Pragada et al. |
| 2015/0382278 A1 | 12/2015 | Fallon et al. |
| 2016/0027054 A1 | 1/2016 | Leppanen et al. |
| 2016/0028750 A1 | 1/2016 | Di Pietro et al. |
| 2016/0028751 A1 | 1/2016 | Cruz Mota et al. |
| 2016/0028752 A1 | 1/2016 | Di Pietro et al. |
| 2016/0028754 A1 | 1/2016 | Cruz Mota et al. |
| 2016/0028755 A1 | 1/2016 | Vasseur et al. |
| 2016/0028762 A1 | 1/2016 | Di Pietro et al. |
| 2016/0028763 A1 | 1/2016 | Cruz Mota et al. |
| 2016/0028764 A1 | 1/2016 | Vasseur et al. |
| 2016/0029182 A1 | 1/2016 | Leppanen |
| 2016/0116819 A1 | 4/2016 | Moskowitz |
| 2016/0119739 A1 | 4/2016 | Hampel et al. |
| 2016/0127978 A1 | 5/2016 | Jing et al. |
| 2016/0142901 A1 | 5/2016 | Leppanen et al. |
| 2016/0183351 A1 | 6/2016 | Snyder et al. |
| 2016/0197831 A1 | 7/2016 | De Foy et al. |
| 2016/0198244 A1 | 7/2016 | Lund et al. |
| 2016/0212729 A1 | 7/2016 | Bulten et al. |
| 2016/0224951 A1 | 8/2016 | Hoffberg |
| 2016/0269976 A1 | 9/2016 | Jetcheva et al. |
| 2016/0277874 A1 | 9/2016 | Lee et al. |
| 2016/0302195 A1 | 10/2016 | Zhang et al. |
| 2016/0323012 A1 | 11/2016 | Kwon et al. |
| 2016/0323113 A1 | 11/2016 | Bruestle et al. |
| 2016/0366553 A1 | 12/2016 | Belimpasakis et al. |
| 2017/0019970 A1 | 1/2017 | Chemel et al. |
| 2017/0034760 A1 | 2/2017 | Ge |
| 2017/0041868 A1 | 2/2017 | Palin et al. |
| 2017/0048783 A1 | 2/2017 | Savolainen |
| 2017/0070942 A1 | 3/2017 | Denteneer et al. |
| 2017/0078400 A1 | 3/2017 | Binder et al. |
| 2017/0086279 A1 | 3/2017 | Chemel et al. |
| 2017/0099567 A1 | 4/2017 | Kwon et al. |
| 2017/0104727 A1 | 4/2017 | Jerkeby et al. |
| 2017/0104834 A1* | 4/2017 | Huang .................. H04L 67/10 |
| 2017/0135021 A1 | 5/2017 | Ko et al. |
| 2017/0149651 A1 | 5/2017 | Kalkunte |
| 2017/0149901 A1 | 5/2017 | Condeixa et al. |
| 2017/0161609 A1 | 6/2017 | Wood et al. |
| 2017/0181053 A1 | 6/2017 | Aoun et al. |
| 2017/0195826 A1 | 7/2017 | Shaikh et al. |
| 2017/0238197 A1 | 8/2017 | Baroudi et al. |
| 2017/0250856 A1 | 8/2017 | Jetcheva et al. |
| 2017/0250898 A1 | 8/2017 | Sakoda et al. |
| 2017/0251387 A1 | 8/2017 | Rossebo et al. |
| 2017/0259942 A1 | 9/2017 | Ziarno |
| 2017/0289812 A1 | 10/2017 | Werb |
| 2017/0294988 A1 | 10/2017 | Condeixa et al. |
| 2017/0295455 A1 | 10/2017 | Kwon |
| 2017/0310553 A1 | 10/2017 | Welters et al. |
| 2017/0311423 A1 | 10/2017 | Clark et al. |
| 2017/0317713 A1 | 11/2017 | Tsai et al. |
| 2017/0317906 A1 | 11/2017 | Tsai et al. |
| 2017/0318453 A1 | 11/2017 | Raghu et al. |
| 2017/0324618 A1 | 11/2017 | Lapukhov et al. |
| 2017/0325127 A1 | 11/2017 | Raghu et al. |
| 2017/0331754 A1* | 11/2017 | Wang .................. H04L 45/306 |
| 2017/0331899 A1 | 11/2017 | Binder et al. |
| 2017/0332439 A1 | 11/2017 | Savolainen et al. |
| 2018/0006833 A1 | 1/2018 | Tatlicioglu et al. |
| 2018/0007687 A1 | 1/2018 | Baldemair et al. |
| 2018/0013573 A1 | 1/2018 | Kalkunte |

* cited by examiner

Message contains id of the node that it got the message from first. E.g., B got it from A first, so it puts A in its re-broadcast in a specific field. F got it from C, so it puts C

SYSTEM AND METHOD FOR EFFICIENT NETWORK-WIDE BROADCAST IN A MULTI-HOP WIRELESS NETWORK USING PACKET ECHOS

CROSS REFERENCE TO RELATED APPLICATIONS

The present application is a Continuation of U.S. patent application Ser. No. 16/198,204, filed Nov. 21, 2018, now U.S. Pat. No. 10,944,669, issued Mar. 9, 2021, which claims benefit of priority from U.S. Provisional Patent Application No. 62/628,717, filed Feb. 9, 2018, the entirety of which is expressly incorporated herein by reference.

FIELD OF THE INVENTION

The present invention relates to the field of mesh network communication protocols.

BACKGROUND OF THE INVENTION

A mesh network, see en.wikipedia.org/wiki/Mesh_Network is a local network in which the infrastructure (i.e. bridges, switches and other infrastructure devices) connect directly, dynamically and non-hierarchically to as many other nodes as possible and cooperate with one another to efficiently route data from/to clients. This lack of dependency on one node allows for every node to participate in the relay of information. Mesh networks dynamically self-organize and self-configure, which can reduce installation overhead. The ability to self-configure enables dynamic distribution of workloads, particularly in the event that a few nodes should fail. This in turn contributes to fault-tolerance and reduced maintenance costs.

The invention pertains to the communication of a message from a message-generating source node to all reachable nodes in a Mobile Ad Hoc Network (MANET), a Mesh Network, or in general a wireless peer-to-peer, infrastructure-less multi-hop network. Such a procedure, often referred to as "broadcasting", "network-wide broadcasting", or "flooding" in the MANET/Mesh literature, is typically done by choosing a set of relaying nodes, which could be the set of all nodes or a subset thereof, depending upon the solution.

Two distinct types of ubiquitous wireless data communication networks have developed: cellular telephone networks having a maximum range of about 20-50 miles line of sight or 3 miles in hilly terrain, and short-range local-area computer networks (wireless local-area networks or WLANs) having a maximum range of about 0.2-0.5 miles (~1000-2500 feet IEEE-802.11n, 2.4 GHz) outdoors line of sight. IEEE 802.11ah is a wireless networking protocol published in 2017 (Wi-Fi HaLow) as an amendment of the IEEE 802.11-2007 wireless networking standard. It uses 900 MHz license exempt bands to provide extended range Wi-Fi networks, compared to conventional Wi-Fi networks operating in the 2.4 GHz and 5 GHz bands. It also benefits from lower energy consumption, allowing the creation of large groups of stations or sensors that cooperate to share signals, supporting the concept of the Internet of Things (IoT). en.wikipedia.org/wiki/IEEE 802.11ah. A benefit of 802.11ah is extended range, making it useful for rural communications and offloading cell phone tower traffic. The other purpose of the protocol is to allow low rate 802.11 wireless stations to be used in the sub-gigahertz spectrum. The protocol is one of the IEEE 802.11 technologies which is the most different from the LAN model, especially concerning medium contention. A prominent aspect of 802.11ah is the behavior of stations that are grouped to minimize contention on the air media, use relay to extend their reach, employ predefined wake/doze periods, are still able to send data at high speed under some negotiated conditions and use sectored antennas. It uses the 802.11a/g specification that is down sampled to provide 26 channels, each of them able to provide 100 kbit/s throughput. It can cover a one-kilometer radius. It aims at providing connectivity to thousands of devices under an access point. The protocol supports machine to machine (M2M) markets, like smart metering.

First, the cellular infrastructure for wireless telephony involves long-distance communication between mobile phones and central base-stations, where the base stations are typically linked to tall cell towers, connecting to the public switched telephone network and the Internet. The radio band for these long-range wireless networks is typically a regulated, licensed band, and the network is managed to combine both broad bandwidth (~5-20 MHz) and many simultaneous users. This should be contrasted with a short-range wireless computer network, which may link multiple users to a central router or hub, which router may itself have a wired connection to the Internet. A key example is Wi-Fi, which is managed according to the IEEE-802.11x communications standards, with an aggregate data rate theoretically over 1 gigabit per second (802.11ac) and a range that is typically much less than 100 m. Other known standard examples are known by the terms Bluetooth and ZigBee. The radio band for a WLAN is typically an unlicensed band, such as one of the ISM bands (industrial, scientific, and medical), or more recently, a whitespace band formerly occupied by terrestrial analog television (WSLAN). One implication of such an unlicensed band is the unpredictable presence of significant interference due to other classes of users, which tends to limit either the range, or the bandwidth, or both. For such local area networks, a short range (low power and high modulation rates) becomes advantageous for high rates of spatial band reuse and acceptable levels of interference.

Ad hoc networks or mesh networks are also known. These protocols permit peer-to-peer communications between devices over a variety of frequency bands, and a range of capabilities. In a multihop network, communications are passed from one node to another in series between the source and destination. Because of various risks, as the number of hops grows, the reliability of a communication successfully reaching its destination decreases, such that hop counts of more than 10 or 20 in a mobility permissive network are rarely considered feasible. A typical mesh network protocol maintains a routing table at each node, which is then used to control the communication. This routing table may be established proactively or reactively. In proactive routing, the network state information is pushed to the various nodes, often appended to other communications, such that when a communication is to be established, the nodes rely on the then-current routing information to control the communication. This paradigm suffers from the possibility of stale or incorrect routing information or overly burdensome administrative overhead, or both. Reactive routing seeks to determine the network state at the time of, and for the purpose of, a single set of communications, and therefore may require significant communications possibly far exceeding the amount of data to be communicated in order to establish a link. Because the network state is requested at the time of communication, there is less opportunity to piggyback the administrative information on other communications. There are also various hybrid ad hoc network routing protocols, which seek to compromise between these two strategies, and other paradigms as well. See, e.g., U.S. Pat. Nos. 6,584,080; 6,625,135; 6,628,620; 6,718,394; 6,754,192; 6,763,013; 6,763,014; 6,870,846; 6,894,985; 6,898,529; 6,906,741; 6,954,435; 6,961,310; 6,975,614; 6,977,608; 6,986,161; 7,007,102; 7,027,426; 7,028,687; 7,068,600; 7,068,605; 7,075,919; 7,079,552; 7,082,117; 7,085,290; 7,096,037; 7,142,866; 7,170,425; 7,176,807; 7,216,282; 7,251,238; 7,266,085; 7,281,057; 7,299,038; 7,299,042; 7,308,369; 7,308,370; 7,317,898; 7,327,998; 7,346,167; 7,348,895; 7,356,001; 7,362,711; 7,366,111; 7,366,544; 7,382,765; 7,389,295; 7,394,798; 7,394,826; 7,418,238; 7,420,944; 7,427,927; 7,428,221; 7,450,517; 7,453,864; 7,457,834; 7,468,954; 7,480,248; 7,495,578; 7,529,561; 7,535,883; 7,536,388; 7,539,759; 7,545,285; 7,567,577; 7,580,730; 7,580,782; 7,581,095; 7,587,001; 7,590,589; 7,599,696; 7,602,738; 7,616,961; 7,656,851; 7,657,354; 7,660,318; 7,660,950; 7,678,068; 7,693,484; 7,695,446; 7,702,594; 7,706,282; 7,706,842; 7,710,932; 7,719,988; 7,725,080; 7,729,336; 7,742,399; 7,742,430; 7,746,794; 7,753,795; 7,764,617; 7,778,235; 7,788,387; 7,808,985; 7,813,451; 7,817,623; 7,830,820; 7,843,861; 7,849,139; 7,852,826; 7,860,025; 7,860,081; 7,860,968; 7,873,019; 7,881,474; 7,886,075; 7,894,828; 7,898,993; 7,902,973; 7,905,640; 7,912,645; 7,924,796; 7,929,914; 7,936,732; 7,941,188; 7,944,878; 7,957,355; 7,961,650; 7,962,101; 7,962,154; 7,969,914; 7,970,418; 7,974,402; 7,978,062; 7,979,311; 7,983,835; 7,990,947; 7,996,558; 8,035,479; 8,040,863; 8,042,048; 8,059,620; 8,060,017; 8,060,308; 8,065,166; 8,065,411; 8,072,906; 8,073,384; 8,090,596; 8,099,108; 8,099,307; 8,108,228; 8,108,429; 8,115,617; 8,121,628; 8,121,870; 8,130,708; 8,131,569; 8,131,838; 8,134,950; 8,135,362; 8,138,934; 8,139,504; 8,144,596; 8,144,619; 8,151,140; 8,161,097; 8,170,577; 8,170,957; 8,171,364; 8,174,381; 8,18,0294; 8,184,681; 8,195,483; 8,195,628; 8,200,246; 8,203,463; 8,213,895; 8,239,169; 8,249,984; 8,256,681; 8,266,657; 8,271,449; 8,275,824; 8,289,182; 8,289,186; 8,300,615; 8,311,533; 8,315,231; 8,319,658; 8,319,833; 8,320,302; 8,320,414; 8,323,189; 8,325,612; 8,330,649; 8,332,055; 8,334,787; 8,335,207; 8,335,814; 8,341,279; 8,341,289; 8,345,098; 8,346,846; 8,352,420; 8,359,643; 8,363,662; 8,364,648; 8,369,880; 8,370,697; 8,373,556; 8,373,588; 8,374,352; 8,385,550; 8,386,278; 8,392,541; 8,395,498; 8,396,602; 8,400,507; 8,401,564; 8,406,153; 8,406,239; 8,406,252; 8,428,517; 8,441,958; 8,442,520; 8,447,419; 8,447,849; 8,451,744; 8,463,238; 8,467,991; 8,472,348; 8,473,989; 8,475,368; 8,489,765; 8,494,458; 8,495,244; 8,496,181; 8,502,148; 8,502,640; 8,503,309; 8,504,921; 8,509,762; 8,509,765; 8,514,915; 8,515,547; 8,520,535; 8,520,676; 8,521,156; 8,525,692; 8,527,622; 8,533,758; 8,544,023; 8,547,875; 8,548,607; 8,553,688; 8,559,442; 8,560,274; 8,571,046; 8,571,518; 8,577,391; 8,578,015; 8,578,054; 8,583,671; 8,583,978; 8,587,427; 8,588,108; 8,593,419; 8,593,986; 8,595,359; 8,600,830; 8,612,583; 8,615,257; 8,619,576; 8,619,789; 8,620,772; 8,620,784; 8,621,577; 8,622,837; 8,624,771; 8,625,515; 8,626,344; 8,630,177; 8,630,291; 8,630,314; 8,631,101; 8,636,395; 8,638,667; 8,638,763; 8,652,038; 8,654,627; 8,654,649; 8,665,890; 8,667,084; 8,670,416; 8,675,678; 8,682,982; 8,693,322; 8,699,333; 8,699,368; 8,699,377; 8,700,301; 8,700,302; 8,700,536; 8,707,785; 8,712,711; 8,715,072; 8,718,055; 8,719,563; 8,725,274; 8,727,978; 8,730,047; 8,730,875; 8,732,454; 8,738,944; 8,743,750; 8,743,768; 8,743,866; 8,747,313; 8,751,063; 8,751,644; 8,755,763; 8,756,449; 8,760,339; 8,761,175; 8,761,285; 8,762,852; 8,769,442; 8,774,050; 8,774,946; 8,780,201; 8,780,953; 8,781,462; 8,787,392; 8,787,944; 8,788,516; 8,792,850; 8,792,880; 8,797,878; 8,798,094; 8,799,220; 8,799,510; 8,800,010; 8,804,603; 8,806,633; 8,812,419; 8,817,665; 8,818,522; 8,819,172; 8,819,191; 8,823,795; 8,824,471; 8,830,837; 8,831,279; 8,831,869; 8,832,428; 8,837,277; 8,842,180; 8,842,630; 8,843,156; 8,848,970; 8,855,794; 8,855,830; 8,856,323; 8,861,390; 8,862,774; 8,867,329; 8,868,374; 8,872,379; 8,872,767; 8,872,915; 8,873,391; 8,873,526; 8,874,477; 8,874,788; 8,879,604; 8,879,613; 8,880,060; 8,885,501; 8,885,630; 8,886,227; 8,891,534; 8,891,588; 8,892,271; 8,908,516; 8,908,536; 8,908,621; 8,908,626; 8,918,480; 8,923,186; 8,923,422; 8,930,361; 8,934,366; 8,934,496; 8,937,886; 8,938,270; 8,942,301; 8,948,046; 8,948,229; 8,949,959; 8,954,582; 8,959,539; 8,964,762; 8,964,787; 8,965,288; 8,970,392; 8,970,394; 8,971,188; 8,972,159; 8,976,007; and Pub. Patent Appl. Nos. 20020039357; 20020071160; 20020083316; 20030202468; 20030202469; 20030202476; 20030202512; 20030204587; 20030204616; 20040022223; 20040022224; 20040028000; 20040028016; 20040029553; 20040042417; 20040042434; 20040057409; 20040160943; 20040174900; 20040203385; 20040203820; 20040210657; 20040218548; 20040218582; 20040219909; 20040223497; 20040223498; 20040223499; 20040223500; 20040228343; 20040264466; 20050041591; 20050053003; 20050053004; 20050053005; 20050053007; 20050053094; 20050054346; 20050141706; 20050157661; 20050254473; 20050259588; 20050259595; 20050265259; 20050276608; 20060002328; 20060007863; 20060023632; 20060030318; 20060092043; 20060095199; 20060126535; 20060167784; 20060176829; 20060227724; 20060229090; 20060251115; 20060291404; 20060291485; 20060291864; 20070038743; 20070087756; 20070087758; 20070110024; 20070153737; 20070153764; 20070214046; 20070223436; 20070229231; 20070280174; 20070286097; 20070297808; 20080040507; 20080051036; 20080051099; 20080117896; 20080130640; 20080159151; 20080159358; 20080240050; 20080247353; 20080252485; 20080262893; 20080267116; 20080273487; 20080291843; 20080310390; 20090046688; 20090061835; 20090062887; 20090086663; 20090097490; 20090185508; 20090210495; 20090215411; 20090219194; 20090228575; 20090323519; 20100014444; 20100017045; 20100097957; 20100123572; 20100124196; 20100125671; 20100152619; 20100187832; 20100235285; 20100254309; 20100317420; 20100329276; 20110004513; 20110078461; 20110080853; 20110085530; 20110187527 20110133924; 20110204720; 20110211534; 20110228696; 20110228788; 20110231573; 20110235550; 20110267981; 20110273568; 20110314504; 20120005041; 20120039186; 20120039190; 20120113807; 20120113863; 20120113986; 20120116559; 20120117208; 20120117213; 20120117268; 20120117438; 20120134548; 20120154633; 20120155260; 20120155276; 20120155284; 20120155329; 20120155397; 20120155463; 20120155475; 20120155511; 20120158933; 20120182867; 20120188968; 20120208592; 20120210233; 20120213124; 20120224743; 20120230204; 20120230222; 20120230370; 20120233326; 20120233485; 20120242501; 20120243621; 20120254338; 20120275642; 20120277893; 20120280908; 20120282905; 20120282911; 20120284012; 20120284122; 20120284339; 20120284593; 20120307624; 20120307629; 20120307652; 20120307653; 20120307825; 20120320768; 20120320790; 20120320923; 20120324273; 20130010590; 20130010615; 20130010798; 20130013806; 20130013809; 20130016612; 20130016757; 20130016758; 20130016759; 20130018993; 20130019005; 20130022042; 20130022046; 20130022053; 20130022083; 20130022084; 20130024149; 20130024560; 20130028095; 20130028103; 20130028104; 20130028140; 20130028143; 20130028295; 20130031253; 20130045759; 20130051250;

20130055383; 20130064072; 20130067063; 20130069780; 20130080307; 20130083658; 20130086601; 20130088999; 20130089011; 20130094536; 20130094537; 20130111038; 20130121331; 20130122807; 20130124883; 20130128773; 20130151563; 20130169838; 20130177025; 20130178718; 20130183952; 20130188471; 20130188513; 20130191688; 20130201891; 20130215739; 20130215942; 20130219045; 20130219046; 20130219478; 20130223218; 20130223225; 20130223229; 20130223237; 20130223275; 20130227055; 20130227114; 20130227336; 20130250754; 20130250808; 20130250809; 20130250811; 20130250866; 20130250945; 20130250953; 20130250969; 20130251053; 20130251054; 20130259096; 20130279365; 20130279540; 20130283347; 20130283360; 20130286942; 20130290560; 20130308495; 20130310896; 20130315131; 20130336316; 20140006893; 20140016643; 20140022906; 20140029432; 20140029445; 20140029603; 20140029610; 20140029624; 20140036912; 20140036925; 20140055284; 20140064172; 20140068105; 20140081793; 20140092752; 20140092753; 20140092769; 20140092905; 20140095864; 20140105015; 20140105027; 20140105033; 20140105211; 20140108643; 20140114554; 20140114555; 20140121476; 20140122673; 20140126348; 20140126354; 20140126423; 20140126426; 20140126431; 20140126610; 20140129734; 20140129876; 20140136881; 20140195668; 20140219078; 20140219103; 20140219114; 20140219133; 20140222725; 20140222726; 20140222727; 20140222728; 20140222729; 20140222730; 20140222731; 20140222748; 20140222975; 20140222983; 20140222996; 20140222997; 20140222998; 20140223155; 20140245055; 20140247726; 20140247804; 20140269402; 20140269413; 20140269592; 20140269759; 20140273920; 20140281670; 20140286377; 20140297206; 20140302774; 20140304427; 20140307614; 20140314096; 20140320021; 20140324596; 20140324833; 20140328346; 20140330947; 20140355425; 20140357295; 20140357312; 20140369550; 20140372577; 20140372585; 20140376361; 20140376427; 20140379896; 20140379900; 20150002336; 20150003251; 20150003428; 20150016688; 20150023174; 20150023363; 20150023369; 20150026268; 20150030033; 20150043384; 20150043519; 20150055650; 20150063365; 20150071295; 20150072728. See also, U.S. Pat. and Pat. App. Nos. 20100203878, 20080200165, 20120023171, 20100029216, 20090286531, 20090109898, U.S. Pat. Nos. 6,415,158, 8,503,934, 8,165,585, 7,127,250, 8,112,082, 7,512,094, 8,126,473, 7,400,903, 6,647,426, 8,248,947, WO 2012/078565, WO 2012/116489. These citations deal with wireless communications systems with two available bands, which may comprise both licensed and unlicensed bands.

A simple implementation of a multihop mesh network idea is to have every node in the network relay any packet received by it, so that all nodes in range receive it. However, with this, the total number of transmissions per minute would be $m \times N^2$, where N is the number of nodes, and m is the number of packets originated packets per minute, which does not scale as N increases (e.g. with N=20, m=2, there are approximately 800 transmissions per minute)

The problem of pruning the set of nodes to contain this "broadcast storm" has been studied. It is sometimes referred to as the problem of finding a (minimum) connected dominating set, that is, finding a set of nodes that are connected (like a skeleton/backbone), and that are "dominating", i.e., every node is either in the set or adjacent to some node in the set.

In graph theory, a connected dominated set and a maximum leaf spanning tree are two closely related structures defined on an undirected graph. See, en.wikipedia.org/wiki/Connected dominating set. A connected dominating set of a graph G is a set D of vertices with two properties: 1) Any node in D can reach any other node in D by a path that stays entirely within D. That is, D induces a connected subgraph of G. 2) Every vertex in G either belongs to D or is adjacent to a vertex in D. That is, D is a dominating set of G. A minimum connected dominating set of a graph G is a connected dominating set with the smallest possible cardinality among all connected dominating sets of G. The connected domination number of G is the number of vertices in the minimum connected dominating set. Sampathkumar, E.; Walikar, H B (1979), "The connected domination number of a graph", J. Math. Phys. Sci, 13 (6): 607-613.

Any spanning tree T of a graph G has at least two leaves, vertices that have only one edge of T incident to them. A maximum leaf spanning tree is a spanning tree that has the largest possible number of leaves among all spanning trees of G. The max leaf number of G is the number of leaves in the maximum leaf spanning tree. Fellows, Michael; Lokshtanov, Daniel; Misra, Neeldhara; Mnich, Matthias; Rosamond, Frances; Saurabh, Saket (2009), "The complexity ecology of parameters: an illustration using bounded max leaf number", Theory of Computing Systems, 45 (4): 822-848, doi:10.1007/s00224-009-9167-9.

If d is the connected domination number of an n-vertex graph G, where n>2, and l is its max leaf number, then the three quantities d, l, and n obey the simple equation n=d+l. If D is a connected dominating set, then there exists a spanning tree in G whose leaves include all vertices that are not in D: form a spanning tree of the subgraph induced by D, together with edges connecting each remaining vertex v that is not in D to a neighbor of v in D. This shows that l≥n—d. In the other direction, if T is any spanning tree in G, then the vertices of T that are not leaves form a connected dominating set of G. This shows that n−l≤d. Putting these two inequalities together proves the equality n=d+l. Therefore, in any graph, the sum of the connected domination number and the max leaf number equals the total number of vertices. Computationally, this implies that determining the connected domination number is equally difficult as finding the max leaf number.

It is NP-complete to test whether there exists a connected dominating set with size less than a given threshold, or equivalently to test whether there exists a spanning tree with at least a given number of leaves. Therefore, it is believed that the minimum connected dominating set problem and the maximum leaf spanning tree problem cannot be solved in polynomial time. When viewed in terms of approximation algorithms, connected domination and maximum leaf spanning trees are not the same: approximating one to within a given approximation ratio is not the same as approximating the other to the same ratio. There exists an approximation for the minimum connected dominating set that achieves a factor of 2 ln Δ+O(1), where Δ is the maximum degree of a vertex in G.[4] The maximum leaf spanning tree problem is MAX-SNP hard, implying that no polynomial time approximation scheme, that is, an approximation within (1-e) of optimal for some small e, is likely. Galbiati, G.; Maffioli, F.; Morzenti, A. (1994), "A short note on the approximability of the maximum leaves spanning tree problem", Information Processing Letters, 52 (1): 45-49, doi:10.1016/0020-0190 (94)90139-2. However, it can be approximated to within a factor of 2 in polynomial time. Solis-Oba, Roberto (1998), "2-approximation algorithm for finding a spanning tree with maximum number of leaves", Proc. 6th European Symposium on Algorithms (ESA'98), Lecture Notes in Computer Science, 1461, Springer-Verlag, pp. 441-452, doi:10.1007/3-540-68530-8_37.

Both problems may be solved, on n-vertex graphs, in time O(1.9ⁿ). Fernau, Henning; Kneis, Joachim; Kratsch, Dieter; Langer, Alexander; Liedloff, Mathieu; Raible, Daniel; Rossmanith, Peter (2011), "An exact algorithm for the maximum leaf spanning tree problem", Theoretical Computer Science, 412 (45): 6290-6302, doi:10.1016/j.tcs.2011.07.011, MR 2883043.

The maximum leaf problem is fixed-parameter tractable, meaning that it can be solved in time exponential in the number of leaves but only polynomial in the input graph size. The klam value of these algorithms (intuitively, a number of leaves up to which the problem can be solved within a reasonable amount of time) has gradually increased, as algorithms for the problem have improved, to approximately 37, Binkele-Raible, Daniel; Fernau, Henning (2014), "A parameterized measure-and-conquer analysis for finding a k-leaf spanning tree in an undirected graph", Discrete Mathematics & Theoretical Computer Science, 16 (1): 179-200, MR 3188035, and it has been suggested that at least 50 should be achievable. Fellows, Michael R.; McCartin, Catherine; Rosamond, Frances A.; Stege, Ulrike (2000), "Coordinatized kernels and catalytic reductions: an improved FPT algorithm for max leaf spanning tree and other problems", FST-TCS 2000: Foundations of Software Technology and Theoretical Computer Science, Lecture Notes in Comput. Sci., 1974, Springer, Berlin, pp. 240-251, doi:10.1007/3-540-44450-5_19, MR 1850108. In graphs of maximum degree three, the connected dominating set and its complementary maximum leaf spanning tree problem can be solved in polynomial time, by transforming them into an instance of the matroid parity problem for linear matroids. Ueno, Shuichi; Kajitani, Yoji; Gotoh, Shin'ya (1988), "On the non-separating independent set problem and feedback set problem for graphs with no vertex degree exceeding three", Proceedings of the First Japan Conference on Graph Theory and Applications (Hakone, 1986), Discrete Mathematics, 72 (1-3): 355-360, doi:10.1016/0012-365X(88)90226-9, MR 0975556.

Connected dominating sets are useful in the computation of routing for mobile ad hoc networks. In this application, a small connected dominating set is used as a backbone for communications, and nodes that are not in this set communicate by passing messages through neighbors that are in the set. Wu, J.; Li, H. (1999), "On calculating connected dominating set for efficient routing in ad hoc wireless networks", Proceedings of the 3rd International Workshop on Discrete Algorithms and Methods for Mobile Computing and Communications, ACM, pp. 7-14, doi:10.1145/313239.313261.

The max leaf number has been employed in the development of fixed-parameter tractable algorithms: several NP-hard optimization problems may be solved in polynomial time for graphs of bounded max leaf number. Fellows, Michael; Lokshtanov, Daniel; Misra, Neeldhara; Mnich, Matthias; Rosamond, Frances; Saurabh, Saket (2009), "The complexity ecology of parameters: an illustration using bounded max leaf number", Theory of Computing Systems, 45 (4): 822-848, doi:10.1007/s00224-009-9167-9.

Most, if not all of the methods are either centralized, use control packets (such as "Hellos"), position information, global information, or some combination of these. However, this centralization imposes architectural constraints and creates critical points of failure servicing multiple other nodes; that is, a functional node, with communication access to another functional node, may nevertheless suffer impaired communication because a failure of performance or communication in a third node.

Mesh topology may be contrasted with conventional star/tree local network topologies in which the bridges/switches are directly linked to only a small subset of other bridges/switches, and the links between these infrastructure neighbors are hierarchical.

Flooding is a simple computer network routing algorithm in which every incoming packet is sent through every outgoing link except the one it arrived on. Flooding is used in bridging and in systems such as Usenet and peer-to-peer file sharing and as part of some routing protocols, including OSPF, DVMRP, and those used in ad-hoc wireless networks (WANETs). There are generally two types of flooding available, uncontrolled flooding and controlled flooding. Uncontrolled flooding is the fatal law of flooding. All nodes have neighbors and route packets indefinitely. More than two neighbors creates a broadcast storm. Controlled flooding can be performed by two algorithms to make it reliable, SNCF (Sequence Number Controlled Flooding) and RPF (Reverse Path Forwarding). In SNCF, the node attaches its own address and sequence number to the packet, since every node has a memory of addresses and sequence numbers. If it receives a packet in memory, it drops it immediately while in RPF, the node will only send the packet forward. If it is received from the next node, it sends it back to the sender.

In a mesh network, each node acts as both a transmitter and a receiver. Each node tries to forward every message to every one of its neighbors except the source node. This results in every message eventually being delivered to all reachable parts of the network. Algorithms may need to be more complex than this, since, in some case, precautions have to be taken to avoid wasted duplicate deliveries and infinite loops, and to allow messages to eventually expire from the system.

A variant of flooding called selective flooding partially addresses these issues by only sending packets to routers in the same direction. In selective flooding the routers don't send every incoming packet on every line but only on those lines which are going approximately in the right direction. If a packet can be delivered, it will (probably multiple times). Since flooding naturally utilizes every path through the network, it will also use the shortest path.

Duplicate packets may circulate forever, unless certain precautions are taken: a hop count or a time to live (TTL) count may be included with each packet. This value may take into account the number of nodes that a packet may have to pass through on the way to its destination. Each node can keep track of every packet seen and only forward each packet once. Further, if determinable, a network topology without loops may be enforced.

See,

Tanenbaum, Andrew S.; Wetherall, David J. (2010 Mar. 23). Computer Networks (5th ed.). Pearson Education. p. 368-370. ISBN 978-0-13-212695-3.

Rahman, Ashikur; Olesinski, Wlodek; Gburzynski, Pawel (2004). "Controlled Flooding in Wireless Ad-hoc Networks" (PDF). International Workshop on Wireless Ad-Hoc Networks. Edmonton, Alberta, Canada: University of Alberta, Department of Computing Science. Archived (PDF) from the original on 2017 Feb. 10. Retrieved 2015 Oct. 15.

www.cs.cornell.edu/projects/quicksilver/ricochet.html

The Spanning Tree Protocol (STP) is a network protocol that builds a loop-free logical topology for Ethernet networks. The basic function of STP is to prevent bridge loops and the broadcast radiation that results from them. Spanning tree also allows a network design to include backup links to provide fault tolerance if an active link fails. As the name suggests, STP creates a spanning tree within a network of connected layer-2 bridges, and disables those links that are not part of the spanning tree, leaving a single active path between any two network nodes.

Thomas Zahn, Greg O'Shea and Antony Rowstron, "An Empirical Study of Flooding in Mesh Networks", Microsoft Research, Cambridge, UK, April 2009 Technical Report MSR-TR-2009-37 discusses flooding in wireless mesh networks. Efficient flooding is important, as naive flooding can generate broadcast storms. In naive flooding, all nodes rebroadcast received flood messages once.

Naive flooding is the simplest of the three protocols. A source node initiates a flood by creating a packet, which includes a unique identifier, and broadcasts the packet using a standard 802.11a broadcast frame at 6 Mbps. When a node receives a broadcast packet, using the unique identifier, it checks if the packet has already been received, in which case the node drops this duplicate. Otherwise, this is the first time the node has seen the packet, so the node records the associated unique identifier and schedules a local rebroadcast of the packet, with a delay selected uniformly at random from the range 0 to 10 mS. This jitter ensures that self-interference from other nodes rebroadcasting the flood packet should be low. This is conceptually simple, with all nodes rebroadcasting each packet at most once. A small amount of short term state is maintained to log the packet identifiers seen. In naive flooding, each node can receive a copy of the flood packet from each one-hop neighbor.

This is inefficient, and an optimization has been proposed wherein, rather than having all nodes rebroadcast every flood message, a subset of the nodes is selected to rebroadcast. This is achieved by each node selecting a subset of its one-hop neighbors, referred to as the relay set, that provide complete coverage of the node's two-hop neighbors. Only the relays of a node will rebroadcast flood messages received from that node. When a flood is initiated by a source node, there are a set of nodes that rebroadcast the flood across the mesh network, and we refer to this set as the union relay set for that source node. For each source, there exists a specific union relay set.

See, 20180013573; 20180007687; 20180006833; 20170332439; 20170331899; 20170325127; 20170324618; 20170318453; 20170317906; 20170317713; 20170311423; 20170310553; 20170295455; 20170294988; 20170289812; 20170259942; 20170251387; 20170250898; 20170250856; 20170238197; 20170195826; 20170181053; 20170161609; 20170149901; 20170149651; 20170135021; 20170104727; 20170099567; 20170086279; 20170078400; 20170070942; 20170048783; 20170041868; 20170034760; 20170019970; 20160366553; 20160323113; 20160323012; 20160302195; 20160277874; 20160269976; 20160224951; 20160212729; 20160198244; 20160197831; 20160183351; 20160142901; 20160127978; 20160119739; 20160116819; 20160029182; 20160028764; 20160028763; 20160028762; 20160028755; 20160028754; 20160028752; 20160028751; 20160028750; 20160027054; 20150382278; 20150382275; 20150381489; 20150363981; 20150351084; 20150341874; 20150330869; 20150316926; 20150304209; 20150263863; 20150245412; 20150245231; 20150245203; 20150245179; 20150244648; 20150244623; 20150244484; 20150244481; 20150207724; 20150207677; 20150201415; 20150195296; 20150195146; 20150195145; 20150193697; 20150193696; 20150193695; 20150193694; 20150193693; 20150188935; 20150188934; 20150188754; 20150186642; 20150155637; 20150138977; 20150111591; 20150110104; 20150103813; 20150081840; 20150061511; 20150055650; 20150030033; 20150002336; 20140372585; 20140362847; 20140349684; 20140333990; 20140321325; 20140310349; 20140310243; 20140293605; 20140286301; 20140285095; 20140285090; 20140278475; 20140269514; 20140269487; 20140247752; 20140185499; 20140167912; 20140114549; 20140092769; 20140086041; 20140081793; 20140071837; 20140068105; 20140046882; 20130342355; 20130332025; 20130332011; 20130332010; 20130322294; 20130279540; 20130242929; 20130208714; 20130208583; 20130201869; 20130201316; 20130195095; 20130194970; 20130188562; 20130188492; 20130182566; 20130170394; 20130170393; 20130143535; 20130143529; 20130100942; 20130100872; 20130094536; 20130083688; 20130070597; 20130064137; 20130064102; 20130051250; 20130042301; 20130033987; 20130028295; 20130028095; 20130022084; 20130016758; 20120331316; 20120327792; 20120320923; 20120314660; 20120311334; 20120309417; 20120307752; 20120300758; 20120257624; 20120243408; 20120236724; 20120235579; 20120209808; 20120197988; 20120196636; 20120176931; 20120155463; 20120135723; 20120134287; 20120113901; 20120106428; 20120093134; 20120092993; 20120092984; 20120091315; 20120063436; 20120014309; 20120008527; 20110305136; 20110302635; 20110280156; 20110255479; 20110238751; 20110223937; 20110216656; 20110188653; 20110188378; 20110164527; 20110149849; 20110128884; 20110085530; 20110078461; 20110075578; 20110066297; 20110051702; 20110051662; 20110050457; 20110047230; 20110019678; 20110004513; 20110001438; 20110001436; 20100317420; 20100309912; 20100308207; 20100306320; 20100304759; 20100303082; 20100302947; 20100302945; 20100302779; 20100302624; 20100301834; 20100301774; 20100301773; 20100301771; 20100301770; 20100301769; 20100301768; 20100296285; 20100295482; 20100295475; 20100295474; 20100295473; 20100285774; 20100270933; 20100264846; 20100259931; 20100254312; 20100235285; 20100232354; 20100232317; 20100226381; 20100226342; 20100226284; 20100214960; 20100185753; 20100172249; 20100165995; 20100157889; 20100157888; 20100150120; 20100142551; 20100142448; 20100142447; 20100142446; 20100142445; 20100142421; 20100118776; 20100118775; 20100118750; 20100097957; 20100091924; 20100074194; 20090310488; 20090290494; 20090267540; 20090252134; 20090245159; 20090232119; 20090228575; 20090175238; 20090174569; 20090168653; 20090147702; 20090135824; 20090122797; 20090086973; 20090085769; 20090075625; 20090059814; 20090054033; 20090052429; 20090046732; 20090010205; 20090010204; 20080320305; 20080310390; 20080279204; 20080279155; 20080273518; 20080205385; 20080198865; 20080192724; 20080192713; 20080186562; 20080183853; 20080170550; 20080151916; 20080123584; 20080117885; 20080112422; 20080107034; 20080101332; 20080095059; 20080080520; 20080043316; 20080040509; 20080037569; 20080037454; 20080037431; 20080036589; 20080031203; 20080026781; 20080025270; 20080004904; 20070297371; 20070258508; 20070248117; 20070247368; 20070237150; 20070223310; 20070197262; 20070195702; 20070195400; 20070153764; 20070127503; 20070115810; 20070110024; 20070087756; 20070053053; 20070038743; 20070025274; 20060291485; 20060280131; 20060268796; 20060268749; 20060253747; 20060195590; 20060187893; 20060167784; 20060159024; 20060146846; 20060136721; 20060126587; 20060120303; 20060039371; 20050249215; 20050136972; 20050105524; 20050094620; 20040264422; 20040246975; 20040246144; 20040090943; 20030212941; 20030212821; 20030048749; U.S. Pat. Nos. 9,870,537; 9,866,395; 9,860,961; 9,848,345; 9,842,202; 9,820,658; 9,819,505; 9,818,136; 9,816,897; 9,794,934; 9,794,808; 9,794,797; 9,766,619; 9,743,339; 9,730,100; 9,730,078; 9,730,017; 9,712,332; 9,712,282; 9,706,598; 9,706,420; 9,705,914; 9,699,768; 9,693,297;

9,693,179; 9,692,538; 9,686,792; 9,686,369; 9,674,207; 9,672,346; 9,658,509; 9,648,547; 9,648,544; 9,635,050; 9,634,928; 9,621,457; 9,608,912; 9,602,399; 9,596,169; 9,576,404; 9,563,854; 9,542,642; 9,526,061; 9,526,030; 9,521,158; 9,509,636; 9,503,466; 9,497,215; 9,489,506; 9,485,673; 9,450,978; 9,450,972; 9,426,716; 9,417,691; 9,413,779; 9,407,646; 9,398,568; 9,398,035; 9,391,806; 9,386,502; 9,363,651; 9,356,858; 9,350,809; 9,350,683; 9,311,670; 9,294,488; 9,286,473; 9,282,383; 9,281,865; 9,277,477; 9,276,845; 9,261,752; 9,258,765; 9,257,036; 9,231,965; 9,210,608; 9,198,033; 9,185,521; 9,173,245; 9,172,738; 9,172,662; 9,167,496; 9,160,760; 9,152,146; 9,148,391; 9,143,912; 9,125,254; 9,119,142; 9,100,989; 9,100,285; 9,084,120; 9,072,133; 9,060,322; 9,055,521; 9,055,105; 9,042,267; 9,041,349; 9,026,336; 9,026,279; 9,026,273; 9,020,008; 9,013,173; 9,001,787; 9,001,676; 8,989,052; 8,988,990; 8,982,856; 8,970,394; 8,958,339; 8,954,170; 8,948,015; 8,942,219; 8,942,197; 8,923,186; 8,908,626; 8,908,621; 8,902,794; 8,892,769; 8,892,135; 8,891,534; 8,885,630; 8,874,477; 8,866,408; 8,856,252; 8,848,721; 8,843,241; 8,841,859; 8,832,428; 8,824,380; 8,824,336; 8,823,277; 8,811,188; 8,806,573; 8,805,550; 8,804,613; 8,798,084; 8,792,154; 8,787,246; 8,780,920; 8,780,762; 8,762,747; 8,761,125; 8,755,336; 8,754,589; 8,750,100; 8,737,268; 8,725,274; 8,718,093; 8,711,704; 8,706,072; 8,699,377; 8,693,399; 8,687,558; 8,670,749; 8,670,746; 8,670,302; 8,660,108; 8,630,291; 8,612,386; 8,610,377; 8,610,376; 8,600,830; 8,593,135; 8,582,470; 8,578,054; 8,571,519; 8,559,447; 8,553,688; 8,552,664; 8,547,981; 8,547,943; 8,543,249; 8,537,714; 8,536,802; 8,532,071; 8,531,134; 8,515,409; 8,509,248; 8,509,109; 8,503,677; 8,498,224; 8,489,701; 8,488,589; 8,477,687; 8,467,297; 8,432,820; 8,406,248; 8,385,322; 8,373,362; 8,370,697; 8,369,216; 8,368,321; 8,341,289; 8,339,069; 8,335,164; 8,334,787; 8,332,055; 8,325,627; 8,315,231; 8,314,717; 8,300,538; 8,270,302; 8,255,469; 8,232,745; 8,230,108; 8,228,954; 8,217,805; 8,213,409; 8,203,464; 8,199,753; 8,194,541; 8,171,364; 8,169,974; 8,155,008; 8,144,596; 8,138,934; 8,138,690; 8,135,021; 8,130,663; 8,125,928; 8,120,839; 8,107,397; 8,098,421; 8,085,686; 8,081,658; 8,077,663; 8,064,416; 8,060,017; 8,059,620; 8,041,369; 8,031,605; 7,995,501; 7,990,897; 7,957,410; 7,924,722; 7,881,206; 7,859,465; 7,848,702; 7,847,734; 7,800,812; 7,796,511; 7,787,480; 7,787,361; 7,778,235; 7,760,735; 7,751,420; 7,720,037; 7,715,396; 7,701,858; 7,688,847; 7,675,882; 7,675,863; 7,668,173; 7,664,538; 7,664,111; 7,653,011; 7,643,467; 7,626,967; 7,626,966; 7,606,178; 7,596,152; 7,590,589; 7,580,380; 7,567,577; 7,466,665; 7,463,907; 7,463,612; 7,451,365; 7,423,985; 7,394,774; 7,367,497; 7,324,824; 7,315,548; 7,271,736; 7,230,916; 7,224,642; 7,069,483; 7,061,925; 6,421,349.

A. Iwata, C.-C. Chiang, G. Pei, M. Gerla, and T.-W. Chen. Scalable Routing Strategies for Ad Hoc Wireless Networks. In IEEE Journal on Selected Areas in Communications, Special Issue on Ad-Hoc Networks, pp. 1369-1379, August 1999.

A. Qayyum, L. Viennot, and A. Laouiti. Multipoint relaying: An efficient technique for flooding in mobile wireless networks. Technical Report 3898, INRIA—Rapport de recherche, 2000.

A. Savvides, C. C. Han and M. B. Srivastava. Dynamic Fine-Grained Localization in Ad-Hoc Networks of Sensors. In Proceedings of MOBICOM'01, July 2001.

B. Das and V. Bharghavan. Routing in Ad hoc Networks using Minimum Connected Dominating Sets (MCDS), Proceedings of 1997 IEEE International Conference on Communications (ICC'97), 1997.

Brad Williams, Tracy Camp. Comparison of broadcasting techniques for mobile ad hoc networks. Proceedings of the third ACM international symposium on Mobile ad hoc networking & computing, June 2002

C. Ho, K. Obraczka, G. Tsudik, and K. Viswanath. Flooding for reliable multicast in multi-hop ad hoc networks. In Proceedings of the International Workshop on Discrete Algorithms and Methods for Mobile Computing and Communication (DIALM), pages 64-71, 1999.

C. E. Perkins and P. Bhagwat. Highly Dynamic Destination Sequenced Distance Vector Routing (DSDV) for mobile computers. In proceedings of ACM SIGCOMM, pp. 234-244, 1994.

C. E. Perkins. Ad hoc on-demand distance vector routing, Internet Draft, Internet Engineering Task Force, work in progress, December 1997.

C.-H. Toh. A novel distributed routing protocol to support ad-hoc mobile computing, Proceeding of 15th IEEE Annual International Phoenix Conference on Computer Communications, pp. 480-486, 1996.

C-C. Chiang, H. Wu, W. Liu and M. Gerla. Routing in Clustered, Multihop, Mobile Wireless Networks with Fading Channel, The IEEE International Conference on Networks, pages 197-211, Singapore, April 1997.

D. Niculescu and B. Nath. Ad Hoc Positioning System (APS) using AoA. INFOCOM'03, San Francisco, Calif.

D. B. Johnson and D. A. Maltz. Dynamic Source Routing in mobile ad hoc net-works, Mobile Computing, (Ed. T. Imielinski and H. Korth), Kluwer Academic Publishers, 1996.

E. Pagani and G. P. Rossi. Reliable broadcast in mobile multi-hop packet networks, Proceedings of the third annual ACM/IEEE International Conference on mobile computing and networking (MOBICOM'97), pp. 34-42, 1997.

G. Dommety and R. Jain. Potential networking applications of global positioning systems (GPS). Tech. Rep. TR-24, CS Dept., The Ohio State University, April 1996.

H. Lim and C. Kim. Multicast tree construction and flooding in wireless ad hoc networks. In Proceedings of the ACM International Workshop on Modeling, Analysis and Simulation of Wireless and Mobile Systems (MSWIM), 2000.

Haas, Halpern, Li. Gossip based Ad Hoc Routing. In IEEE INFOCOM, June 2002.

I. Chlamtac and O. Weinstein. The wave expansion approach to broadcasting in multi-hop radio networks. IEEE Trans. Commun., vol. 39, pp. 426-433, March 1991.

I. Gaber and Y. Mansour. Broadcast in radio networks. In Proc. 6th Annu. ACM-SIAM Symp. Discrete Algorithms, San Francisco, Calif., January 1995, pp. 577-585.

I. Stojmenovic, M. Seddigh, and J. Zunic. Internal node based broadcasting in wireless networks. In Proceedings of the Hawaii International Conference on System Sciences (HICSS), 2001.

J. Jetcheva, Y. Hu, D. Maltz, and D. Johnson. A simple protocol for multicast and broadcast in mobile ad hoc networks. Internet Draft: draft-ietf-manet-simple-mbcast-01.txt, July 2001.

J. Li, C. Blake, D. S. J. De Couto, H. I. Lee, and R. Morris. Capacity of ad hoc wireless networks. In Proc. Seventh Annual ACM/IEEE International Conference on Mobile Computing and Networking (MobiCom), 2001.

J. Sucec and I. Marsic. An efficient distributed network-wide broadcast algorithm for mobile ad hoc networks. CAIP Technical Report 248—Rutgers University, September 2000.

J. Wu and H. Li. On calculating connected dominating sets for efficient routing in ad hoc wireless networks. In Proceedings of the International Workshop on Discrete Algorithms and methods for Mobile Computing and Communication (DIAL-M), pages 7-14, 1999.

J. P. Macker and M. S. Corson. Mobile Ad hoc networking and IETF Mobile computing and communication review, 2(1):9-14, January 1998.

Jie Wu and Fei Dai. Broadcasting in Ad Hoc Networks Based on Self-Pruning. In Proceedings of IEEE INFOCOM 2003, San Francisco, Calif.

Kershner, R. The Number of Circles Covering a Set. Amer. J. Math. 61, 665-671, 1939.

M. Sanchez. Mobility models. www.disca.upv.es/misan/mobmodel.htm, 1998.

M. Sun and T. H. Lai. Location Aided Broadcast in Wireless Ad Hoc Network Systems.

Proc. IEEE WCNC 2002, pp. 597-602, March 2002.

M. K. Denko and W. Goddard. Limited Flooding in Mobile Ad hoc Networks. In proceedings of the 14th MSc/PhD Annual Conference in Computer Science, Golden Gate, South Africa, pp. 21-24, June 1999.

M. K. Denko and W. Goddard. Routing Algorithms in Mobile Ad hoc Networks using Clustering Proceedings of 1998 MSc/PhD annual Conference, University of Stellenbosch, South Africa, pp. 6-18, July 1998.

M. K. Denko and W. Goddard: Clustering in Mobile Ad hoc Networks. In proceedings of the 5th International Conference in Communication systems (AFRICOM 2001), Cape Town, South Africa, May 2001.

M. M. Zonoozi and P. Dassanayake. User mobility modeling and characterisation of mobility patterns. IEEE Journal of Selected Areas in Communications, 15(7):1239-1252, September 1997.

M. S. Corson and A. Ephremides. A highly adaptive distributed routing algorithm for mobile wireless networks. ACM/Baltzer Wireless Networks Journal, 1(1):61-81, 1995.

N. Alon, A. Bar-Noy, N. Linial, and D. Peleg. A lower bound for radio broadcast. J. Comput. Syst. Sci., vol. 43, pp. 290-298, October 1991.

O. Lesser, R. Rom. Routing by controlled flooding in communication networks in proceeding of IEEE INFOCOM'90, (San Francisco, Calif.), pp. 910-917, June 1990.

P. Bahl and V. N. Padmanabhan. RADAR: An In-Building RF-Based User Location and Tracking System. In Proceedings of the IEEE INFOCOM'00.

P. Krishna, M. Chatterjee, N. H. Vaidya and D. K. Pradhan. A Cluster-based Approach for Routing in Ad hoc Networks. In proceedings of Second USENIX Symposium on mobile and Location Independent Computing, pp. 1-10, January 1996.

R. Bagrodia and R. A. Meyer. PARSEC User Manual, Release 1.0, UCLA Parallel Computing Laboratory, University of California, Los Angeles, February 1998.

R. Dube. Signal Stability based adaptive routing for Ad Hoc Mobile Networks. IEEE Personal Communications, pp. 36-45, February 1997.

S. Basagni, I. Chlamtac, V. R. Syrotiuk and B. A. Woodward. A Distance Routing Effect Algorithm for Mobility (DREAM), Proceedings of the fourth Annual mobile computing and networking, October 1998.

S. Guha and S. Khuller. Approximation algorithms for connected dominating sets. In Proceedings of European Symposium on Algorithms (ESA), 1996.

S. Murthy and J. J. Garcia-Luna-Aceves. An Efficient Routing Protocol for Wire-less Networks. ACM Mobile Networks and Applications, Special Issue on Routing in Mobile Communication Networks, 1(1):183-197, October 1996.

S. Y. Ni et al. The Broadcast Storm Problem in a Mobile Ad Hoc Network. ACM MOBICOM, pp. 151-162, August 1999.

T. Camp, J. Boleng, and V. Davies. A Survey of Mobility Models for Ad Hoc Network Research. Wireless Communication & Mobile Computing (WCMC), vol. 2, no. 5, pp. 483-502, 2002.

T. S. Rappaport. Wireless Communications: Principles and Practices. Prentice Hall, October 1995.

Tian He, Chengdu Huang, B. M. Blum, John A. Stankovic, and Tarek F. Abdelzaher. Range-Free Localization Schemes in Large Scale Sensor Networks. Ninth Annual International Conference on Mobile Computing and Networking (MobiCom 2003), San Diego, Calif., September 2003. To appear.

V. D. Park and M. S. Corson. A highly adaptive distributed routing algorithm for mobile wireless networks, Proceedings of 1997 IEEE Conference on Computer Communications (INFOCOM'97), April 1997.

W. Peng and X. Lu. AHBP: An efficient broadcast protocol for mobile ad hoc networks. Journal of Science and Technology—Beijing, China, 2002.

W. Peng and X. Lu. On the reduction of broadcast redundancy in mobile ad hoc networks. In Proceedings of MOBIHOC, 2000.

Y. Azar, J. Naor, R. Rom. Routing Strategies in Fast Networks IEEE Transactions on Computers, 45(2):165-173, 1996.

Y-B. Ko, N. H. Vaidya. Location Aided Routing for mobile ad hoc networks Proceedings of the fourth Annual mobile computing and networking, October 1998.

Z. J. Haas and M. Pearlman. Zone Routing Protocol (ZRP) for ad hoc networks, Internet Draft, Internet Engineering Task Force, work in progress, December 1997.

people.cs.clemson.edu/—goddard/papers/limitedFlooding.pdf

Mesh wireless sensor networks: Choosing the appropriate technology, Industrial Embedded Systems—Jul. 21, 2009, industrial.embedded-computing.com/article-id/?4098=, describes mesh wireless sensor networks (WSN). While most network approaches use routing as the basic architecture, a flooding-based technology offers distinct advantages, especially when it comes to larger networks. The two main technologies used to transmit data in mesh-based WSNs are flooding and routing. Flooding is also used in routing-based WSNs to enable the route discovery process. Robust operation within changing propagation conditions and under energy and communication bandwidth constraints precludes the use of traditional IP-based protocols and creates a difficult challenge for dedicated WSN routing algorithms. The task of finding and maintaining routes in WSNs is nontrivial because energy restrictions and sudden changes in node status (including failure, jamming, or temporary obstructions) cause frequent and unpredictable changes. Building and propagating automatic routing through the network requires powerful node processors, large amounts of memory, and additional dedicated routers, as well as network downtime until alternative routing is established. Building and maintaining routing tables with alternate routing (for responding to changing propagation conditions) while using low-cost, low-power processors proves to be a formidable challenge, which is amplified when the size and number of hops increase. Many new and sophisticated algorithms have been proposed to resolve these issues. The resulting routing schemes take into consideration the inherent features of WSNs along with application and architecture requirements.

In flooding, instead of using a specific route for sending a message from one node to another, the message is sent to all the nodes in the network, including those to whom it was not intended. The attractiveness of the flooding technology lies in its high reliability and utter simplicity. There is no need for sophisticated routing techniques since there is no routing. No routing means no network management, no need for self-discovery, no need for self-repair, and, because the message is the payload, no overhead for conveying routing tables or routing information.

Flooding technology has additional advantages related to propagation. Signals arriving at each node through several propagation paths benefit from the inherent space diversity, thus maximizing the network robustness of handling obstructions, interferences, and resistance to multipath fading, with practically no single point of failure. In other words, blocking one path or even a limited number of paths is usually of no consequence. Furthermore, lack of routing means that the controller is extremely simple, requiring minimal computing power and memory and thus low power consumption, low PCB real estate, and low cost.

Despite these benefits, flooding the network with repeated messages has its own challenges, often limiting use of flooding, except for route discovery in routing-based networks. For transmitting data, the main questions are how collisions are avoided, how the retransmitting process propagates the message efficiently toward its destination, and how the process ends, without an energy-wasting avalanche.

One flooding approach incorporates time division multiple access combined with high-accuracy synchronization, and allows the retransmissions to occur simultaneously so that the message propagates one hop in all directions at precisely the same time and avoids collisions. At each hop, nodes retransmit only relevant information, and the number of retransmissions corresponds to the number of hops in the network, so there is no waste of retransmissions.

Vamsi K Paruchuria, Arjan Durresib, Raj Jain, "Optimized Flooding Protocol for Ad hoc Networks", ai2-s2-pdfs.s3.amazonaws.com/4871/fddbldefd8b202c8e4d3103d691079996d4e.pdf, disclose that flooding provides important control and route establishment functionality for a number of unicast and multicast protocols in Mobile Ad Hoc Networks. The flooding methodology should deliver a packet from one node to all other network nodes using as few messages as possible. Flooding or Network wide broadcasting is the process in which one node sends a packet to all other nodes in the network. Many applications as well as various unicast routing protocols such as Dynamic Source Routing (DSR), Ad Hoc On Demand Distance Vector (AODV), Zone Routing Protocol (ZRP), and Location Aided Routing (LAR) use broadcasting or a derivation of it. The principal use of flooding in these protocols is for Location Discovery and for establishing routes. A straightforward approach for broadcasting is blind flooding, in which each node will be required to rebroadcast the packet whenever it receives the packet for the first time. Blind flooding will generate many redundant transmissions, which may cause a more serious broadcast storm problem. Given the expensive and limited nature of wireless resources such as bandwidth and battery power, minimizing the control message overhead for route discovery is a high priority in protocol design.

Each reference cited herein is expressly incorporated herein by reference in its entirety, for all purposes.

SUMMARY OF THE INVENTION

In a wireless mesh network, it is often required to broadcast a given packet network-wide, that is, deliver it to every node in the network that is reachable. An example application is to send a node's Position Location Information (PLI) to every other node for situational awareness. Another use is disseminating control information or for chats involving all nodes.

While naïve flooding, as discussed above, is a possible solution, it obviously introduces a significant number of packets into the channel, which can overwhelm capacity and introduce significant latency, especially in a low-bandwidth mesh network. Other approaches for network-wide broadcasting mentioned in the background and prior art utilize control packets to discern the topology or position information, or are centralized.

The present technology provides a completely decentralized algorithm for pruning the number of nodes that relay information, while still delivering the packet to all reachable nodes. It requires no additional control packets, and does not require knowledge of topology or position information— even the set of its neighbors, and only requires use of information in the header of a data packet.

A preferred implementation of the technology is based on analysis of responses of nodes within the network to "Full Floods" (every node relays), which are repeated in order to account for topological changes. These Full Floods are performed periodically. As a result of analysis of the Full Flood process, nodes mark themselves as "critical" or "not critical" in a completely distributed fashion, i.e., not susceptible to a single point of failure, and preferably not reliant on any particular other node. Subsequent network-wide broadcasts (i.e., between the periodic Full Floods) are only done by critical nodes. The protocol may have features to eliminate loops in the network. See, e.g., en.wikipedia.org/wiki/Spanning Tree Protocol; www.cisco.com/c/en/us/support/docs/lan-switching/spanning-tree-protocol/5234-5.html. To determine criticality, a node that broadcasts a packet determines if some other node re-transmits ("echoes"), that same packet, in which case it elects itself critical. The preferred algorithm has further enhancements to deal with loss of messages and hop-count limitations. Extensive simulation has demonstrated that the algorithm works correctly and significantly reduces the number of payloads, enabling scalability of a network employing the protocol, both over large areas and in dense distributions.

This technology provides particular advantages for a mesh network in which the application needs to send periodic network-wide broadcast packets (such as in a military system), and in systems where control packets need to be broadcast (e.g., route discovery in AODV or link state updates in OLSR).

Algorithm Description

The following distributed algorithm describes the network-wide broadcasting of a packet (a broadcast packet) originated at a node to all other nodes using the ECHO protocol.

Every node marks an application-generated broadcast packet as a Full Flood (FF) or a Pruned Flood (PF). If a node hasn't originated or relayed an FF with a TTL (Time to Live) of at least 2 within a configured preceding interval, it marks the packet an FF, else a PF. This TTL>2 criterion is to address packets with an artificial TTL limit due to which a node may drop the packet without re-transmitting, thereby not providing an echo (An "echo" is defined as the reception at a node of a packet containing the identifier of the node in its previous sender field (see below). With this condition, a node adjacent to such a node will be forced to generate its own FF, thereby giving it a chance to be a critical node. The TTL is decremented on each retransmission.

FF's contain, apart from the packet content and other information, two fields key to the operation of the invention: the sender ID, which is the ID of the node transmitting the Packet, and the previous sender ID, which is the ID of the node from which the sender received the Packet from. Before re-transmitting a Packet, a node updates the sender ID to its own ID and the previous sender ID to the ID of the node it received the packet from (a special null field if it has no previous sender, i.e., it originated). PF's do not contain these fields, or do not use them.

FF's are used to mark nodes as Critical or Non-Critical, as described below. When a node receives an FF with a given sequence number for the first time (the packet also has a sequence number field), it re-transmits the FF and sets an echo timer and moves to a Pending state. It then examines all of the Packets it receives until the echo timer expires. If it gets a Packet with the previous sender equal to its own ID, then it sets itself critical, otherwise, when the timer expires, the node sets itself non-critical. The rationale is that if none of its neighbors transmitted its specific packet (as IDed by the previous sender field), then none of them depend on it for receiving the Packet, and so it doesn't need to transmit in the subsequent rounds.

When a node receives a Packet marked as a Pruned Flood (PF), it only re-transmits it if it is Critical. Since the number of critical nodes is small compared to the total nodes, the total transmissions are reduced. At the same time, the algorithm ensures that every node is either a critical node or is adjacent to a critical node, and the critical nodes are connected (i.e., it is a connected dominating set). Thus every node is able to get the Packet.

Due to packet losses, an echo may not be heard, and therefore a node that ought to have become critical may not. To address this, every node keeps track of the average interval T between Packet arrivals. At the time of marking a Packet FF or PF, if a node has not heard a Packet within the last T×k seconds (where k is a configured value), it marks the Packet as Full Flood (FF), thereby triggering new critical node formation. The rationale is that this condition implies that the node is not adjacent to any critical node due to losses or other issues, and therefore the critical node set needs a reset.

Finally, by virtue of the initial operations of the protocol, there are roughly periodic FF's. These FF's serve to reset the critical nodes—new nodes are typically elected as critical. This balances out battery consumption, and also accommodates any topology (connectivity) changes, say due to mobility. Between these FFs (which may occur e.g., every 1-4 minutes depending on mobility), the floods are sent Pruned (only critical nodes), and thus there is a dramatic (~2-3×) savings in payloads transmitted.

In order to improve delivery rate of packets, implicit acknowledgements (IA) may be used to control selective re-transmission instead of the full re-transmission described above. Accordingly, a given node N receives an IA from a neighbor M, if a packet that N transmitted is re-transmitted by M, and N receives that retransmission. In other words, N "overhears" a data transmission to infer that the node that transmitted the packet has received it. Compared to a separate explicit acknowledgment (EA) packet, IA requires no additional information communication. An IA is only relevant for hop-by-hop acknowledgement, not end-to-end, and is not present for other nodes M', that receive the packet that N transmitted, but are not involved in retransmitting it. Not all nodes receiving a packet will retransmit. For example, if the other nodes M' already have the packet that N transmitted, or if the TTL is 0, a receiving node M' will simply discard the packet. Thus, the sender N cannot expect an IA on all of its transmissions. The present technology therefore selects which transmissions it will expect an IA, on and then retransmit if that expected IA is not received.

It is therefore an object to provide a mesh network communication protocol, comprising marking a mesh network node as critical if it receives, in response to a broadcasting of a flood packet, a packet with an identifier of itself as a prior sender, and marking itself as non-critical if it does not receive a packet with an identifier of itself as a prior sender; and employing the critical marking to selectively determine forwarding behavior for received non-flood packets. A flood packet may be broadcast from the mesh network node, comprising an identity of the mesh network node. The flood packet may define an identity of a current sender mesh network node, an identity of a prior sender from which the flood packet was received, a flood mode indicator, a time-to-live, a sequence identifier, and an optional payload.

It is another object to provide a mesh network communication protocol, comprising: broadcasting a packet from a current sender mesh network node, comprising an identity of the current sender; marking the sender mesh network node as critical if it receives in response to its broadcasting a packet with itself identifier as a prior sender, and marking itself as non-critical if it does not receive a packet, with itself identifier as a prior sender; and employing the critical marking to selectively determine forwarding behavior for received packets.

It is a still further object to provide a mesh network communication protocol, comprising: sending a flood packet from a current sender mesh network node to a recipient, defining an identity of the current sender, a flood mode indicator, a time-to-live, and an optional payload; receiving from the recipient a response to the flood packet, defining an identity of the recipient, the identity of the current sender as a prior sender, the flood mode indicator, a decremented time-to-live, and the optional payload; and marking the recipient as critical based on the identity of the current sender as the prior sender in the response.

The protocol may further comprise selectively rebroadcasting a single instance of a received flood packet based on a comparison of the sequence identifier with prior sequence identifiers, modified by a replacement of the identity of the current sender with an identity of the mesh network node, and the prior sender with the current sender, and a decrement of the time to live, wherein the flood packet is rebroadcast by the mesh network node if and only if the time to live is not expired, and (a) the flood mode indicator indicates a full flood mode and the sequence identifier is not present in a list of prior sequence identifiers; or (b) the flood mode indicator indicates a partial flood mode, the sequence identifier is not present in the list of prior sequence identifiers, and the mesh network node is marked as critical. Each packet may comprise an identity of the current sender, a criticality of the current sender, an identity of a prior sender, a time-to-live, and an optional payload. The protocol may further comprise sending a packet from a current sender mesh network node; determining whether retransmission of the packet is expected, based on at least a criticality of a neighboring mesh network node, and the time-to-live of the packet;

monitoring for re-transmission of the packet by the neighboring mesh network node within a time window; and if, and only if, re-transmission of the packet is expected before expiration of the time window, and is not detected within the time window, resending the packet. Determining whether retransmission of the packet is expected may be based on whether the time-to-live of the sent packet is at least one, and whether the current sender mesh network node has at least one neighbor other than the prior sender that is critical.

It is another object to provide a mesh network communication method, comprising: in a first mode, selectively retransmitting each packet received by a respective node as a first modified packet, if the received packet has not been transmitted before by the respective node; and in a second mode, determining whether the respective node is a critical link within the mesh network based on echoed packets received during the first mode, and selectively retransmitting each packet received by a node as a second modified packet, if the received packet does not originate from the respective node and the respective node is critical.

The method may be for eliminating redundant broadcasts in a wireless mesh network, comprising: transmitting by a sender mesh network node, a packet defining an identity of a current sender, an identity of a prior sender, a flood mode indicator, time-to-live data, a packet identifier, and an optional payload; receiving the packet by other mesh network nodes by a receiving node; marking the receiving node as critical if the flood mode indicator indicates a full flood mode corresponding to the first mode, and the receiving node is identified as the prior sender; retransmitting a modified representation of the received packet unless: (a) the packet has already been transmitted by the receiving node based on analysis of the packet identifier; (b) the receiving node is marked as non-critical and the flood mode indicator indicates a non-full flood mode corresponding to the second mode; or (c) the time to live has decremented beyond a predetermined threshold; the modified representation having updated time to live data, the identity of the sender becoming the identity of the prior sender, and an identity of the receiving node becoming the identity of the sender.

It is a further object to provide a mesh network node, comprising:

a radio frequency transceiver, configured to receive a flood packet from a current sender mesh network node, the flood packet comprising information defining an identity of the current sender, an identity of a prior sender from which the flood packet was received, a flood mode indicator, a time-to-live, and a sequence identifier, and an optional payload;

a memory configured to store a critical node indicator and a set of prior sequence identifiers of packets previously received;

an automated processor, configured to:

mark the critical node indicator as critical in the memory if during a period, the flood mode indicator is full flood mode, and the identity of the mesh network node is the same as the identity of the prior sender, and mark the critical node indicator as non-critical if during a period, the flood mode indicator is full flood mode, and no packet is received with the identity of the mesh network node the same as the identity of the prior sender;

selectively rebroadcast through the radio frequency transceiver, a single instance of the flood packet based on a comparison of the sequence identifier with the set of prior sequence identifiers, modified by a replacement of the identity of the current sender with an identity of the mesh network node, a replacement of the identity of the prior sender with an identity of the current sender, and a decrement of the time to live, wherein the flood packet is rebroadcast if and only if and time to live is not expired, and:

(a) the flood mode indicator indicates a full flood mode and the sequence identifier is not present in a list of prior sequence identifiers; or (b) the flood mode indicator indicates a partial flood mode, the sequence identifier is not present in the list of prior sequence identifiers, and the recipient is marked as critical.

The flood mode indicator may be time-sensitive. The full flood mode may have a limited time. In the full flood mode, the packet transmission may be triggered by a timer or a received packet. The receiving node may be marked as critical if the flood mode indicator indicates the full flood mode and the receiving node is identified as the prior sender in a packet received within a time period. The modified representation may comprise a decremented time to live counter, and the expiration of the time to live is dependent on a predetermined state of the counter. The flood may be triggered by a received packet. The automated processor may be further configured to generate a transmission of a full flood packet through the radio frequency transceiver.

It is also an object to provide a mesh network communication protocol, comprising:

receiving a flood packet from a current sender mesh network node by a recipient, defining: an identity of the current sender, an identity of a prior sender from which the flood packet was received, a flood mode indicator, a time-to-live, a sequence identifier, and an optional payload;

marking the recipient as critical if during a period, the flood mode indicator is full flood mode, and the identity of the recipient is the same as the identity of the prior sender, and marking the recipient as non-critical if during the period, the flood mode indicator is full flood mode, and no packet is received with the identity of the recipient the same as the identity of the prior sender; and selectively rebroadcasting a single instance of the flood packet by the recipient based on a comparison of the sequence identifier with prior sequence identifiers, modified by a replacement of the identity of the current sender with an identity of the recipient, and the prior sender with the current sender, and a decrement of the time to live, wherein the flood packet is rebroadcast by the recipient if and only if and time to live is not expired, and:

(a) the flood mode indicator indicates a full flood mode and the sequence identifier is not present in the list of prior sequence identifiers, or (b) the flood mode indicator indicates a partial flood mode, the sequence identifier is not present in the list of prior sequence identifiers, and the critical node indicator is marked as critical.

The mesh network communication protocol may further comprise: periodically broadcasting a flood packet from the recipient, comprising an identity of the recipient; and marking the recipient mesh network node as critical if it receives in response to its broadcasting, a flood packet with itself identified as the prior sender, and marking itself as non-critical if it does not receive the flood packet, with itself identified as the prior sender.

The flood mode indicator may be time-sensitive. The marking of the receiving node as critical may occur if the flood mode indicator indicates the learning mode and the receiving node is identified as the prior sender in a packet received within a time period. The learning mode may have a limited time duration. The modified representation may comprise a decremented time to live counter, and the expiration of the time to live may be dependent on a predetermined state of the counter. In the learning mode, the packet transmission may be triggered by a timer. The flood may be triggered by a received packet.

These and other objects will become apparent through a review of the application.

DETAILED DESCRIPTION OF THE PREFERRED EMBODIMENTS

Figure 1:
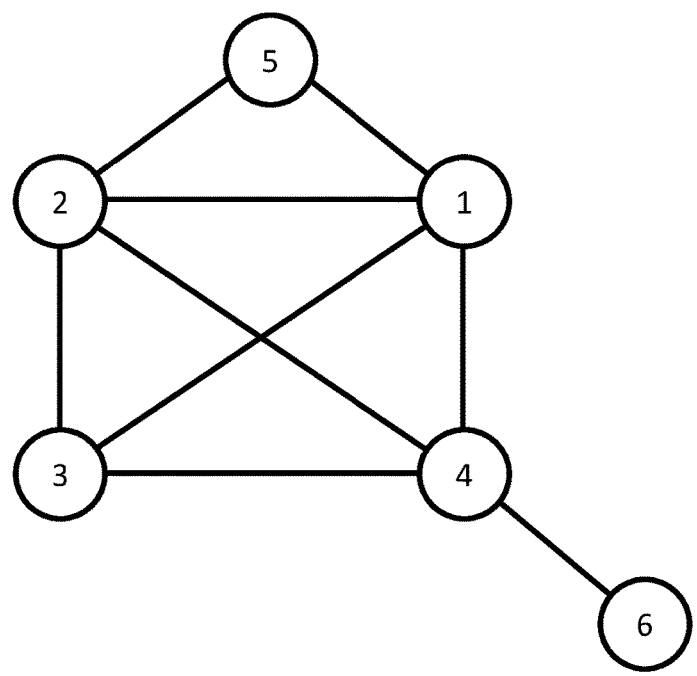
FIG. 1 shows a six-node network.

In a mesh network, three key issues to be balanced are scalability, reliability, and efficiency. Scalability considers the ability of the network to extend both to long distances and to a large and dense population of nodes. Long distance communications require an ability to effectively forward packets over multiple hops. Dense sets of nodes require that mutual interference not interrupt important communications. Large population is a challenge for protocols whose control overhead is an increasing function of size, as is the case for many protocols. Reliability addresses the statistical probability that a communication initiated will actually reach its destination, and any acknowledgement(s) be propagated back. Efficiency addresses power, bandwidth utilization, and incidence of unnecessary or redundant communications. In each type of network, the factors at play may differ, and so the optimization of the protocol differ. Beyond mere protocol, hardware complexity, cost, and other factors may also be considered.

In order to establish a multi-hop mesh network, a received packet is forwarded by one node to another. Typically, each node has an ability to forward communications. The packet should make progress toward its destination and recirculate through a loop. The packets may be encoded with a header that indicates its identification and/or prior path, and so avoid retracing.

Various strategies may be employed, which include routing and flooding. A routing strategy fundamentally transmits data packets which are addressed to a destination, and can be ignored by nodes which are not within the scope of the addressed destination. This requires that the source of the communication have a priori knowledge of addresses of forwarding nodes within communication range, and often nodes beyond communication range. This, in turn, in a mobile or dynamically changing network architecture, presupposes communications of routing information, which involves administrative overhead, memory for storing a routing table, and complexity.

Flooding, on the other hand, does not require that the source node identify the intervening node, and does not presume that some nodes will ignore packets not addressed to them. Therefore, while a packet will typically include information defining its prior path, it does not require a routing table for prospective forwarding of packets.

Often, a protocol will hybridize these techniques. For example, a routing protocol on a "cold start" may broadcast, i.e., flood, the network with a request intended to trigger exchange of routing information. A flooding protocol in a stable environment with competing use of the communication medium may include packet addressing, which may be specific or general.

However, these two techniques generally represent opposite agendas and philosophies. Typically, a routing protocol emphasizes scalability, and efficiency over reliability under impaired communications and dynamic changes. A flooding protocol emphasizes reliability, simplicity, and fault tolerance over efficiency, and is generally self-limited to ensure scalability and avoid packet storms.

The network-wide broadcasting problem may be iterated as follows: Given a packet originated at some node, deliver it to all other reachable nodes. For example, a message needs to be network-wide broadcasted. If every node broadcasts every message once, and N nodes broadcast 2 messages a minute, the number of payloads per minute increases exponentially, i.e., total payloads=$2 \times N \times N$ per minute. For 6 nodes, for example in the network represented in FIG. 1, this is 72 messages per minute; for 12 nodes, this is 288 messages per minute, and for 30 nodes, this is 1,800 messages per minute. Thus, the network quickly becomes unscalable at high nodal densities.

However, the actual amount of information is only $\sim 2 \times N$, i.e., the message from each node, and the rebroadcast from each node. Thus, the simple rebroadcast results in many redundant transmits. Therefore, in improving the network-wide broadcasting scenario, one is motivated to cut down redundant transmits while not losing packets. This problem is well studied in mobile ad hoc network (MANET) academic community. One deterministic solution is to find a subset of nodes such that only they have to transmit for all to receive the packet, i.e., the "connected dominating set". A probabilistic solution is to compute probabilities for each re-transmission such that each node is statistically provided with a certain delivery within a confidence interval. All solutions trade reliability for efficiency. Nothing can be better than full flood for reliability, except where the full flood interferes with itself.

Alternately, an improvement in packet delivery rate may be achieved by use of implicit acknowledgements (IA) to control selective re-transmission.

A node N receives an IA from a neighbor M, by analysis of a re-transmission of a packet that N transmitted by M, which is subsequently received by N. IA requires no additional information communication. Not all nodes M' receiving the packet will re-transmit it, since re-transmission is dependent on whether the other nodes M' already have the packet that N transmitted, whether the TTL is 0 (if TTL=0, a receiving node M' will simply discard the packet). N therefore predicts for which transmissions it will expect an IA, and retransmit if that expected IA is not received.

The IA process therefore works as follows. Upon transmitting a packet, a node N sets an IA-timer for a duration dictated by the estimated time for hearing the IA (a configurable parameter, which may be adaptively determined or fixed according to rules) under the following conditions:

1. The TTL field of the packet sent by N is at least 1 (accordingly, the TTL in the packet originated or received at N should be at least 2). This is because, if the TTL is 0, the recipient will not re-transmit it and an IA cannot be expected, AND 2. Either the node N is non-critical, or it is critical AND has a neighbor other than the sender of the packet that is critical.

If either of the specified conditions is False, then the IA-timer is not set.

To determine whether a node has a critical neighbor, every node indicates using an isCritical bit in the header whether the transmitting node is currently critical or not. Specifically, a node sets this bit to 1 if it is currently critical, else to 0. Every node tracks the criticality state of its neighbors by inspecting the isCritical bit of the received packet. Specifically, it marks the sender of the packet (the Sender is a field in the header) as critical or not.

A node N cancels an IA-timer for a packet, if an IA is received for the respective packet. If instead the IA-timer expires, then the node re-transmits the packet, unless the maximum allowable retransmissions have been performed, in which case the node does not re-transmit.

The present technology, called "ECHO", employs message pruning. The ECHO protocol computes "critical nodes" (CN) using a regular complete message flood, in which a node broadcasts a message, and all nodes that receive the message rebroadcast it, modifying the header to reflect an update of the original sender to the prior sender, and the broadcasting node as the sender. In this way, the state of the network away can be efficiently assessed, while effectively reducing network traffic. A CN in this case is one that has not received a packet with itself in the previous sender field.

After the CNs are determined, only CNs retransmit the message, i.e., nodes which are determined to be non-critical in a path do not retransmit, with the caveat that the network state may be monitored to determine changes in criticality. For example, a node that determines itself to be non-critical may listen to packets, and determine that it is in communication with a node that is unable to receive a communication, and thus tend to reverse the decision regarding criticality. This protocol does not require additional control packets, is fully distributed, requires minimal processing, and is not hard to implement. It corresponds to a deterministic protocol, and thus seeks to determine the connected dominating set.

There are two kinds of message flooding, differentiated by a bit (0/1) in a header. In a full flood (FF), all nodes transmit all received flood messages once, and the ECHO protocol determines the critical nodes (CN). Since the protocol is distributed, a node determines this status itself, and does not rely on a designated status received from another node. Also, a node determines for itself whether it is a CN. In a pruned flood (PF), only critical nodes retransmit received data packets.

For example, a full flood FF may be triggered every T minutes in the network, with a random or diverse backoff or delay to ensure that different nodes trigger at different times. A full flood FF also may be triggered on "event based" basis. If there are 12 vehicles in a parking lot, and each represents a mesh network node, each sending position location information ("PLI") every 30 secs, T=1, the present technology sends about 3× fewer payloads than a full flood-only protocol.

A message contains two main fields, previous sender, and sender, as well as a full flood/partial flood indicator, a time to live (counter), and a sequence identifier.

The intuition behind critical node CN computation is as follows: If a neighboring node echos a message sent in a FF by a respective node (i.e., the need identifies itself as the previous sender), it may depend on the respective node, and so the respective node may be critical for it. As shown in the 6-node network of FIG. 1, node 5 has no direct communication with nodes 3, 4 and 6. Likewise, node 6 has no direct communication with nodes 1, 2, 3 and 5. Node 5 has a 2-way redundant connection to nodes 1 and 2, while node 6 is completely dependent on node 4. The determination of which nodes are critical in general depends upon the who originated the broadcast packet and the sequence of transmissions, but some nodes (such as node 4) will always be critical. In the case of node 4, it will receive an "echo" from node 6 with itself as the previous sender no matter the originator and sequence of transmissions, and hence mark itself critical. According to the ECHO communication protocol, if no node echos a message sent (by any other node) during the FF, identifying a respective node as the previous sender, that node is not critical, otherwise it is. Referring again to FIG. 1, in a FF, node 1 will receive transmissions from nodes 2, 3, 4 and 5. Node 2 will receive transmissions from nodes 1, 3, 4, and 5. Node 3 will receive transmissions from nodes 1, 2, and 4. Node 4 will receive transmissions from nodes 1, 2, 3, and 6. Node 5 will receive transmissions from nodes 1 and 2. Node 6 will receive a transmission from node 4. Note that, according to ECHO, the CNs include redundant pathways.

The basic ECHO protocol is represented by two rules:

RULE 1: Rebroadcast with previous sender=ID of node the packet was receiver from, and sender=ID of sending node.

RULE 2: If a node receives a message with itself identified as the previous sender, mark itself CRITICAL.

Figures 2A, 2B, 2C, 2D:
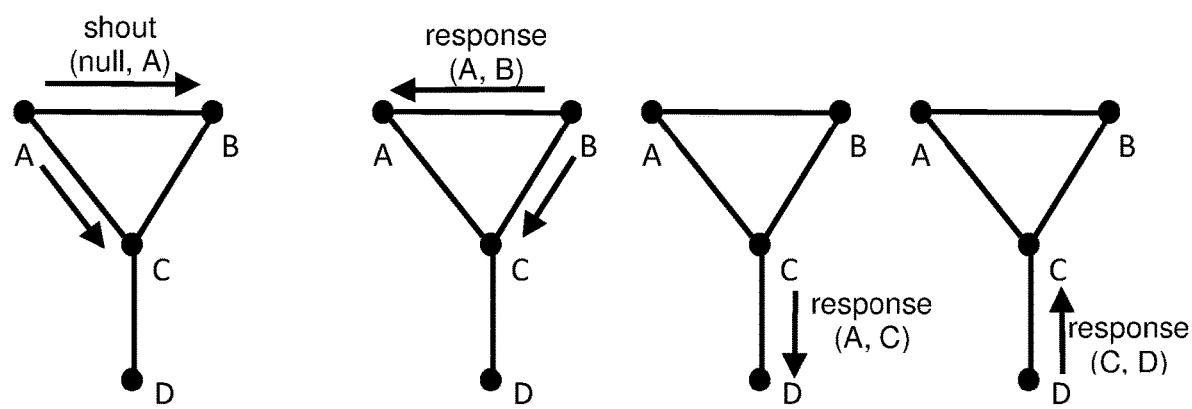
FIG. 2A-2D show a series of representations of states during determination of node criticality.
Figure 3:
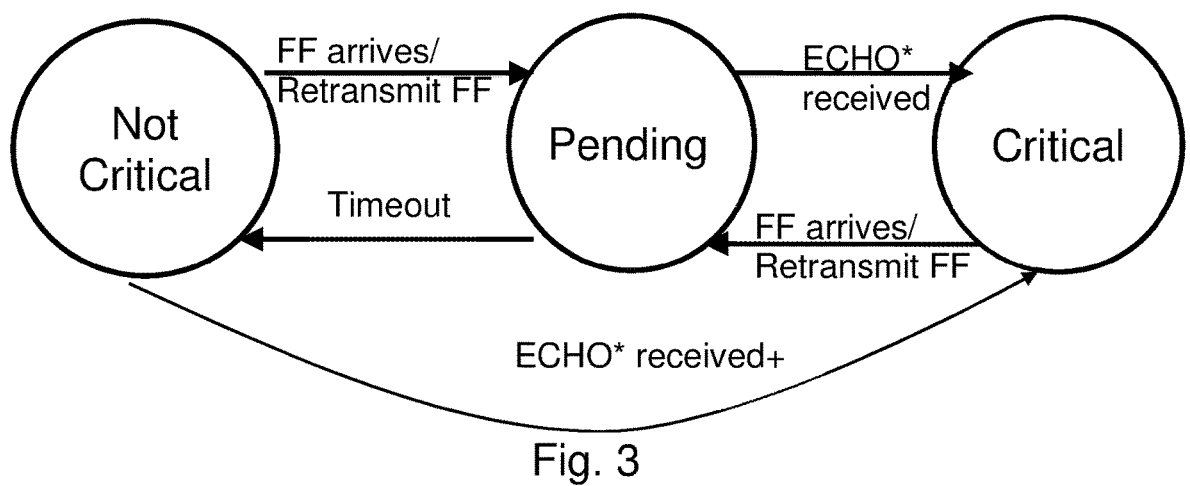
FIG. 3 shows a representation of a state diagram.

As shown in FIGS. 2A, node A transmits a message to its neighbors. This message identifies this as a message originated in node A, because the previous sender value is "null", and the sender value is "A". The message is received by nodes B and C. As shown in FIG. 2B, node B retransmits the message from node A as part of the network-wide broadcast process identifying node A as previous sender and node B as sender. According to RULE 2, node A marks itself critical, CN. As shown in FIG. 2C, node C is also a recipient of the message from node A, which is then retransmitted. Similar to FIG. 2B, node A will receive a message from node C that identifies node A as previous sender and node C as sender (not shown). According to RULE 2, node A marks itself critical, CN, though if it is already marked as critical, no change is necessary. The retransmission from node C is also received by nodes B and D. However, since node B or D is not identified as previous sender, neither node B nor D considers itself critical based on this communication. Finally, as shown in FIG. 2D, node D will also retransmit the message received from node C, identifying node C as previous sender and node D as sender. As a result, node C finds itself identified as previous sender and marks itself as a critical node. Thus, since node A initiated the flood, nodes A and C are listed as critical. If node B had initiated, it would be marked critical, and node A would not. Once determined, the NC determinations remain until the next determination, T seconds later. For slowly changing networks, T can be pretty high. As shown in FIG. 3, a node has three possible states; not critical, critical, and pending determination of criticality.

In this example 4-node network, the protocol reduces transmissions by 50%. In a fully connected 1-hop network of 30 nodes, only 2 nodes will be critical, savings of 15× during each pruned message phase (less overall).

The ECHO protocol thus proceeds in two stages; an initial message, for critical node computation, by which all connected nodes receive the message, and resend the message with an updated sender and previous sender, to determine critical nodes, and a second stage in which the critical node determination is respected, and only critical nodes retransmit the message.

The algorithm is fully distributed, and does not rely on any remote determinations or calculations. A node marks an originated message as a "Full Flood" (FF) if it hasn't "seen" an FF for the last configured FF_PERIOD, otherwise, marks it "Pruned Flood" (PF). This allows a random rotation of nodes as FF originators without any central control or deference. A node receiving an FF, determines whether this FF is new (Message_ID not seen before), and if so, transmits the FF, sets an "Echo timer", and listen to retransmits of FF. If the FF is not new (i.e., it is seen earlier), it then determines whether the previous sender field is equal to its own ID, and if so, marks itself as being critical. If the echo timer expires, then the node marks itself not critical.

There are known exceptions to the main protocol, which may be handled in traditional or known manner. Thus, known technologies to address other issues may be used in conjunction with the ECHO protocol. For example, in case of message loss (such as from collision or channel errors), loss during FF phase (A node may fail to make itself critical if "echo" is lost), loss during PF phase (loss from a CN to a CN, equivalent impact to FF), loss from a CN to a non-CN (could have potentially received from another node if FF); in case of network topology reformation, e.g., node A detaches from one CN [and attaches to another non-CN], a link between two CN's breaks (but path exists through non-CN), a node powers down or becomes unavailable, or a new node joins. The present protocol may impose a k hop limit. In that case, the last hop does not echo, so the CN is not formed.

An enhanced variant of the ECHO protocol provides a Forced Full Flood, which exploits message frequency/periodicity. A node may be programmed to expect to receive messages at a certain frequency from its CN(s). For example, in a 12 node network, with 2 messages originated/min/node, a node should expect to receive a message about every 2.5 seconds. Therefore, if the node does not receive a message outside a statistical bound, such as 7.5 seconds, something is likely wrong, which may indicate a topology change. In this case, the node may set a backoff timer for B seconds, initiate a Force Flood immediately after B seconds if no Force Flood was heard (from another node) in the meantime. A Force Flood ignores designated critical nodes, and requests that every node transmit once, to learn a new CN pattern.

The backoff timer ensures multiple nodes recognizing "something wrong" don't all send a redundant force flood.

Another enhanced protocol seeks to determine hop boundary origination. This is specifically to address the k-hop limit issue. A node that receives an FF with TTL=1, retransmits, but does not expect an echo, therefore does not set echo timer, etc. A node that hasn't had a chance to get an echo within the last FF_PERIOD originates its own FF. So, if a node hasn't "seen" an FF with TTL=2 or more within the last FF_PERIOD originates its own FF. When two k-hop TTL floods "touch" each other, those at the boundary will originate their own FF. A computer simulation shows that such overlapping/touching "islands" work fine.

The "ECHO" protocol will now be described with respect to FIGS. 4A-4E.

Figure 4A:
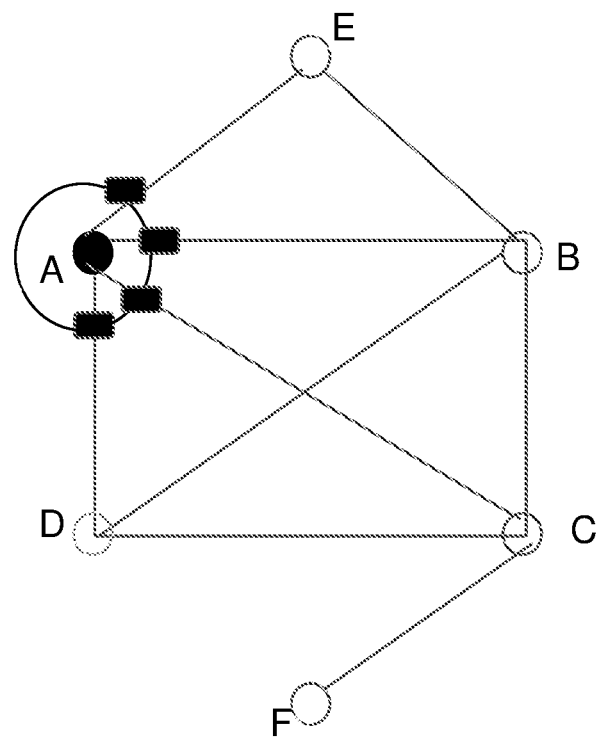
FIGS. 4A-4F show a series of network state diagrams which represent operation of the protocol.
Figure 4B:
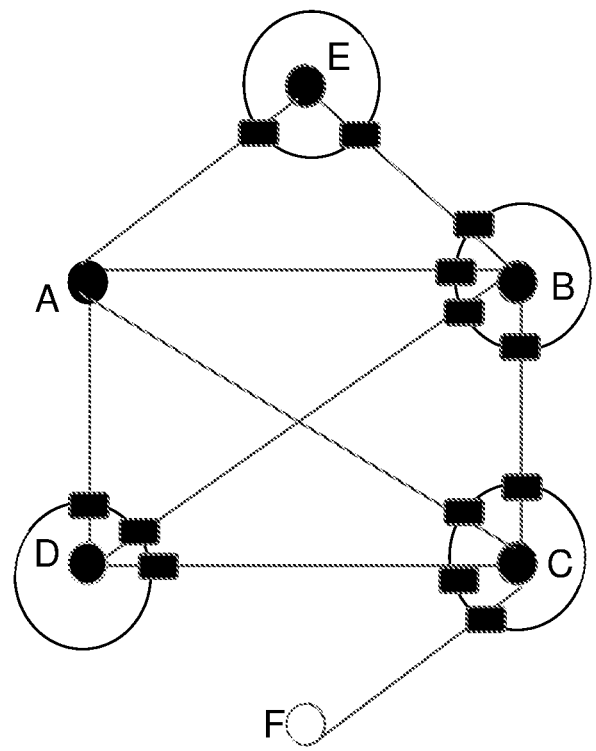
Figure 4C:
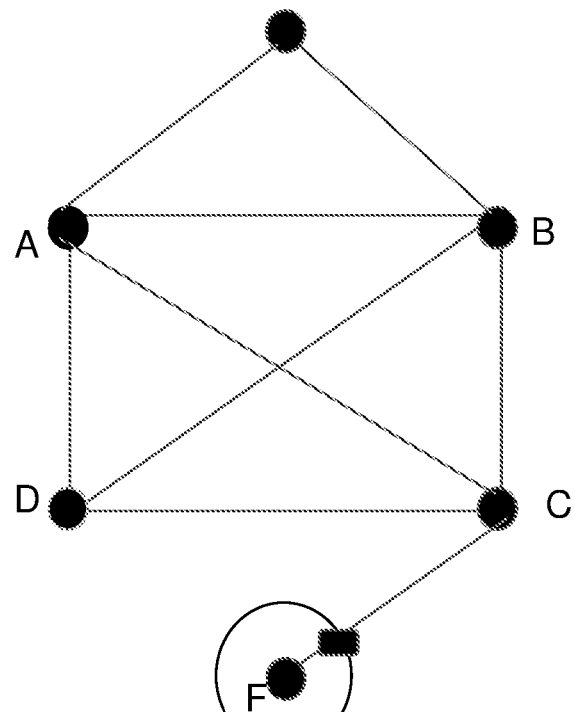

FIG. 4A shows that node A broadcasts a message, which is received by nodes B, C, D, and E. Node F is out of range, and does not directly receive the message in this example. Nodes B, C, D, and E rebroadcast the message, as represented in FIG. 4B. Node F rebroadcasts the message received from C, as represented in FIG. 4C. The total number of transmissions from A's origination are 6, since A broadcasts, then B, C, D, and E rebroadcast, and then F rebroadcasts. The nodes recognize a message that has been seen before (e.g., based on a sequence identifier in the message), and do not again rebroadcast it.

Figure 4D:
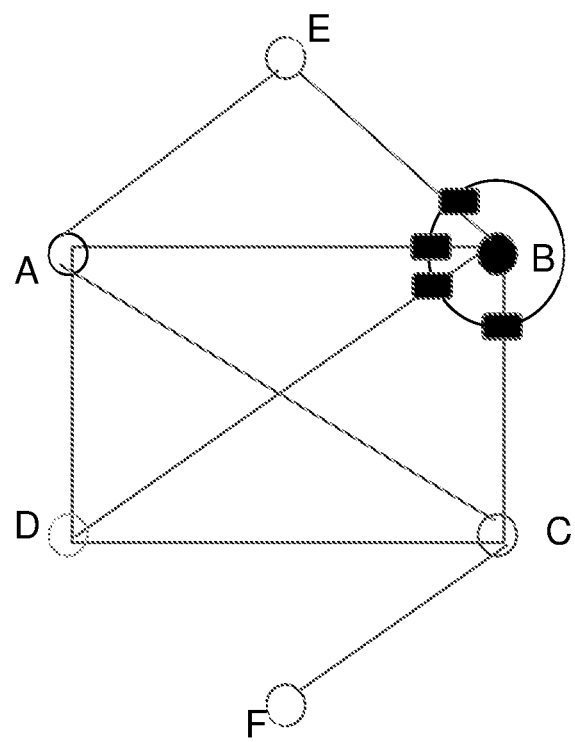
Figure 4E:
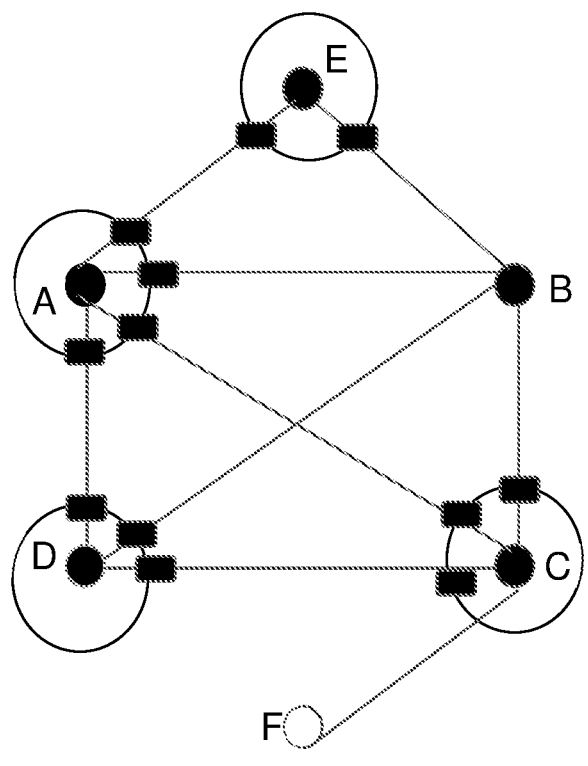
Figure 4F:
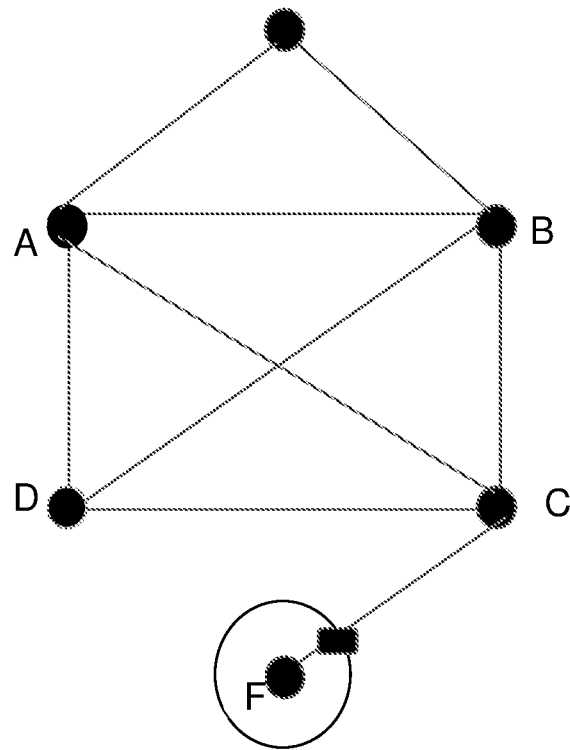

In FIG. 4D, it is node B that initiates the flood by broadcasting the message. Nodes A, C, D, and E receive and rebroadcast the message, as represented in FIG. 4E. Node F rebroadcasts the message received from C, as represented in FIG. 4F. The total number of transmissions from B's origination are also 6, since B broadcasts, then A, C, D, and E rebroadcast, and then F rebroadcasts. The nodes recognize a message that has been seen before (e.g., based on a sequence identifier in the message), and do not again rebroadcast it.

If it was node F that originated the flood, there would still be 6 broadcasts, but it would require an addition stage or rebroadcasting to reach node E. In fact, in each case, there are 6 broadcasts, and each node, in turn, initiates a full flood, leading to 36 transmissions per cycle.

Figure 5:
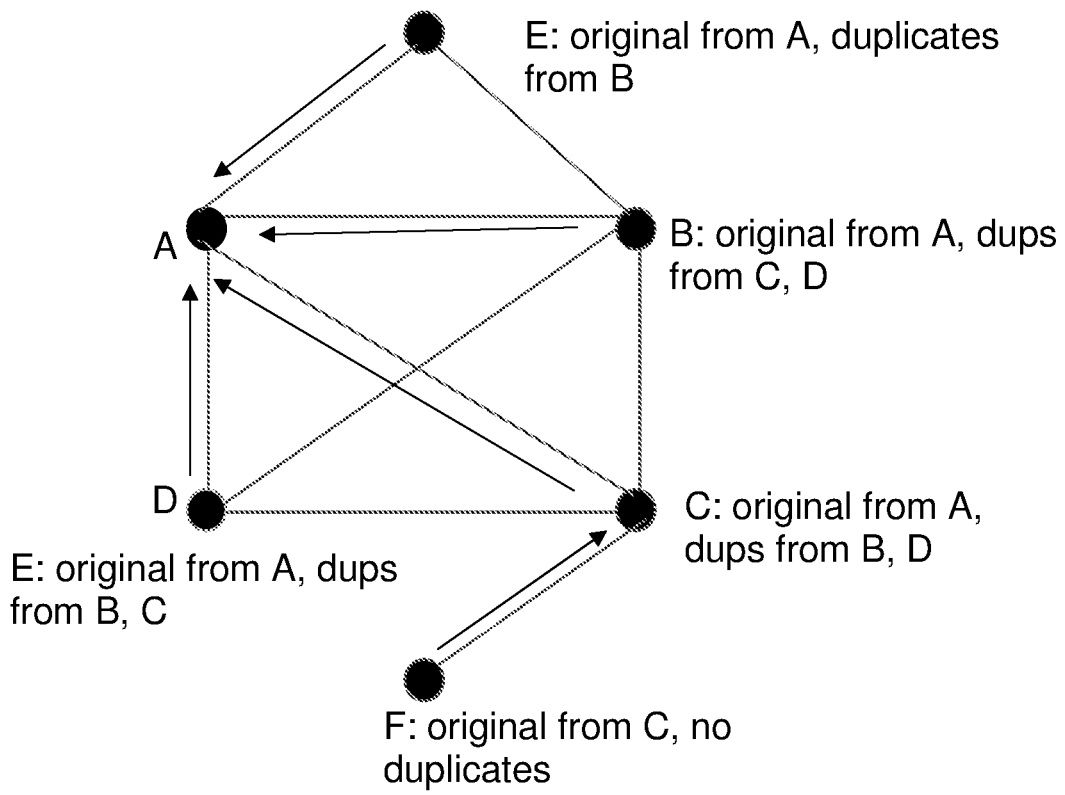
FIG. 5 shows a network diagram with packet flow indication.

Referring to FIG. 5, from a node's perspective, each node seeks to receive unique information, and communicate that it is receiving redundant information. The protocol assumes that transmissions are symmetric, so that if a node can receive along a path, it can also transmit along the reverse path. After A's origination round, B, C, D, and E observe that they are getting many duplicates. F doesn't get any duplicates. Nodes B, C, D and E don't care about these duplicates, only A's transmission. For the next round, wherein a node other than A broadcaats a full flood, they seek for A to continue what it is doing, but communicate to other neighbors to stop, e.g., D wants to indicate to A "please transmit next round" and to B and C to "remain silent next round". F wants C to continue sending next round and nobody to be silent since it didn't get any duplicates.

Figure 6:
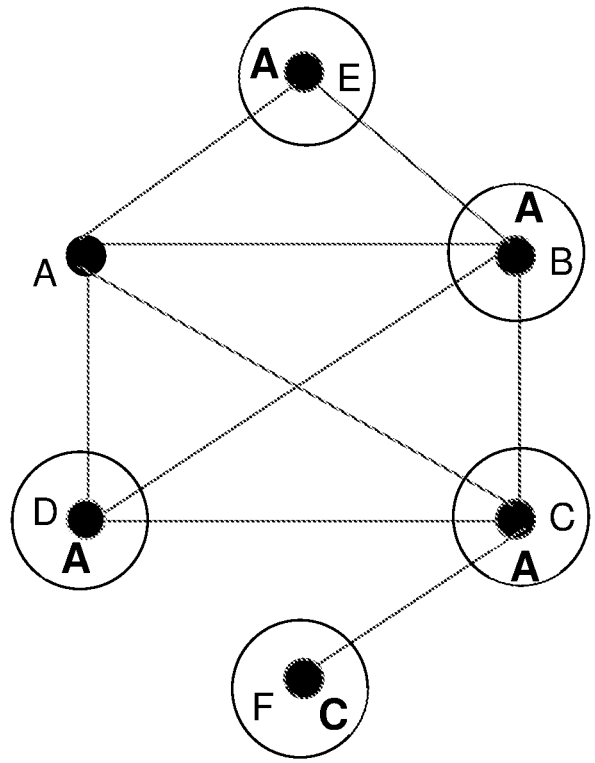
FIG. 6 shows a network diagram with node criticality indication.

Referring to FIG. 6, we don't want each node to send explicit messages to A corresponding to each arrow in FIG. 5, which would generate too many wasteful messages. Instead, its re-broadcast of a received packet, each node indicates which node it wants to continue sending. A good choice is the "previous sender" (who it got the packet from first). A node therefore infers:

If I see my ID in the re-broadcast, it is like an arrow pointing to me, someone wants me to send, so I will send next round.

If I never see my ID in the re-broadcast, then I need (should) not send. My neighbors will get it from someone else.

In this example, A and C are the only nodes that some node(s) have indicated they want them to send. Thus, A and C mark themselves critical and others mark themselves non-critical for next rounds. Only critical nodes re-broadcast the message in subsequent rounds.

Figure 7A:
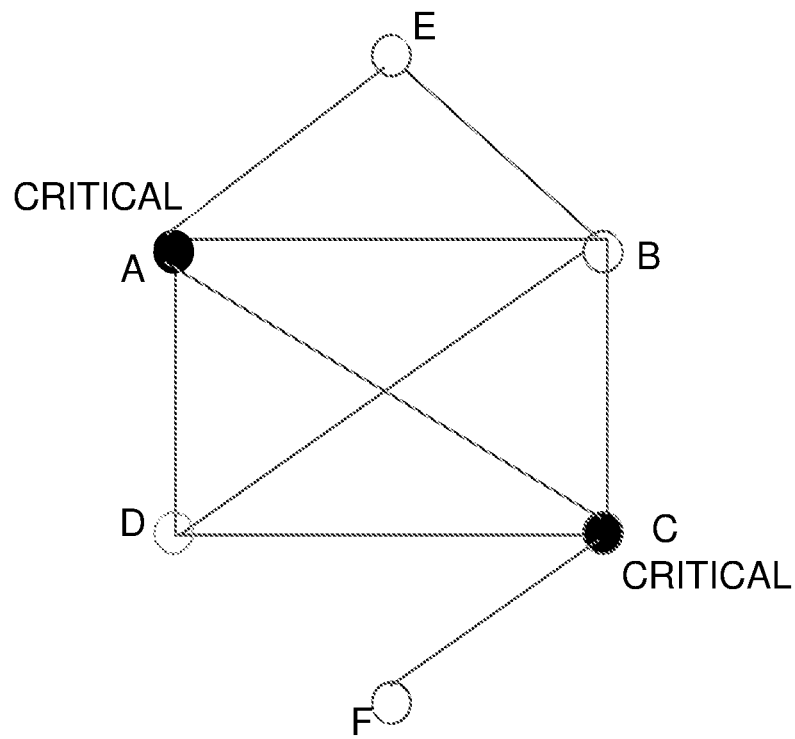
FIGS. 7A-7D show a series of network diagrams representing operation of the protocol.

After the full flood determination of node criticality, the network assumes a different mode of operation. The mode may be indicated by a flag within a packet representing full flood or partial flood, which may be interpreted as exploration of network state vs. efficient operation. As shown on FIG. 7A, nodes A and C are marked "critical", and other nodes are non-critical. After this first round, where each node has now included the previous sender, every node asks itself the question: "has any node wanted me to send in the next round(s)?" If at least one node has wanted me to send—there may be more than one (e.g. several nodes want A to continue sending), I will mark myself "critical". If nobody wants me to send, I will remain silent next round ("non-critical"). An "ECHO" is the property/idea of a node to recognize itself marked in a packet of a neighbor, that allows it to decide on its own criticality.

Figure 7B:
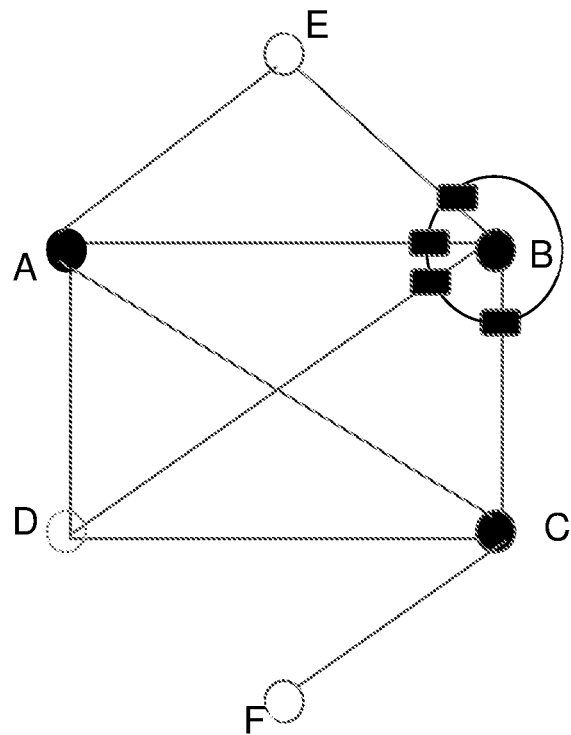
Figure 7C:
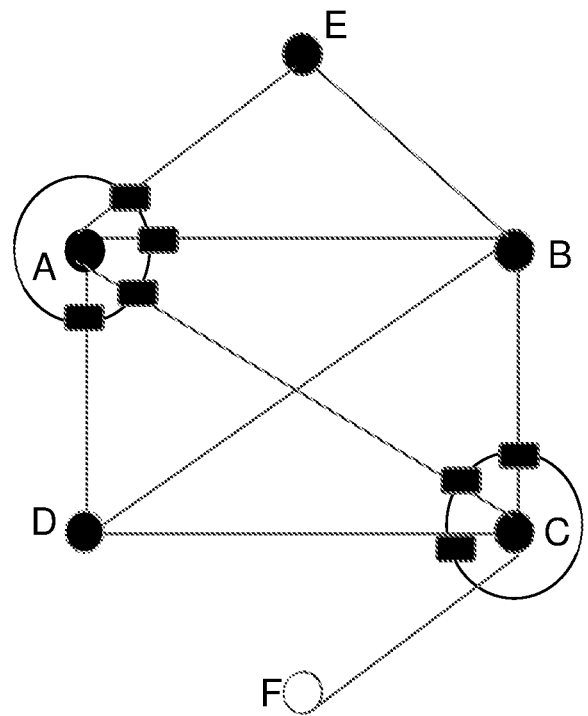
Figure 7D:
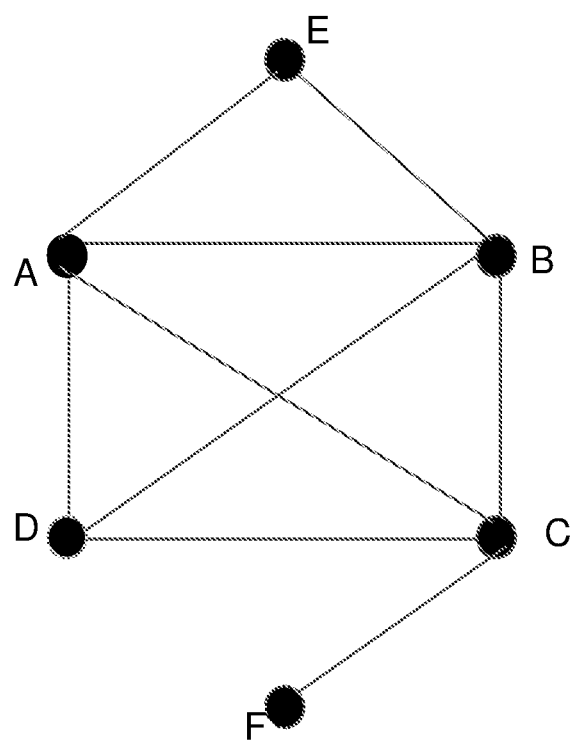

The case of node B originating and broadcasting a message is shown in FIG. 7B. As represented in FIG. 7C, nodes A, C, D and E receive the message. However, since noes A and C are marked as critical, and nodes D and E are marked as non-critical, only nodes A and C rebroadcast. As represented in FIG. 7D, the rebroadcast from node C is then received by node F, and no other node responds, since at this time each node recognizes the sequence ID of the packet or is marked as non-critical. Node F, in particular, does not rebroadcast, because it is marked as non-critical. If node C had initiated the transmissions, only two transmissions would have been necessary. In general, the number of transmissions is the number of critical nodes plus 1 (C+1). The total transmissions from node B's origination of the message is 3.

So total number of transmissions in ECHO is:
6 for A's origination (no pruning but learning)+
3 for B's origination+
2 for C's origination+
3 for D's origination+
3 for E's origination+
3 for F's origination
=transmissions.

For example, with 2 messages per minute originated per node, there are 40 transmissions per minute in the network, assuming there is a full flood (learning) round every minute. On the other hand, with pure flooding, there would be 72 per minute. For larger/denser networks, the savings can be much higher.

Figure 8:
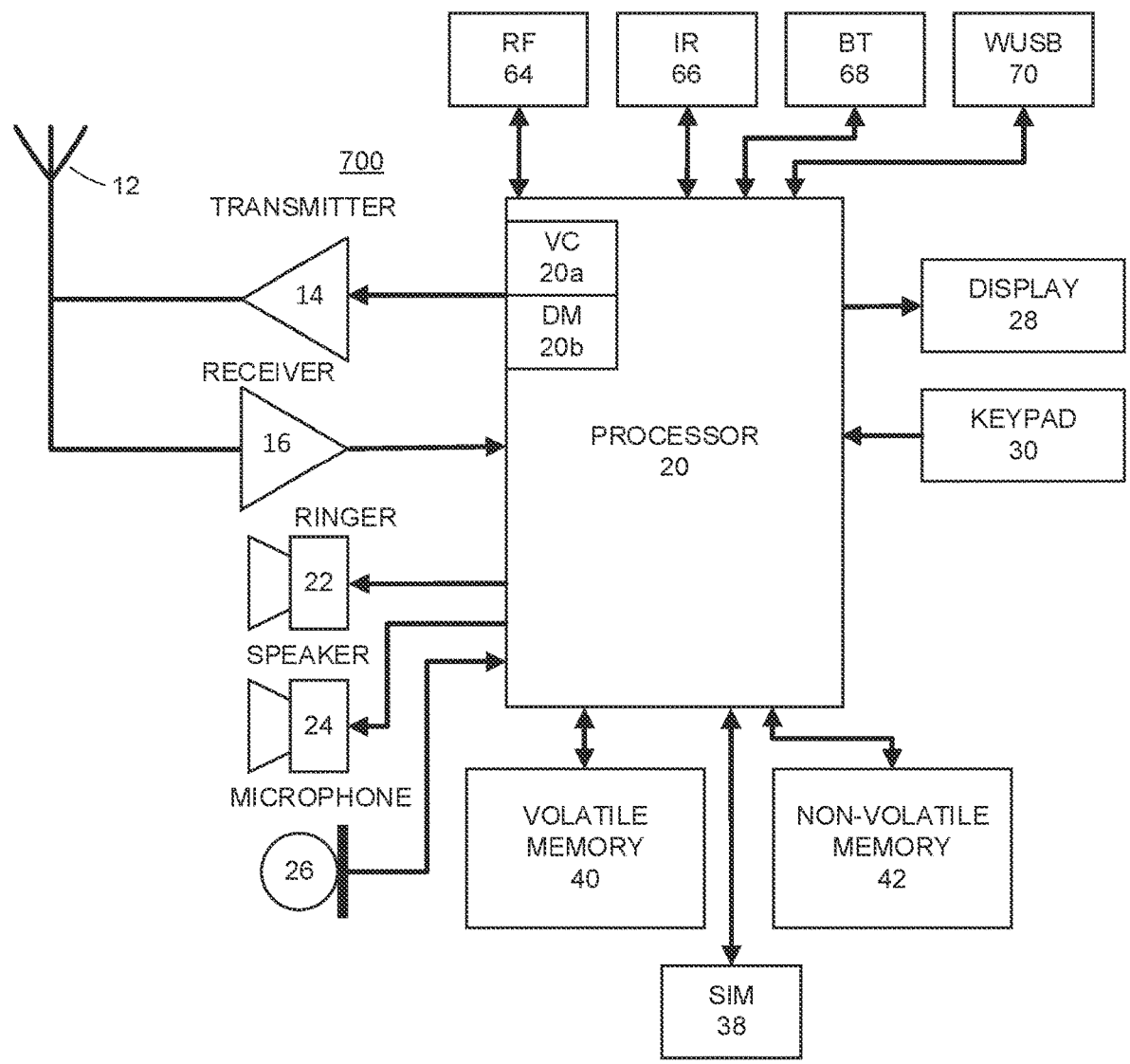
FIG. 8 shows an exemplary hardware Architecture.

FIG. 8 depicts an example of an apparatus 700, in accordance with some example embodiments. This is similar to FIG. 7 of U.S. 20170332439. The apparatus 700 may comprise a node. Moreover, the nodes may comprise a user equipment, such as an internet of things device (for example, a machine, a sensor, an actuator, and/or the like), a smart phone, a cell phone, a wearable radio device (for example, an Internet of things [IoT] fitness sensor or other type of IoT device), and/or any other radio based device.

In some example embodiments, apparatus 700 may also include a radio communication link to a cellular network, or other wireless network. The apparatus 700 may include at least one antenna 12 in communication with a transmitter 14 and a receiver 16. Alternatively transmit and receive antennas may be separate.

The apparatus 700 may also include a processor 20 configured to provide signals to and from the transmitter and receiver, respectively, and to control the functioning of the apparatus. Processor 20 may be configured to control the functioning of the transmitter and receiver by effecting control signaling via electrical leads to the transmitter and receiver. Likewise, processor may be configured to control other elements of apparatus 700 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor (s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Apparatus 700 may include a location processor and/or an interface to obtain location information, such as positioning and/or navigation information. Accordingly, although illustrated in as a single processor, in some example embodiments the processor 20 may comprise a plurality of processors or processing cores.

Signals sent and received by the processor 20 may include signaling information in accordance with a mesh network protocol, as discussed above, may employ number of different wireline or wireless networking techniques. As discussed above, the protocol is preferably implemented at the TRX layer, and therefore does not correspond directly to an existing standard.

The apparatus 700 may also be capable of operating with one or more air interface standards, communication protocols, modulation types, access types, and/or the like, though these may require separate radios and/or a software defined radio implementation to permit these alternate uses. The preferred implementation is a 900 MHz radio operating in the 928 MHz ISM band, and complying with F.C.C. regulations for unlicensed use. The data carrier over the radio may include TCP/IP packets, UDP packets, or other standard higher level protocols.

It is understood that the processor 20 may include circuitry for implementing audio/video and logic functions of apparatus 700. For example, the processor 20 may comprise a digital signal processor device, a microprocessor device, an analog-to-digital converter, a digital-to-analog converter, and/or the like. Control and signal processing functions of the apparatus 700 may be allocated between these devices according to their respective capabilities. The processor may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 700 to perform actions. For example, processor 20 may be capable of operating a connectivity program, such as, a web browser. The connectivity program may allow the apparatus 700 to transmit and receive web content, such as location-based content, according to a protocol, such as, wireless application protocol, wireless access point, hypertext transfer protocol, HTTP, and/or the like.

Apparatus 700 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as, the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 700 may include a battery for powering various circuits related to the mobile terminal, for example, a circuit to provide mechanical vibration as a detectable output. The user input interface may comprise devices allowing the apparatus 700 to receive data, such as, a keypad 30 (which can be a virtual keyboard presented on display 28 or an externally coupled keyboard) and/or other input devices. Preferably, the device is a low data rate, non-real time communication device, i.e., unsuitable for real-time voice communications, but this is not a limitation of the technology per se.

The apparatus 700 preferably also includes a short-range radio frequency (RF) transceiver and/or interrogator 64, so data may be shared with and/or obtained from electronic devices in accordance with RF techniques. The apparatus 700 may include other short-range transceivers, such as an infrared (IR) transceiver 66, a Bluetooth (BT) transceiver 68 operating using Bluetooth wireless technology, a wireless universal serial bus (USB) transceiver 70, and/or the like. The Bluetooth transceiver 68 may be capable of operating according to low power or ultra-low power Bluetooth technology, for example, Wibree, Bluetooth Low-Energy, and other radio standards, such as Bluetooth 4.0. In this regard, the apparatus 700 and, in particular, the short-range transceiver may be capable of transmitting data to and/or receiving data from electronic devices within a proximity of the apparatus, such as within 100 meters. The apparatus 700 including the Wi-Fi (e.g., IEEE-802.11ac, ad, ax, af, ah, az, ba, a, b, g, i, n, s, 2012, 2016, etc.) or wireless local area networking modem may also be capable of transmitting and/or receiving data from electronic devices according to various wireless networking techniques, including 6LoW-pan, Wi-Fi, Wi-Fi low power, WLAN techniques such as IEEE 802.11 techniques, IEEE 802.15 techniques, IEEE 802.16 techniques, and/or the like.

The apparatus 700 may comprise memory, such as, a subscriber identity module (SIM) 38 (for use in conjunction with a cellular network), a removable user identity module (R-UIM), and/or the like, which may store information elements related to a mobile subscriber. In addition to the SIM, the apparatus 700 may include other removable and/or fixed memory. The apparatus 700 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, solid state drive, magnetic storage devices, optical disc drives, ferroelectric RAM, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing functions of the nodes disclosed herein. The memories may comprise an identifier, such as an international mobile equipment identification (IMEI) code, capable of uniquely identifying apparatus 700. The functions may include one or more of the operations disclosed herein including with respect to the nodes and/or routers disclosed herein (see for example, 300, 400, 500, and/or 600). In the example embodiment, the processor 20 may be configured using computer code stored at memory 40 and/or 42 to provide the operations, such as detecting, by a router coupling a first mesh network to at least one other mesh network, a mesh packet having a destination node in the at least one other mesh network; receiving, at the router, an internet protocol address of the at least one other router, wherein the internet protocol address is received in response to querying for the destination node; and sending, by the router, the mesh packet encapsulated with the internet protocol address of the at least one other router coupled to the at least one other mesh network including the destination node.

Some of the embodiments disclosed herein may be implemented in software, hardware, application logic, or a combination of software, hardware, and application logic. The software, application logic, and/or hardware may reside in memory 40, the control apparatus 20, or electronic components disclosed herein, for example. In some example embodiments, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry. A computer-readable medium may comprise a non-transitory computer-readable storage medium that may be any media that can contain or store the instructions for use by or in connection with an instruction execution system, apparatus, or device, such as a computer. Furthermore, some of the embodiments disclosed herein include computer programs configured to cause methods as disclosed with respect to the nodes disclosed herein.

The subject matter described herein may be embodied in systems, apparatus, methods, and/or articles depending on the desired configuration. For example, the systems, apparatus, methods, and/or articles described herein can be implemented using one or more of the following: electronic components such as transistors, inductors, capacitors, resistors, and the like, a processor executing program code, an application-specific integrated circuit (ASIC), a digital signal processor (DSP), an embedded processor, a field programmable gate array (FPGA), and/or combinations thereof. These various example embodiments may include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "machine-readable medium" refers to any computer program product, computer-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the example embodiments described above may be directed to various combinations and sub-combinations of the disclosed features and/or combinations and sub-combinations of several further features disclosed above. In addition, the logic flow depicted in the accompanying figures and/or described herein does not require the particular order shown, or sequential order, to achieve desirable results. Other embodiments may be within the scope of the following claims.

What is claimed is:

1. A mesh network communication protocol method, comprising:
   receiving by a mesh network node, a received flood packet through the mesh network receiver from a sender mesh network node,
   broadcasting by the mesh network node, a transmitted flood packet though a mesh network receiver;
   marking a mesh network node as critical selectively dependent on whether it receives, in response the broadcasting of the transmitted flood packet, a received flood packet with an identifier of itself as a prior sender from which the sender received the packet;
   marking the mesh network node as non-critical selectively dependent on whether it does not receive a packet with an identifier of itself as the prior sender;
   employing the marking as being critical or as being non-critical to selectively determine forwarding behavior for received non-flood packets; and
   rebroadcasting by the mesh network node, the flood packet, comprising an identity of the mesh network node replacing a received identifier of the sender, and the received identifier of the sender replacing a received identifier of the prior sender.

2. The mesh network communication protocol method according to claim 1,
   wherein the flood packet defines: an identity of the sender, an identity of the prior sender, a flood mode indicator, a time-to-live, a sequence identifier, and an optional payload.

3. The mesh network communication protocol method according to claim 2, further comprising selectively rebroadcasting one and only one instance of a received flood packet based on a comparison of the sequence identifier with prior sequence identifiers, modified by:
   a replacement of an identity of the sender with an identity of the mesh network node,
   a replacement of the identity of the prior sender with the identity of the sender, and
   a decrement of the time to live,
   wherein the flood packet is rebroadcast by the mesh network node selectively dependent on whether the time to live is not expired, and the flood made indicator has two alternate states, comprising:
   a first state that indicates a full flood mode and the sequence identifier is not present in a list of prior sequence identifiers, and
   a partial flood mode, the sequence identifier is not present in the list of prior sequence identifiers, and the mesh network node is marked as critical.

4. The mesh network communication protocol method according to claim 1, wherein each packet comprises an identity of the sender, a criticality of the sender, an identity of a prior sender, a time-to-live, and an optional payload,
   further comprising:
   sending a packet from the sender;
   determining whether retransmission of the packet is expected, based on at least a criticality of a neighboring mesh network node, and the time-to-live of the packet;
   monitoring for re-transmission of the packet by the neighboring mesh network node within a time window; and
   resending the packet selectively dependent on the determination of whether re-transmission of the packet is expected, before expiration of the time window, and is not detected within the time window.

5. The mesh network communication protocol method according to claim 4, wherein said determining whether retransmission of the packet is expected, is selectively based on whether the time-to-live of the sent packet is at least one, and whether the sender has at least one neighbor other than the prior sender that is critical.

6. A mesh network communication method, comprising:
   in a first mode, selectively retransmitting each packet received by a respective node as a first modified packet, selectively dependent on whether the received packet has not been transmitted before by the respective node;
   in a second mode, determining whether the respective node is a critical link within the mesh network based on echoed packets received during the first mode, and selectively retransmitting each packet received by a node as a second modified packet, selectively dependent on whether the received packet does not originate from the respective node and the respective node is critical;
   transmitting by a sender mesh network node, a packet defining an identity of a current sender, an identity of a prior sender, a flood mode indicator, time-to-live data, a packet identifier, and an optional payload;
   receiving the packet by other mesh network nodes by a receiving node;
   marking the receiving node as critical selectively dependent on whether the flood mode indicator indicates a full flood mode corresponding to the first mode, and the receiving node is identified as the prior sender;
   retransmitting a modified representation of the received packet unless:
   the packet has already been transmitted by the receiving node based on analysis of the packet identifier;
   the receiving node is marked as non-critical and the flood mode indicator indicates a non-full flood mode corresponding to the second mode; or
   the time-to-live has decremented beyond a predetermined threshold;
   the modified representation having updated time-to-live data, the identity of the sender becoming the identity of the prior sender, and an identity of the receiving node becoming the identity of the sender.

7. The method according to claim 6, wherein the flood mode indicator is time-sensitive.

8. The method according to claim 6, wherein marking the receiving node as critical selectively dependent on whether the flood mode indicator indicates the full flood mode and the receiving node is identified as the prior sender in a packet received within a time period.

9. The method according to claim 6, wherein the full flood mode has a limited time.

10. The method according to claim 6, wherein the modified representation comprises a decremented time to live counter, and the expiration of the time to live is dependent on a predetermined state of the counter.

11. The method according to claim 6, wherein, in the full flood mode, the packet transmission is triggered by a timer.

12. The method according to claim 6, wherein the flood is triggered by a received packet.

13. A non-transitory computer readable medium, for controlling a processor of a mesh network node, comprising:
   instructions for receiving a flood packet from a current sender mesh network node, the flood packet comprising information defining an identity of the current sender, an identity of a prior sender from which the flood packet was received, a flood mode indicator, a time-to-live, and a sequence identifier, and an optional payload;

instructions for marking the critical node indicator as critical in the memory selectively dependent on whether during a period, the flood mode indicator is full flood mode, and the identity of the mesh network node is the same as the identity of the prior sender, and mark the critical node indicator as non-critical selectively dependent on whether during a period, the flood mode indicator is full flood mode, and no packet is received with the identity of the mesh network node the same as the identity of the prior sender;

instructions for selectively rebroadcasting a single instance of the flood packet based on a comparison of the sequence identifier with the set of prior sequence identifiers, modified by a replacement of the identity of the current sender with an identity of the mesh network node, a replacement of the identity of the prior sender with an identity of the current sender, and a decrement of the time to live, wherein the flood packet is rebroadcast selectively dependent on whether a time to live is not expired;

instructions for interpreting the flood mode indicator to indicate one of: a full flood mode wherein the sequence identifier is not present in a list of prior sequence identifiers, and a partial flood mode, wherein the sequence identifier is not present in the list of prior sequence identifiers, and the recipient is marked as critical.

14. The non-transitory computer readable medium according to claim 13, further comprising instructions for analyzing a time-sensitivity of the flood mode indicator.

15. The non-transitory computer readable medium according to claim 13, further comprising instructions for maintaining the full flood mode for a limited time.

16. The non-transitory computer readable medium according to claim 13, further comprising instructions for transmitting of a full flood packet.

17. The non-transitory computer readable medium according to claim 16, further comprising instructions to transmit the full flood packet selectively dependent on a timer.

18. The non-transitory computer readable medium according to claim 16, further comprising instructions transmitting the full flood packet selectively dependent on a received packet.

* * * * *